United States Patent
Cocanougher et al.

(10) Patent No.: US 12,061,997 B2
(45) Date of Patent: Aug. 13, 2024

(54) SYSTEM AND METHOD FOR EXCHANGING TICKETS VIA A MACHINE-READABLE CODE

(71) Applicant: Digital Seat Media, Inc., Fort Worth, TX (US)

(72) Inventors: Charles Daniel Cocanougher, North Richland Hills, TX (US); Cameron Fowler, Fort Worth, TX (US); Matthew Sullivan, Austin, TX (US)

(73) Assignee: Digital Seat Media, Inc., Fort Worth, TX (US)

( * ) Notice: Subject to any disclaimer, the term of this patent is extended or adjusted under 35 U.S.C. 154(b) by 0 days.

(21) Appl. No.: 18/304,208

(22) Filed: Apr. 20, 2023

(65) Prior Publication Data
US 2023/0252370 A1 Aug. 10, 2023

Related U.S. Application Data

(63) Continuation of application No. 17/660,828, filed on Apr. 26, 2022, now Pat. No. 11,657,337, which is a
(Continued)

(51) Int. Cl.
*G06Q 10/02* (2012.01)
*G06F 16/955* (2019.01)
(Continued)

(52) U.S. Cl.
CPC ........... *G06Q 10/02* (2013.01); *G06F 16/955* (2019.01); *G06Q 20/0457* (2013.01); *H04L 9/0866* (2013.01)

(58) Field of Classification Search
None
See application file for complete search history.

(56) References Cited

U.S. PATENT DOCUMENTS 6,144,304 A 11/2000 Webb
6,658,348 B2 12/2003 Rudd et al.
(Continued)

FOREIGN PATENT DOCUMENTS

EP 2254083 A1 11/2010
EP 2988260 A1 2/2016
(Continued)

OTHER PUBLICATIONS

International Search Report issued in International Application No. PCT/US2021/071461 dated Feb. 10, 2022, Feb. 10, 2022.
(Continued)

*Primary Examiner* — Carl Adams
(74) *Attorney, Agent, or Firm* — Vos-IP, LLC

(57) ABSTRACT

A system for exchanging tickets comprising: a server system comprising a computer processor, a server, and a database; a user device comprising a unique ID; and a tag comprising a tag ID; and wherein upon scanning the tag by the user device, the system performs the following method: scanning, via a user device, a tag comprising a tag ID, said tag comprising a tag ID identifying a seat; verifying a unique ID on said user device by confirming a matching unique ID within a database or generating a unique ID if one is not present; verifying ownership of a first ticket on said user device, said first ticket comprising a unique identifying ticket code and matching the seat defined by said tag ID; directing the user device to a ticket exchange portal; selecting a second ticket for exchange; confirming the exchange; and exchanging the first and second tickets.

27 Claims, 25 Drawing Sheets

Related U.S. Application Data continuation-in-part of application No. 17/446,298, filed on Aug. 29, 2021, now Pat. No. 11,475,409, which is a continuation-in-part of application No. 17/302,233, filed on Apr. 27, 2021, now Pat. No. 11,106,753.

(60) Provisional application No. 63/201,376, filed on Apr. 27, 2021, provisional application No. 63/269,015, filed on Mar. 8, 2022, provisional application No. 63/015,688, filed on Apr. 27, 2020, provisional application No. 63/201,373, filed on Apr. 27, 2021.

(51) Int. Cl.
  *G06Q 20/04* (2012.01)
  *H04L 9/08* (2006.01)

(56) References Cited

U.S. PATENT DOCUMENTS

| | | |
|---|---|---|
| 7,379,886 B1 | 5/2008 | Zaring et al. |
| 7,587,214 B2 | 9/2009 | Inselberg |
| 7,817,990 B2 | 10/2010 | Pamminger et al. |
| 8,056,802 B2 | 11/2011 | Gressel et al. |
| 8,494,838 B2 | 7/2013 | Donabedian et al. |
| 8,731,583 B2 | 5/2014 | Wengrovitz |
| 8,971,861 B2 | 3/2015 | Gupta et al. |
| 9,002,727 B2 | 4/2015 | Horowitz et al. |
| 9,117,231 B2 | 8/2015 | Rodgers et al. |
| 9,201,470 B2 | 12/2015 | Kim et al. |
| 9,223,750 B2 | 12/2015 | Liu et al. |
| 9,223,885 B2 | 12/2015 | Marsico |
| 9,324,079 B2 | 4/2016 | Moulin et al. |
| 9,405,844 B2 | 8/2016 | Lim et al. |
| 9,451,389 B2 | 9/2016 | Beg et al. |
| 9,616,338 B1 | 4/2017 | Hooper et al. |
| 9,681,302 B2 | 6/2017 | Robinton et al. |
| 9,767,645 B1 | 9/2017 | Cronin et al. |
| 9,826,049 B2 | 11/2017 | Lim et al. |
| 9,870,585 B2 | 1/2018 | Cronin et al. |
| 9,883,344 B2 | 1/2018 | Bolton et al. |
| 9,965,819 B1 | 5/2018 | Devries |
| 9,977,865 B1 | 5/2018 | Laborde |
| 10,009,429 B2 | 6/2018 | Manchado |
| 10,127,746 B2 | 11/2018 | Bergdale et al. |
| 10,163,124 B2 | 12/2018 | Horowitz et al. |
| 10,178,166 B2 | 1/2019 | Sharan |
| 10,248,905 B1 | 4/2019 | Beatty |
| 10,594,774 B2 | 3/2020 | Thomas |
| 10,942,913 B1 | 3/2021 | Khoyilar et al. |
| 11,074,543 B1 | 7/2021 | Rudeegraap et al. |
| 11,461,425 B2 | 10/2022 | Fowler et al. |
| 11,468,138 B2 | 10/2022 | Fowler et al. |
| 11,838,587 B1 | 12/2023 | Ensing |
| 2001/0050310 A1 | 12/2001 | Rathus et al. |
| 2002/0016816 A1 | 2/2002 | Rhoads |
| 2003/0008661 A1 | 1/2003 | Joyce et al. |
| 2003/0041155 A1 | 2/2003 | Nelson et al. |
| 2006/0077253 A1 | 4/2006 | Vanriper et al. |
| 2006/0094409 A1 | 5/2006 | Inselberg |
| 2007/0229217 A1 | 10/2007 | Chen et al. |
| 2009/0085724 A1 | 4/2009 | Naressi et al. |
| 2009/0112683 A1 | 4/2009 | Hamilton, II et al. |
| 2009/0138920 A1 | 5/2009 | Anandpura et al. |
| 2009/0189982 A1 | 7/2009 | Tawiah |
| 2009/0222336 A1 | 9/2009 | Etheridge, Jr. et al. |
| 2010/0077429 A1 | 3/2010 | Kim et al. |
| 2010/0133339 A1 | 6/2010 | Gibson et al. |
| 2010/0184462 A1 | 7/2010 | Lapstun et al. |
| 2010/0228577 A1 | 9/2010 | Cunningham et al. |
| 2010/0245083 A1 | 9/2010 | Lewis |
| 2010/0279710 A1 | 11/2010 | Dicke et al. |
| 2011/0034252 A1 | 2/2011 | Morrison et al. |
| 2011/0270618 A1 | 11/2011 | Banerjee et al. |
| 2012/0011015 A1 | 1/2012 | Singh et al. |
| 2012/0130770 A1 | 5/2012 | Heffernan |
| 2012/0162436 A1 | 6/2012 | Cordell et al. |
| 2012/0233237 A1 | 9/2012 | Roa et al. |
| 2012/0265696 A1 | 10/2012 | Tuchman et al. |
| 2012/0280784 A1 | 11/2012 | Gaviria Velez et al. |
| 2013/0043302 A1 | 2/2013 | Powlen et al. |
| 2013/0073366 A1 | 3/2013 | Heath |
| 2013/0080218 A1 | 3/2013 | Wildern, IV et al. |
| 2013/0085834 A1 | 4/2013 | Witherspoon, Jr. et al. |
| 2013/0166384 A1 | 6/2013 | Das |
| 2013/0218721 A1 | 8/2013 | Borhan et al. |
| 2013/0275221 A1 | 10/2013 | Zeto, III et al. |
| 2013/0297430 A1 | 11/2013 | Soergel |
| 2013/0311214 A1 | 11/2013 | Marti et al. |
| 2014/0039945 A1 | 2/2014 | Coady et al. |
| 2014/0046802 A1 | 2/2014 | Hosein et al. |
| 2014/0058886 A1 | 2/2014 | Gopalakrishnan et al. |
| 2014/0156752 A1 | 6/2014 | Fetyko |
| 2014/0217164 A1 | 8/2014 | Sweeney et al. |
| 2014/0278592 A1 | 9/2014 | Giampapa |
| 2014/0279072 A1 | 9/2014 | Serino |
| 2014/0282684 A1 | 9/2014 | Keen et al. |
| 2014/0365574 A1 | 12/2014 | Franks et al. |
| 2015/0012307 A1 | 1/2015 | Moss |
| 2015/0067811 A1 | 3/2015 | Agnew et al. |
| 2015/0073879 A1 | 3/2015 | Acosta-Cazaubon |
| 2015/0081532 A1 | 3/2015 | Lewis et al. |
| 2015/0088658 A1 | 3/2015 | Iiduka et al. |
| 2015/0112704 A1 | 4/2015 | Braun |
| 2015/0120388 A1 | 4/2015 | Tan et al. |
| 2015/0161684 A1 | 6/2015 | Raikula |
| 2015/0279164 A1 | 10/2015 | Miller et al. |
| 2015/0294392 A1 | 10/2015 | Sharon et al. |
| 2015/0296347 A1 | 10/2015 | Roth et al. |
| 2015/0304601 A1 | 10/2015 | Hicks et al. |
| 2015/0348329 A1 | 12/2015 | Carre et al. |
| 2015/0358794 A1 | 12/2015 | Nokhoudian et al. |
| 2015/0379791 A1 | 12/2015 | Russell et al. |
| 2016/0086228 A1 | 3/2016 | Babb et al. |
| 2016/0104041 A1 | 4/2016 | Bowers et al. |
| 2016/0104347 A1 | 4/2016 | Yang |
| 2016/0132925 A1 | 5/2016 | Durst, Jr. et al. |
| 2016/0189287 A1 | 6/2016 | Van Meter |
| 2016/0191821 A1 | 6/2016 | Dwarakanath et al. |
| 2016/0217258 A1 | 7/2016 | Pitroda et al. |
| 2016/0260319 A1 | 9/2016 | Jeffery et al. |
| 2016/0282619 A1 | 9/2016 | Oto et al. |
| 2016/0307379 A1 | 10/2016 | Moore, Jr. et al. |
| 2016/0335565 A1* | 11/2016 | Charriere ........... G06Q 30/0605 |
| 2016/0381023 A1 | 12/2016 | Dulce et al. |
| 2017/0039599 A1 | 2/2017 | Tunnell et al. |
| 2017/0142460 A1 | 5/2017 | Yang et al. |
| 2017/0250006 A1 | 8/2017 | Ovalle |
| 2017/0308692 A1 | 10/2017 | Yano |
| 2017/0330263 A1 | 11/2017 | Shaffer |
| 2017/0337531 A1 | 11/2017 | Kohli |
| 2018/0025402 A1 | 1/2018 | Morris |
| 2018/0026954 A1 | 1/2018 | Toepke et al. |
| 2018/0075717 A1 | 3/2018 | Reinbold et al. |
| 2018/0089775 A1 | 3/2018 | Frey et al. |
| 2018/0276705 A1 | 9/2018 | Jay et al. |
| 2018/0288394 A1 | 10/2018 | Aizawa |
| 2018/0330327 A1 | 11/2018 | Hertenstein et al. |
| 2018/0336286 A1 | 11/2018 | Shah |
| 2018/0353999 A1 | 12/2018 | McGillicuddy et al. |
| 2018/0376217 A1 | 12/2018 | Kahng et al. |
| 2019/0066063 A1 | 2/2019 | Jessamine |
| 2019/0098504 A1 | 3/2019 | Van Betsbrugge et al. |
| 2019/0130450 A1 | 5/2019 | Lamont |
| 2019/0220715 A1 | 7/2019 | Park et al. |
| 2019/0311341 A1 | 10/2019 | Rice |
| 2019/0362601 A1 | 11/2019 | Kline et al. |
| 2019/0385128 A1 | 12/2019 | Cummings |
| 2020/0035019 A1 | 1/2020 | Cappello et al. |
| 2020/0066129 A1 | 2/2020 | Galvez et al. |
| 2020/0104601 A1 | 4/2020 | Karoui et al. |
| 2020/0184547 A1 | 6/2020 | Andon et al. |
| 2020/0213006 A1 | 7/2020 | Graham et al. |
| 2020/0236278 A1 | 7/2020 | Yeung et al. |

(56) References Cited

U.S. PATENT DOCUMENTS

| | | |
|---|---|---|
| 2020/0320911 A1 | 10/2020 | Bruce |
| 2020/0327997 A1 | 10/2020 | Behrens et al. |
| 2020/0413152 A1 | 12/2020 | Todorovic et al. |
| 2021/0019564 A1 | 1/2021 | Zhou et al. |
| 2021/0019715 A1 | 1/2021 | Stier et al. |
| 2021/0027402 A1 | 1/2021 | Davis et al. |
| 2021/0065256 A1 | 3/2021 | Shontz |
| 2021/0118085 A1 | 4/2021 | Bushnell et al. |
| 2021/0134248 A1 | 5/2021 | Wan et al. |
| 2021/0174344 A1 | 6/2021 | Fowler et al. |
| 2021/0247947 A1 | 8/2021 | Jaynes et al. |
| 2021/0248338 A1 | 8/2021 | Spivack et al. |
| 2021/0390509 A1 | 12/2021 | Fowler et al. |
| 2022/0060759 A1 | 2/2022 | Fowler et al. |
| 2022/0103885 A1 | 3/2022 | Sarosi et al. |
| 2022/0114228 A1 | 4/2022 | Fowler et al. |
| 2022/0116737 A1 | 4/2022 | White et al. |
| 2022/0167021 A1 | 5/2022 | French et al. |
| 2022/0172128 A1* | 6/2022 | Lore .................... G06Q 20/045 |
| 2022/0188839 A1 | 6/2022 | Andon et al. |
| 2022/0248169 A1 | 8/2022 | Bettua et al. |
| 2022/0337898 A1 | 10/2022 | Dorogusker et al. |
| 2022/0343451 A1 | 10/2022 | Fowler et al. |
| 2023/0117466 A1 | 4/2023 | Idris et al. |

FOREIGN PATENT DOCUMENTS

| | | | |
|---|---|---|---|
| EP | 3550844 | A1 | 10/2019 |
| FR | 3092195 | A1 | 7/2020 |
| KR | 10-2015-0042885 | A | 4/2015 |
| WO | WO/2006/011557 | A1 | 2/2006 |
| WO | WO/2008/124168 | A1 | 10/2008 |
| WO | WO/2013/120064 | A1 | 8/2013 |
| WO | WO/2014/081584 | A1 | 5/2014 |
| WO | WO/2014/112686 | A1 | 7/2014 |
| WO | WO/2015/035055 | A1 | 3/2015 |
| WO | WO/2016/041018 | A1 | 3/2016 |
| WO | WO/2019/016602 | A2 | 1/2019 |

OTHER PUBLICATIONS

International Search Report issued in International Application No. PCT/US2022/071913 dated Jun. 15, 2022, Jun. 15, 2022.
International Search Report issued in International Application No. PCT/US2021/070471 dated Jun. 28, 2021, Jun. 28, 2021.
International Search Report issued in International Application No. PCT/US2022/071909 dated Aug. 3, 2022, Aug. 3, 2022.
International Search Report issued in International Application No. PCT/US2022/071912 dated Jul. 6, 2022, Jul. 6, 2022.
International Search Report issued in International Application No. PCT/US2022/071938 dated Jul. 6, 2022, Jul. 6, 2022.
International Search Report issued in International Application No. PCT/US2022/071906 dated Jul. 7, 2022, Jul. 7, 2022.
International Search Report issued in International Application No. PCT/US2022/071910 dated Jul. 7, 2022, Jul. 7, 2022.
International Search Report issued in International Application No. PCT/US2022/071908 dated Aug. 8, 2022, Aug. 8, 2022.
International Search Report issued in International Application No. PCT/US2022/071915 dated Jul. 8, 2022, Jul. 8, 2022.
"Blockchain", Wikipedia, Sep. 27, 2019.
"QR Codes: Here They Come, Ready or Not", Printing Tips: Precision Printing Newsletter, vol. 1, No. 1, May 2011.
"URL Redirection", Wikipedia, Mar. 21, 2021.
"Web Template System", Wikipedia, Mar. 2, 2021.
Garg, "QR Codes in Sporting Goods Companies: Eight Use Cases Across the Industry", Scanova Blog, Dec. 11, 2019, https://scanova.io/blog/qr-codes-sporting-goods-companies/.
McLaren, "Women's Beach Volleyballers Sign Deal to Display QR Code on Their Rears!", Digital Sport, Aug. 9, 2011, https://digitalsport.co/women%E2%80%99s-beach-volleyballers-sign-deal-to-display-qr-code-on-their-rears.
Unruh, "OU's Sooner Schooner Will Run on Field as Football Gameday Traditions Remain in New Ways: 'We Feel Like We Can Safely Do That'", The Oklahoman, Sep. 10, 2020, https://www.oklahoman.com/story/sports/columns/2020/09/10/sooner-schooner-will-run-field-football-gameday-traditions-remain-new-.
Muthukumar, et al., "QR Code and Biometric Based Authentication System for Trains", IOP Conference Series: Materials Science and Engineering, vol. 590, 2019, 1-7.

\* cited by examiner

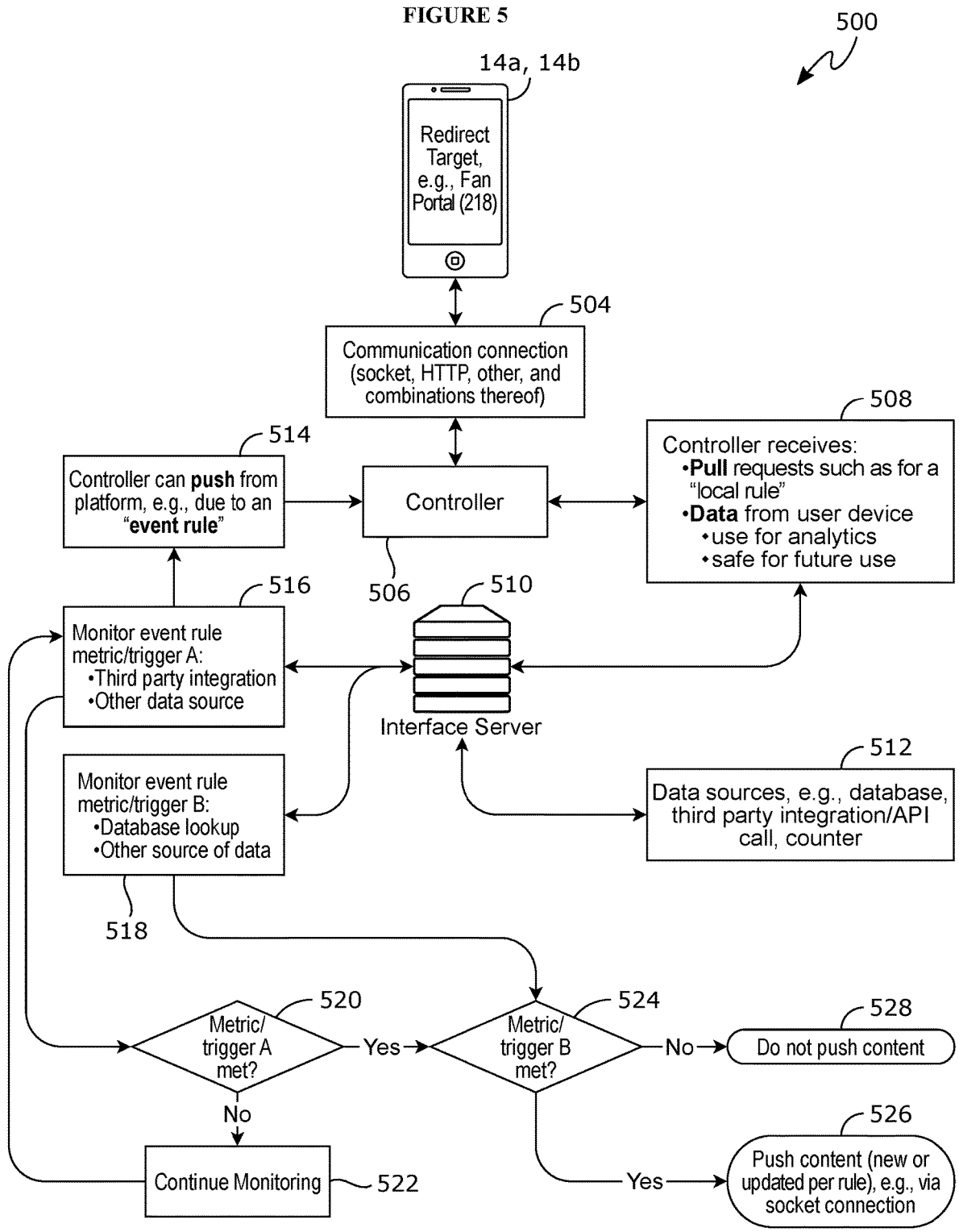

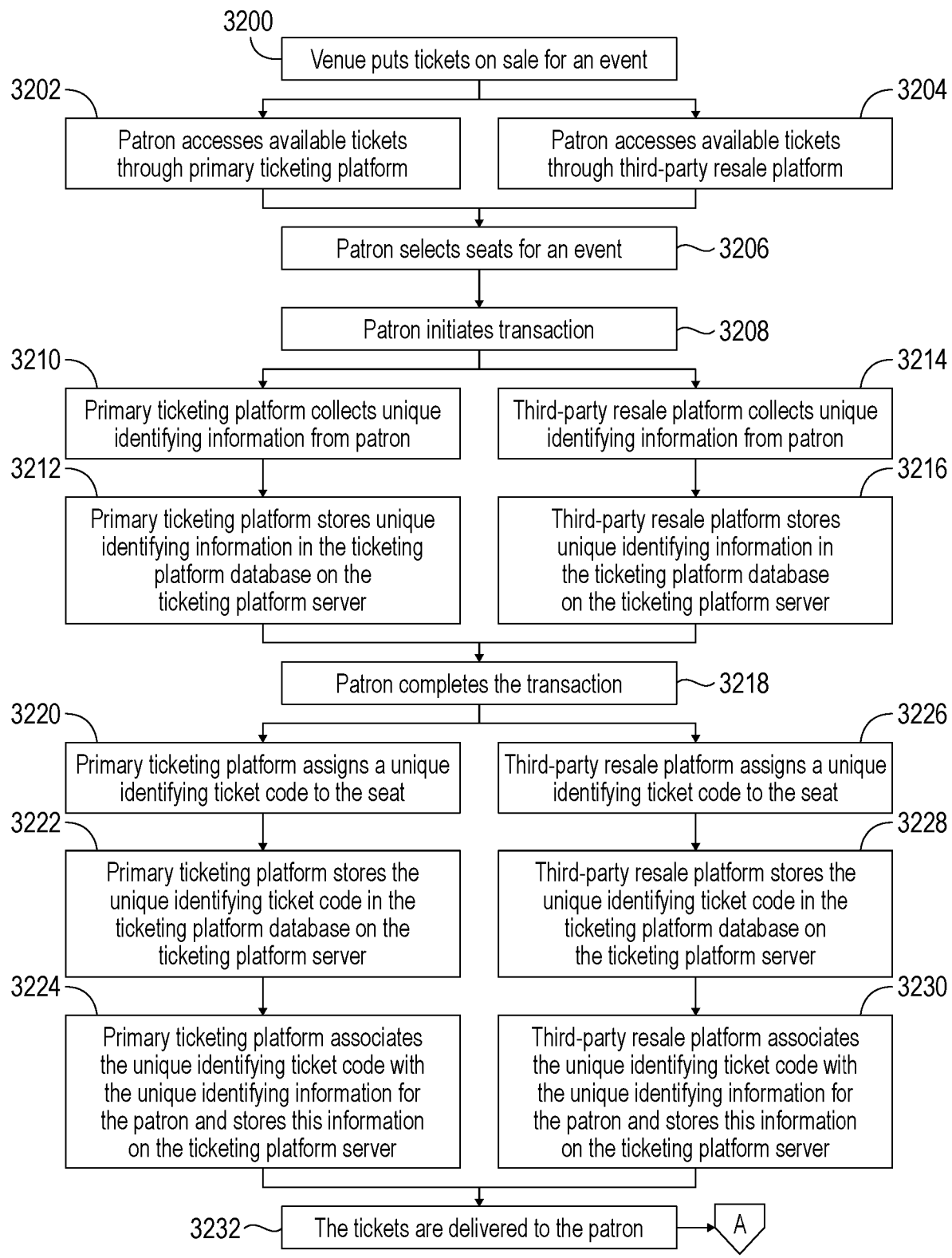

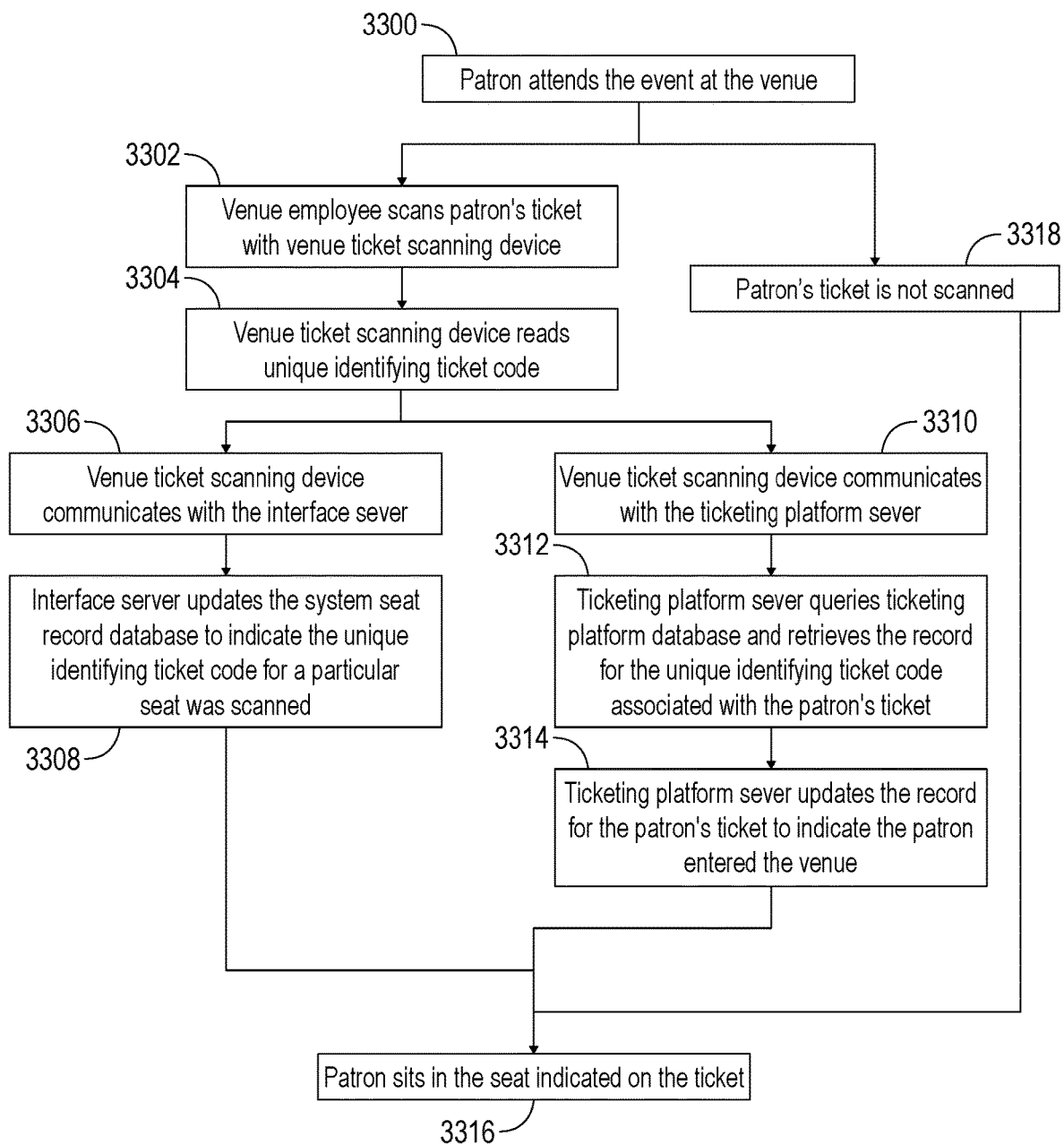

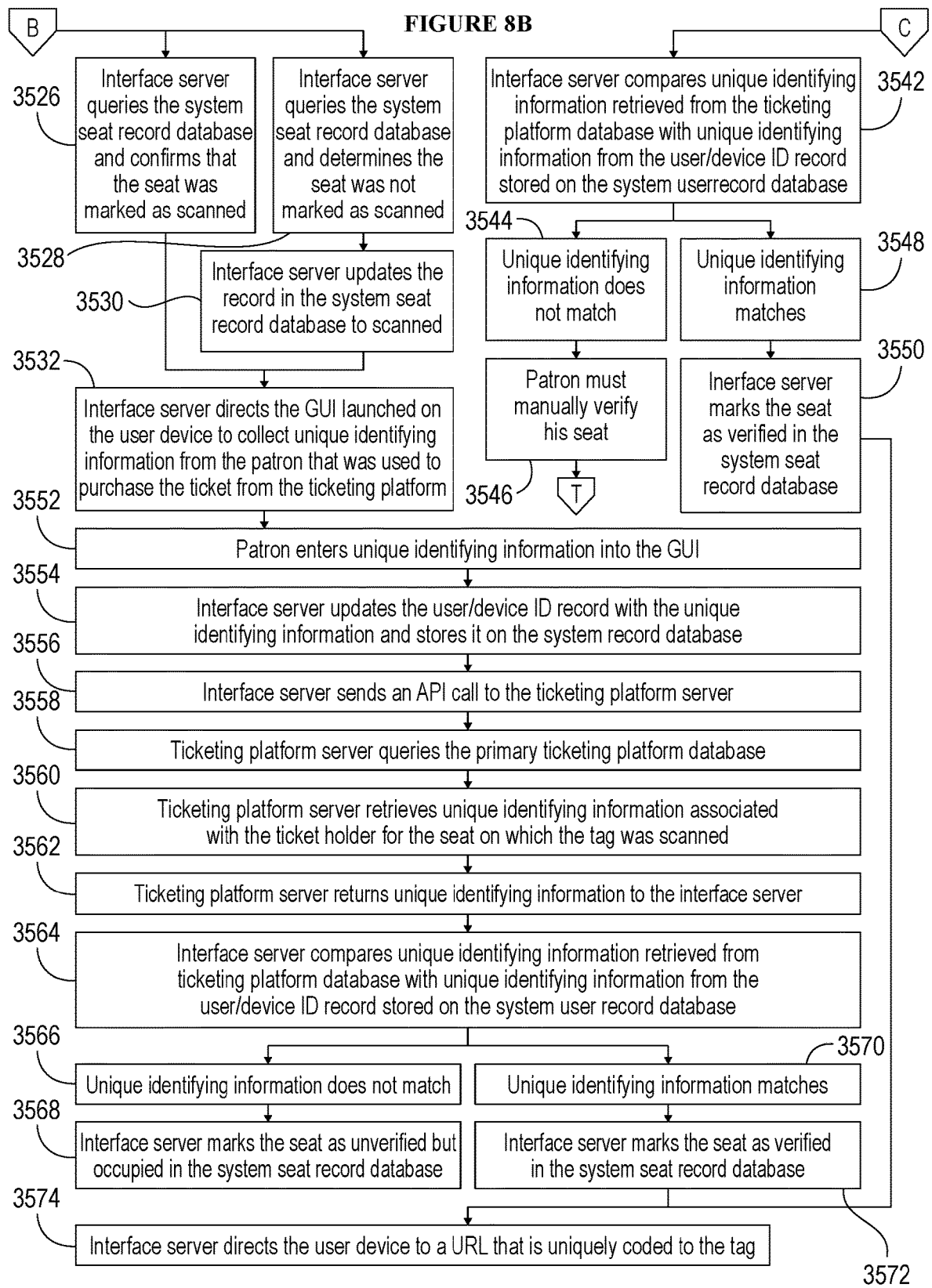

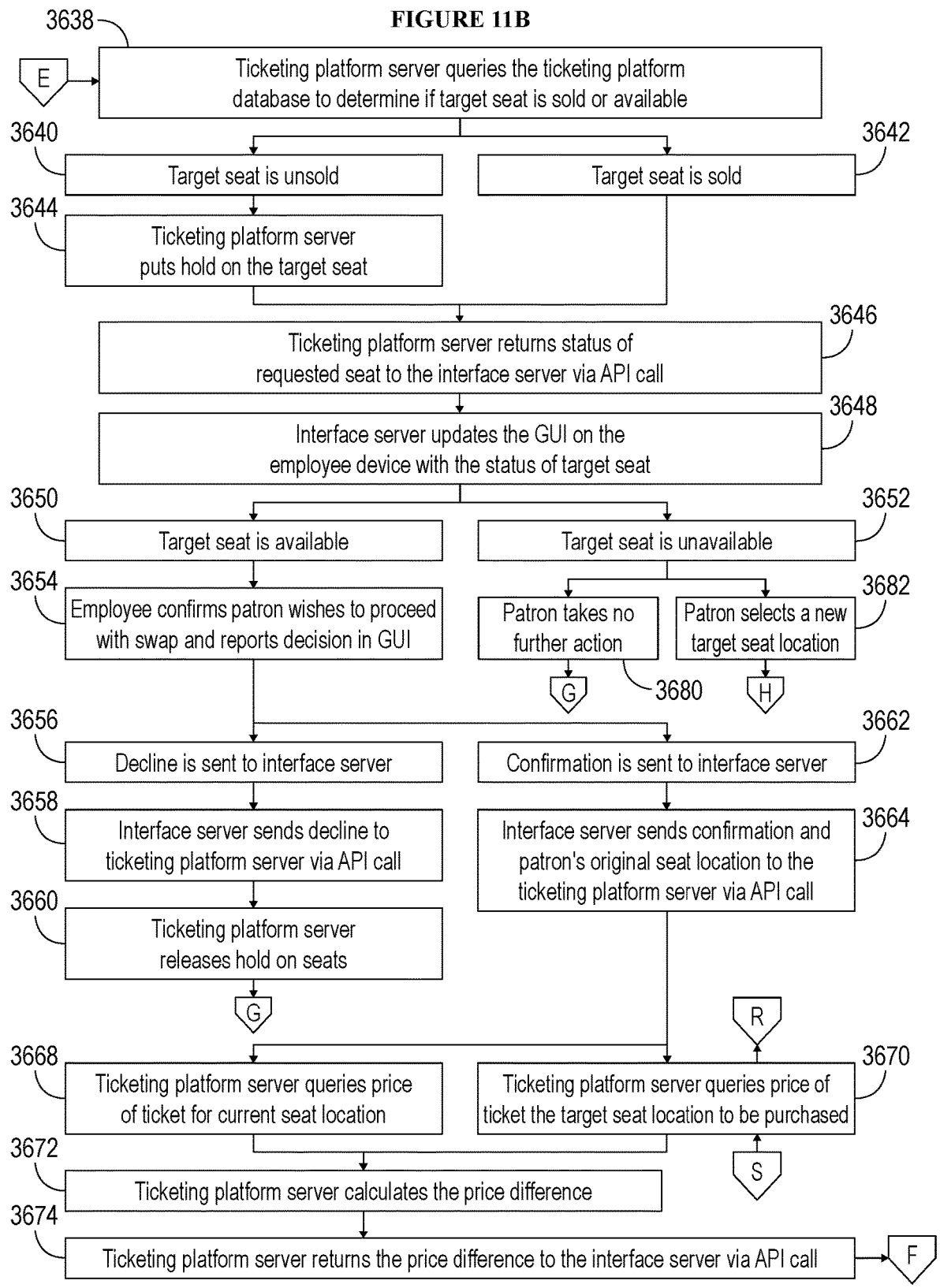

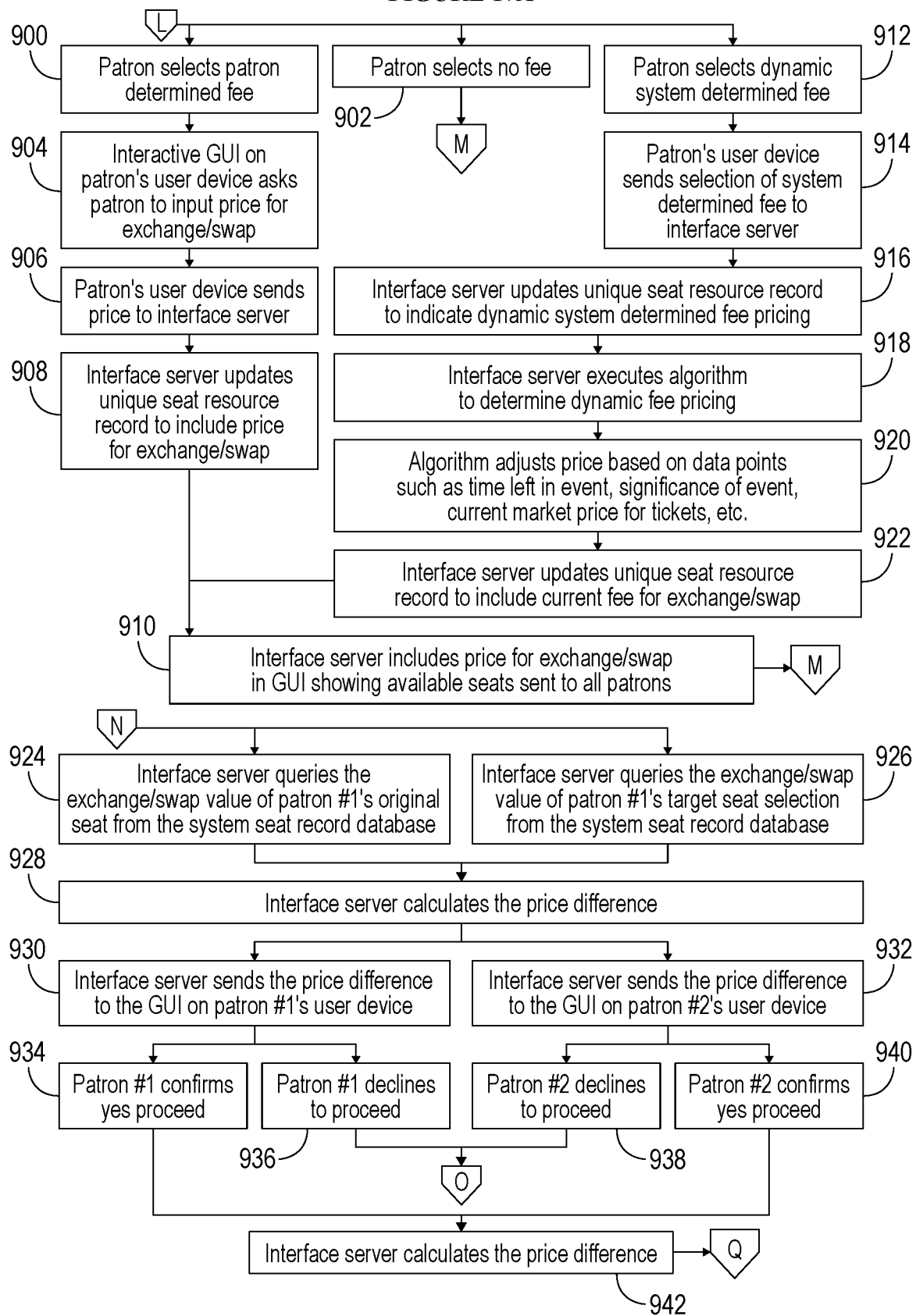

SYSTEM AND METHOD FOR EXCHANGING TICKETS VIA A MACHINE-READABLE CODE

CROSS-REFERENCE TO RELATED APPLICATIONS

This application is a continuation of U.S. patent application Ser. No. 17/660,828 filed on Apr. 26, 2022, which claims the benefit of U.S. Provisional Patent Application No. 63/201,376 filed on Apr. 27, 2021, U.S. Provisional Patent Application No. 63/201,373 filed on Apr. 27, 2021, U.S. Provisional Patent Application No. 63/269,015 filed on Mar. 8, 2022, and U.S. patent application Ser. No. 17/446,298 filed on Aug. 29, 2021, which is a continuation-in-part of U.S. patent application Ser. No. 17/302,233 filed on Apr. 27, 2021, which claims the benefit of U.S. Provisional Patent Application No. 63/015,688 filed on Apr. 27, 2020, all with the United States Patent and Trademark Office, the contents of which are incorporated herein by reference in their entirety.

FIELD OF THE INVENTION

The embodiments are generally related to the purchasing and exchanging of ticketed seats within a venue.

BACKGROUND OF THE INVENTION

Entertainment venues typically utilize assigned seating when selling tickets to events that have physical seats. Seats are divided into sections and levels with tiered pricing based upon the most desired location in proximity to the event. Examples of venues and events that utilize assigned seating are football stadiums, baseball parks, hockey arenas, basketball courts, auto racing tracks, horse racing tracks, theatres, concert halls and movie theatres.

At a football stadium, the seats are typically divided into sections which are numbered based upon their proximity to the field. The section closest to the field may be designated as the 100 level with section 101 being the section at the 50-yard line and section 120 being the section in the endzone. The tier of seats above that and further from the field may be designated as the 200 level with section 201 being the section at the 50-yard line and section 220 being the section in the endzone. The tier of seats farthest from the field may be designated as the 300 level with section 301 being at the 50-yard line and section 320 being the section in the endzone. Ticket prices are based upon these level tiers and the individual rows and seats within the section. In a football stadium, the seats in section 101 will be more expensive than the seats in section 301 as it is more desirable to be seated closer to the field.

However, at an auto racing event, following the same section designation with the 100 level being closest to the track and the 300 level being furthest from the track at the highest point of the grandstands, it is more desirable to sit further away from the track so as to have a better view of more area. Therefore, tickets in the 300 level of the grandstands at an auto racing track are typically more expensive than tickets in the 100 level of the grandstands.

In other venues, such as a movie theatre, there is not a generally accepted definition of a premium seat. Some patrons prefer to be closer to the screen while others prefer to be further from the screen. In this example, each seat in the venue is priced the same.

Tickets can be sold to an event in a variety of ways. Many venues utilize third-party ticketing services such as Ticketmaster®. Patrons typically access the third-party ticketing service's website and select the event they would like to attend. In some instances, patrons have the ability to select the exact seats they wish to purchase. In other instances, patrons have the option of selecting a price range and based upon their selection, are provided with what the system deems to be the best available seats. Ticket sales can also be made via a telephone call to the venue or ticketing service or by purchasing the tickets at a physical location such as the venue box office. In other instances, a venue may use its own proprietary software, but this software generally functions as described above for the third-party ticketing service.

Once the tickets are purchased, they can be delivered to the patron in a variety of ways. Physical tickets can be mailed to the patron or available for pick-up at the box office. Electronic or digital tickets can be e-mailed to the patron who has the ability to print the ticket or make the image of the ticket available on the patron's user device for scanning at the venue, or more recently, tickets can be a mobile entry ticket where the patron's user device becomes the ticket via the mobile wallet function. Electronic, digital and mobile tickets also have the ability to be transferred from the patron who purchased the ticket to other individuals in the patron's group so that each attendee has his or her own entrance ticket.

A variety of third-party marketplaces where tickets to events can be listed for sale by the original patron who purchased the ticket and then bought by a second party already exist and are generally known in the art. There are a variety of reasons patrons may want to list their tickets to an event for resale for example, a scheduling conflict, illness or death. Even with advanced ticketing and resale options, seats for events at venues still go unfilled. Sometimes, a corporate sponsor or performer does not utilize their block of tickets, or a patron does not list his or her tickets for resale on a third-party marketplace. Patrons in the venue may see vacant seats in a desirable location but there currently is no way for the patron to upgrade his or her seats after entry to the venue. Additionally, some patrons may choose to leave the event prior to its conclusion. For example, a season ticket holder to a baseball game where it appears that the winner of the game is evident after only the fourth inning, may choose to leave the game early but has no way of alerting the ushers or a ticketing system that his seat is available. Applicant has developed an elegant means of allowing patrons to resell, change, and upgrade seats in real time within the venue, before or during an event.

SUMMARY OF THE INVENTION

The embodiments herein are directed toward seamless ticket exchange or transfer systems, which allow for the exchange, transfer, or purchase of new seats, while exchanging or selling back, for value, of prior seats. This allows for a user to upgrade a seat or to sell a high value seat, by scanning of a tag with a user device. The systems and methods herein allow for complete exchange of all rights and ownership of the tickets, including any benefits that may be afforded to those seats, such as food and beverage rights, VIP entrance, and the like. Finally, the system allows for integration with third party API or venue API to make the transfer, with or without exchange of fees.

In a preferred embodiment, a system for exchanging tickets corresponding to an event comprising: (a) a server system comprising a computer processor, a server, and a database; a user device comprising a unique ID; and a tag comprising a tag ID; and (b) wherein upon scanning the tag by the user device, the system performs the following method: (i) scanning, via a user device, a tag comprising a tag ID, said tag positioned on a seat and comprising a tag ID identifying said seat; (ii) verifying a unique ID on said user device by requesting from a server a matching unique ID within a database or generating a unique ID if one is not present; (iii) verifying ownership of a first ticket on said user device, said first ticket comprising a unique identifying ticket code and matching the seat defined by said tag ID; (iv) directing the user device to a target URL defining a ticket exchange portal; (v) selecting a second ticket to exchange with a second user; (vi) confirming exchange between the first user and the second user; and (vii) exchanging the first and second tickets.

In a further embodiment, the system wherein exchange of the first and second tickets is provided by generating a new unique identifying ticket code for each of the first and second tickets by an employee of a venue.

In a further embodiment, the system wherein there is a price difference between the first ticket and the second ticket, and wherein the user with the price difference pays the price difference to obtain the ticket. In a further embodiment, the system wherein the price difference between the first and second ticket is determined by dynamic pricing, wherein values of each of the first and second ticket are modified.

In a further embodiment, the system further comprising wherein the second user is a third party ticketing platform or a venue.

A method of verifying ownership of a ticket for exchange or sale comprising: (a) scanning, with a user device, a tag, said user device comprising a unique ID, and said tag comprising a tag ID; (b) verifying between said user device and said tag ID the ownership of the ticket; and (c) identifying the ticket for exchange or sale.

In a further embodiment, the method wherein the verifying step is performed by detecting within said user device a unique identifying ticket code and matching said unique identifying ticket code on said user device with said tag ID.

In a further embodiment, the method wherein the verifying step is performed by scanning on a ticket a unique identifying ticket code and matching said unique identifying ticket code with said tag ID.

In a further embodiment, the method wherein the verifying step is performed by contacting a third party API and detecting a unique identifying information, wherein said unique identifying information confirms the ownership of the tag ID.

In a preferred embodiment, a method for exchanging a first ticket and a second ticket electronically comprising: (a) scanning, with a first user device, a first tag, said first user device comprising a first unique ID, and said first tag comprising a first tag ID; (b) verifying, between said first user device and said first tag ID, ownership of the first ticket by a first user; (c) scanning, with a second user device, a second tag, said second user device comprising a second unique ID, and said second tag comprising a second tag ID; (d) verifying, between said second user device and said second tag ID, ownership of the second ticket by a second user; (e) listing for exchange said first and second tickets; (f) receiving a request to exchange said first ticket for said second ticket; (g) said second user approving the request to exchange said first ticket for said second ticket; and (h) issuing a new first ticket and a new second ticket and delivering said new first ticket and said new second ticket to said first and said second users.

In a further embodiment, the method wherein the verifying step is performed by detecting within said user device a unique identifying ticket code and matching said unique identifying ticket code on said user device with said tag ID.

In a further embodiment, the method wherein the verifying step is performed by scanning on a ticket a unique identifying ticket code and matching said unique identifying ticket code with said tag ID.

In a further embodiment, the method wherein the verifying step is performed by contacting a third party API and detecting a unique identifying information, wherein said unique identifying information confirms ownership of the tag ID.

In a further embodiment, the method wherein a price difference exists between said first and second tickets and said first user or said second user paying the price difference to exchange said first and second tickets.

In a preferred embodiment, a method for exchanging a first ticket and a second ticket electronically comprising: (a) scanning, with a first user device, a first tag, said first user device comprising a first unique ID, and said first tag comprising a first tag ID; (b) verifying, between said first user device and said first tag ID, ownership of the first ticket by a first user; (c) listing for exchange said first ticket; (d) identifying on a graphical user interface (GUI) a desired ticket for exchange; (e) generating a request for exchange of the desired ticket; (f) determining a price difference between said first ticket and said desired ticket; (g) approving the request to exchange said first ticket for said desired ticket; (h) paying the price difference between said first ticket and said desired ticket; and (i) issuing a new desired ticket and delivering said new desired ticket to said first user.

In a further embodiment, the method wherein the price of said first ticket and said desired ticket is dynamically priced. In a further embodiment, the method wherein said dynamic pricing is provided based upon availability of a similar seat.

In a further embodiment, the method wherein the price of the desired ticket is determined by auction. In a further embodiment, the method wherein the price of the desired ticket is set by a third party.

In a further embodiment, the method wherein the first ticket is reissued as an unsold ticket.

In a further embodiment, the method wherein the first ticket is exchanged with another user.

BRIEF DESCRIPTION OF THE FIGURES

FIG. 5 depicts an embodiment of a system wherein the system is enabled to push or pull data or information or due to triggering events or rules to modify or augment a target delivered to a user device.

FIGS. 6A and 6B are a flowchart depicting a method of purchasing a ticket to an event.

FIG. 7 is a flowchart depicting a method of attending an event at a venue.

FIGS. 8A and 8B are a flowchart depicting a method of verifying a patron's seat at an event.

FIGS. 11A, 11B, and 11C are a flowchart for "Embodiment #1A: Exchange/Upgrade Seat(s) from a Selection of Available/Empty Seat(s) Using the Assistance of a Venue Employee."

FIGS. 17A and 17B are a flowchart for "Embodiment #3: Exchange Seats Between Two Patrons at an Event Wherein Funds are Exchanged Between the Patrons."

DETAILED DESCRIPTION OF THE INVENTION

Figure 1:
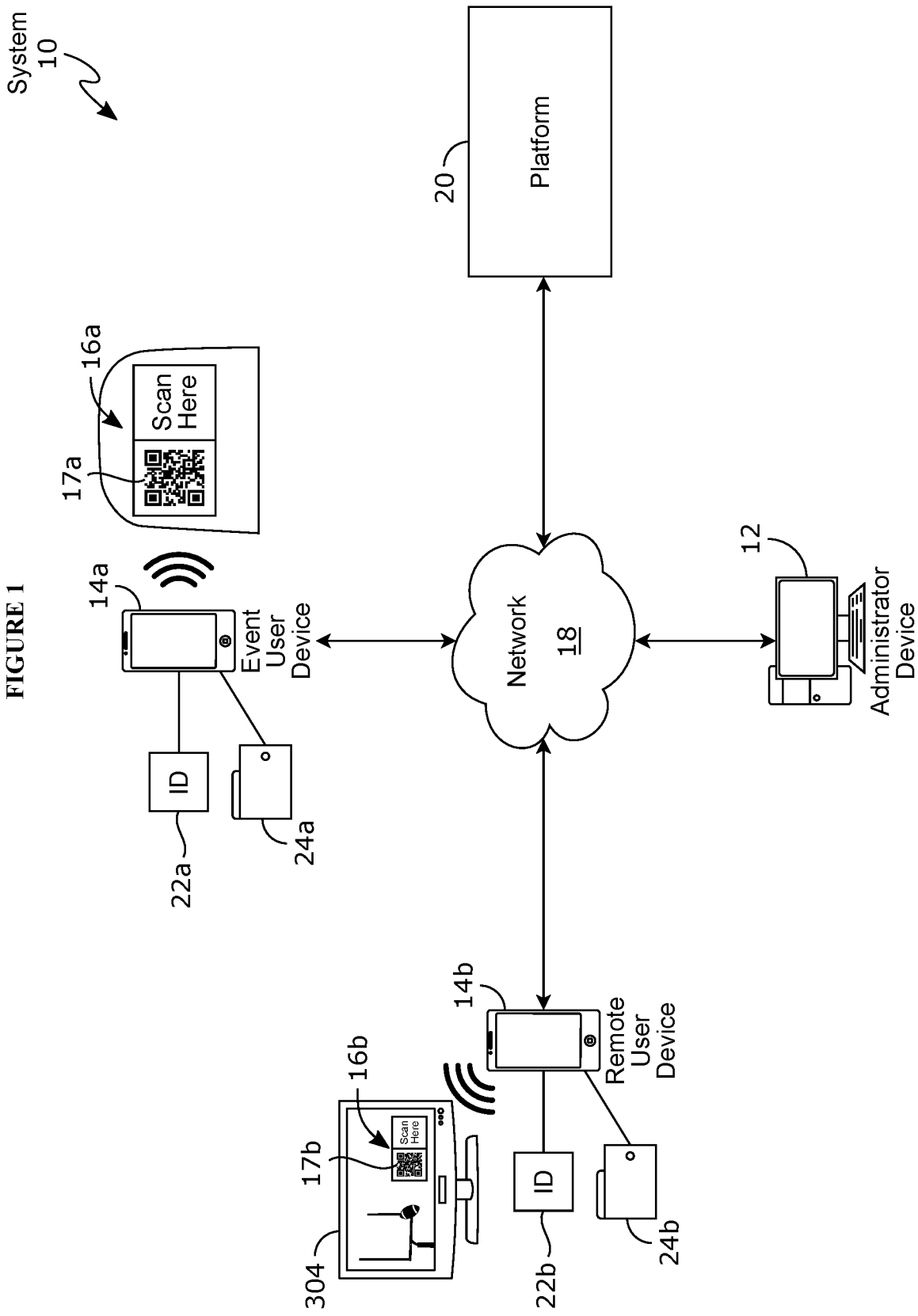
FIG. 1 depicts an embodiment of a system for user device generated interactions with a system and platform for accessing and viewing targets, such as a GUI for exchanging or upgrading seats.

Various embodiments are described more fully hereinafter with reference to the accompanying drawings, which form a part hereof, and which show, by way of illustration, specific exemplary embodiments by which the innovations may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, devices, or any similar or equivalent arrangements known to those skilled in the art. Accordingly, the various embodiments may take the form of an entirely hardware embodiment, an entirely software embodiment or an embodiment combining software and hardware aspects. The following detailed description is, therefore, not to be taken in a limiting sense.

As used herein, the below terms will have the following meanings as may be supplemented elsewhere in this specification:

As used in this application, the words "a," "an," and "one" are defined to include one or more of the referenced items unless specifically stated otherwise. The terms "approximately" and "about" are defined to mean ±10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application.

ADDRESS: Code used to direct a user device, browser, web app, progressive web app, administrator device, server, database, API, tool, software, etc., to a resource within the system or a network. Non-limiting examples of addresses include a uniform resource identifier (URI) or a uniform resource locator (URL).

ADMINISTRATOR: The individual or group of individuals with the ability to control and set rules and parameters within the system. This could be a third-party administrator, the proprietor, the venue, the owner of the tags, the team or performer participating in the event, a designated employee of any of the foregoing, etc.

ADMINISTRATOR DEVICE: Any type of mobile or non-mobile processing device such as a desktop computer, handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element that is accessible only to an administrator or proprietor or an employee designated by the administrator or proprietor.

ANALYTICS OR ANALYTICAL DATA: Data collected by the system or retrieved by the system via an API call to an external server or database. Non-limiting examples of analytical data include date, time, GPS location, personal identifying information, etc.

APPLICATION PROGRAMMING INTERFACE ("API"): An application programing interface or programming code that enables data transmission within the system, between the system's server and an external server or between one software product and another. Non-limiting examples of API connections to the system may be third-party vendor databases such as ticketing sales platforms, e-commerce sites such as merchandise sales, social media sites, or any other third-party software product that makes their API available for use by others.

API CALL—Computer code used by the system software to access data, server software or other applications within the system or external to the system, acting as an intermediary between any two devices or servers that want to connect with each other for a specified task. As used herein, API can mean (i) representational state transfer or Rest (RESTful) API; (ii) Simple Object Access Protocol ("SOAP") API; (iii) extensible markup language-Remote Procedure Calls ("XML-RPC"); (iv) JSON Remote Procedure Calls ("JSON-RPC), (v) open API; (vi) partner API; (viii) internal or private API; (ix) composite API; or (x) any other API that is generally known, or will be come to be known in the art. Thus, the system frequently uses an API, or sends an API request, to an internal or external program, server or database to deliver requested information.

BLOCKCHAIN: Any digitally distributed, decentralized, public or private ledger that exists across a network such as those offered by the providers including but not limited to Ethereum, Binance Smart Chain, Polkadot, Flow by Dapper Labs, EOS, Tron, Tezos, WAX, Theta, etc.

BROWSER APPLICATION: An application that runs within the Web browser of a User Device or Computer. The instructions or executable code, typically written in a combination of HTML and JavaScript, is embedded within the Web page that is downloaded from a website.

COMPUTER: May be any type of computer such as a laptop computer, desktop computer, tablet, and the like, and includes the appropriate hardware, firmware, and software to enable the computer to function as intended.

CONTENT: Any type of information, images, videos, etc. Non-limiting examples of content can be a video file, an image file, text, executable code, a digital offer, a digital coupon, a digital wallet offer, an AR, VR or mixed reality filter, a game, a poll, an app, an NFT, etc. Content can be specifically formatted for optimal viewing on a user device.

CRYPTO CURRENCY: Any digital currency in which transactions are verified and records maintained on a distributed ledger such as blockchain, for example, Bitcoin, Ethereum, Cardano, Binance Coin, Tether, Solana, XRP, Dogecoin, etc.

DATABASE MANAGEMENT SYSTEM: A software package designed to define, manipulate, retrieve and manage data in a database, or any other generally accepted definition known to those skilled in the art.

DIGITAL OFFER: Any incentive or reward, for example an incentive to purchase at a discounted price or a free giveaway, offered by a proprietor and delivered to users from a server to a user device through a variety of channels. A digital offer can be code stored in the user's digital wallet, a MRC displayed in web browser and presented to a proprietor for redemption, an e-mail with a unique redemption code, a text message, SMS/MMS, push notification or socket notification with a unique redemption code. Digital offers can be stored anywhere on a user device or can be downloaded or turned into physical offers by printing. Digital offers can be limited to a particular user, or a user may share the digital offer to other users. If a digital offer is shared, the same offer can be shared to multiple other users, or the digital offer can be modified by the system when it is shared. Digital offers can also be associated with a unique code that is stored in a database on a server internal or external to the system.

DIGITAL WALLET: A software-based system that securely stores users' information such as payment information, passwords, digital certificates, digital coupons, crypto currency, tokens, NFTs, digital ID such as a digital driver's license or passport, etc. A digital wallet can be a blockchain or crypto currency wallet. A digital wallet can be stored locally on any user device or can be cloud based and accessed by a user device. Digital wallet can also mean digital storage in general on any user device or computer. Digital wallet can also be referred to as a mobile wallet.

DISTRIBUTED DATABASE SYSTEM: Any database that consists of two or more files located in different sites either on the same network or on entirely different networks.

DISTRIBUTED LEDGER: Any database that is consensually shared and synchronized across multiple sites, institutions, or geographies, accessible by multiple people.

DATA SERVER OR SERVER: Any form of electronic device or plurality of devices having at least one computer processor, e.g., a central processing unit (CPU), and some form of computer memory having a capability to store data, as is well known in the art. The server may comprise hardware, software, and firmware for receiving, storing, and/or processing data as described below. The hardware may be in a single unit, or operably connected via a network. For example, a computer or server may comprise any of a wide range of digital electronic devices, including, but not limited to, a server, a desktop computer, a laptop, a smart phone, a tablet, a smart watch, smart glasses, a wearable device or an implantable device or any form of electronic device capable of functioning as described herein.

DYNAMIC ELEMENT: An element that is updated, altered, customized, etc., in response to a change in the status of a metric, trigger, or any other datapoint as determined by the system. A non-limiting example of a dynamic element is the score of a game. If a goal is completed, then the score is updated to reflect this change.

EVENT: Non-limiting examples of an event include a professional, amateur or intermural sporting events (i.e., football, baseball, hockey, basketball, soccer, rugby or cricket game, tennis or golf match, track and field or figure skating event or automobile race), a theatrical performance (play, musical or opera), a musical concert, elementary school, middle school, high school, college or university event, a service or ceremony (i.e., religious or worship), a tradeshow or conference, guided or self-guided tours (museums, galleries and historical site), time spent in a venue such as a visit to a zoo or amusement park, etc.

FAN PORTAL: A GUI, such as a homepage, displayed in the browser of a user device that provides links or access to other pages/modules via buttons or other means of selecting options from a menu of choices. The fan portal can also be used for viewing content and receiving digital offers.

INTERFACE SERVER: Within the system, a program, executable code or API stored on a physical server, cloud storage system or in a serverless environment such as Amazon Web Services, which is capable of communicating with other servers, databases and API's internal or external to the system. The interface server is able to make and receive calls, request and receive data, or execute other functions within systems. The interface server is also capable of running AI and/or utilizing machine learning.

GEOFENCE: A virtual perimeter for a real-world geographic area or an area in or around a venue.

GUI OR GRAPHICAL USER INTERFACE: A graphical interface to enable interactions between a user and the user's device, such as but not limited to an interface to the web app.

JUMBO SCREEN: Any display within a venue visible to users attending an event at a venue. The jumbo screen can be one display or multiple displays within the venue that can be controlled by the venue. Jumbo screen may also be known as a jumbotron.

LOCATION: An area whose perimeter or parameters are defined in an abstract way without boundaries that are clearly visible to users or proprietors. Non-limiting examples of a location include a town, city, state, country, region, continent, time zone, or geofenced area.

MACHINE-READABLE CODE ("MRC"): A barcode, a quick response (QR) code, near-field communication (NFC) code, radio-frequency identification (RFID) code, universal product code (UPC), machine readable graphics (e.g., having a pattern, matrix, or the like) coding, instructions coded on a chip, or combinations thereof. A MRC may be may be included into (i) a tag that is mounted to a surface, (ii) identification badges such as, for example, student identification badges, employment identification badges, concert badges, and the like, (iii) merchandise such as t-shirts, sweatshirts, hats, mugs, glasses, posters, CD's, and the like, (iv) a piece of paper, cardstock, or plastic that is handed to users, (v) a video stream viewed over the Internet or network television channel, (vi) an LCD/LED/e ink display device embedded, attached or affixed to a surface.

MANIFEST: A file containing metadata for a group of accompanying files that are part of the system that instruct the user device how to handle the system when it is started.

MINTING: Uniquely publishing a token on the blockchain to make it purchasable, saleable, or tradeable.

NON-FUNGIBLE TOKEN ("NFT"): A non-interchangeable unit of data stored on a digital ledger, such as but not limited to blockchain, that can be purchased, sold, auctioned, and traded. As used herein, NFT includes the contract and subject matter associated with the NFT. can also mean semi-fungible token, fractional NFT. Non-limiting examples of the smart contracts that could govern a NFT include (i) 1/1 NFTs—known as ERC-721 tokens on Ethereum and Polygon, KIP17 on the Klatyn blockchain; (ii) Semi-fungible NFTs—known as ERC-1155 tokens on Ethereum and Polygon, KIP37 on Klatyn.

NFT MARKETPLACE: A platform where NFTs can be stored, displayed, bought, sold, traded, auctioned and in some cases minted.

PROPRIETOR: Any person or entity who purchases, subscribes to, or otherwise uses the system and/or platform and who is not a user. A Proprietor may or may not have administrative privileges to the system. Non-limiting examples of proprietors include, venue owners, event promotors, teams, performers, theatre troupes, religious organizations, educational institutions (i.e., elementary school, middle school, high school, college, university), restaurants, bars, retail establishments, amusement parks, museums, art galleries, advertisers, media outlets (i.e., network television, cable television, radio, internet broadcasts), hospitals and health care systems, ticketing platforms, airlines, ride share services, etc.

PROPRIETOR PORTAL: An access point for a proprietor to enter the system and/or platform typically displayed in a browser.

RECORD: Information that is stored in an electronic or other intangible medium without limitations on how the data is structured.

REDIRECT/IDENTIFICATION SERVER: The server within the system that makes a determination on if a user and/or user device that has entered the system is unique, by locating the manifest stored on a user device and if a manifest exists, associating the unique ID stored in the manifest on the user device with the database of known unique ID's stored on the redirect/identification server, or for confirming other data based on one or more requests to the redirect/identification server.

REDIRECT URL: An address generated by a server, such as the redirect/identification server or the interface server, in response to an incoming request that points the browser on a user device to a different target.

RESOURCE RECORD: A database record associated with a tag ID.

REQUEST: A message sent by one device to another (e.g., phone to server, server to server, computer to server, server to database, etc.) using an address to send the request. For example, upon selecting from the options available in the Web browser, the selection is coded into a request that the Web browser sends to the server via an address. The request typically provides instructions to the server. Non-limiting examples of a request can be—GET, POST, PUT, DELETE, CONNECT, OPTIONS.

RULE: A set of conditional statements that tells the system how to react to a particular situation. Rules can be preprogramed into the system or can be set or changed by an administrator or proprietor.

SYSTEM: The network, tags, platform, etc.

TAG: A physical (e.g., tangible) form, a digital (e.g., virtual/intangible) form, or may be combinations of both forms that contains an MRC. Physical versions of tags may be constructed from diverse types of materials. The MRC may be printed, etched, or fabricated onto the tag materials such as paper, glass, plastic, metal, fabric, and the like as a few nonlimiting examples. In the case of tags that contain MRC's that are NFC or RFID, the tags may be adhered to, attached to, embedded in, or fabricated on (or combinations thereof) a natural or manmade material such as metal (e.g., aluminum, stainless steel), wood, polymer (e.g., plastic), film, glass, and combinations thereof. The material may then be incorporated into or affixed (e.g., adhesive or other form of attachment) to an object or location. A tag may be printed on a single or multiple use badge or ticket. Digital tags may include LED/LCD screens or a designated location within a video stream in which the MRC is located.

TAG ID: A unique identifier for the MRC affixed to the tag. The unique identifier can be any combination of letters, numbers, and symbols. The tag ID is stored in a database on a server and is coded with information specific to the location of the tag. For example, the tag ID might generally identify the geographic location of the tag (i.e., the United States, Pennsylvania and/or Philadelphia), the general venue location of the tag (i.e., Fenway Park, Madison Square Garden, Carnegie Hall, The Natural History Museum), the specific location of the tag within the venue (i.e., Section A, Row 1, Seat 10, next to Van Gogh's "Starry Night"), or any combination of information.

TAG URL: A unique address assigned to the MRC on each tag that may optionally include the tag ID.

TARGET: A Web page, file, address, GUI, web app, progressive web app, portal, content or digital offer delivered to a user device. Those skilled in the art may also refer to a target as an endpoint.

TARGET DETERMINATION PROCESS: The process described in FIG. 5.

TARGET ID: A unique identifier for the Target. The unique identifier can be any combination of letters, numbers and/or symbols that can be stored in a database, on a server, and/or both. The target ID allows the platform to distinguish one target from another.

TICKETING PLATFORM: Both the primary ticketing platform and the secondary ticketing platform.

TRIGGER: The magnitude or condition that must be reached for a certain result to manifest. Triggers can be determined either by the system, an administrator or a proprietor. Non-limiting examples of a trigger can be the start or end of an event, something of significance that occurs during the event (i.e., the $10^{th}$ goal scored, the first encore by a musical act), a single user completing a certain task, or N-number of users completing a task.

TOKEN: A digital asset that is stored securely on the blockchain, representing a tradeable asset.

TOOLS: Cookies, pixels, widgets, plug-ins, etc.

UNIQUE ID: A unique identifier for the user device. The unique identifier can be any combination of letters, numbers and/or symbols, cookies, digital credentials or it can be a digital certificate such as TLS, SSL, code signing certificate, client certificate, etc. . . . . The unique ID can be stored on the user device in any location on the user device such as the manifest, local storage or digital wallet, in a database on a server, and/or both, and is used to associate the user device with the unique user record stored in a database on a server in the system.

UNIQUE IDENTIFYING INFORMATION: Personal information and demographics collected about a particular user's such as name, address, phone number, e-mail address, credit card information, gender, marital status, academic affiliation (student, faculty, alumni), driver's license number, age, username, password, pin number, social security number, bank account number, salary, etc.

USER DEVICE: Any type of mobile processing device such as a handheld computer (e.g., phone, smartphone, tablet, personal digital assistant), wearable computer (e.g., smart watch, smart glasses), portable computers (e.g., laptop, netbooks, Chromebook), or wearable or implantable device, and the like using wireless communication, a camera or other connectivity element.

USER/DEVICE ID RECORD: A record stored within a database on a server that contains the unique ID and unique identifying information associated with that unique ID for each user that accesses the system. The user/device record can contain an unlimited amount of information about the user device and presumably the user who owns the user device such as, but not limited to demographics, a history of events attended, digital offers used, gambling wagers made, NFTs minted or purchased, venues or locations visited, concession or merchandise purchases, donations made, incident reports, tags scanned, other actions taken, etc.

VENUE: Any physical location with defined perimeters and parameters such as a stadium, arena, court, track, concert hall, theatre, course, museum, restaurant, place of worship (church, synagogue, temple, mosque, etc.), historical site, cultural site, amusement park, zoo, aquarium, conference center or any other place where events are held or users gather. Venues can also be hotel rooms, cruise ships, trains, airplanes, schools (elementary, middle or high school) or a college campus or dorm.

WEB APP: Executable code that is stored on a remote server and delivered via the system or a network to a browser interface on a user device. The web app may facilitate communication between the user device and one or more servers such as the redirect/identification server or the interface server.

The embodiments detailed herein specifically detail systems and methods for generating content by accessing a machine-readable code ("MRC"). In particular, preferred embodiments allow for real time ticket exchanges and upgrades, and wherein the system utilizes a unique ID or certificate to identify a user device within the system. These advantages allow for novel and unique opportunities that are not possible in the prior art.

A high-level overview of an exemplary system (10) is shown in FIG. 1. The system (10) may include an administrator device (12), a platform (20), a user device (14a) associated with an event user (e.g., physically at the event/in the venue), a user device (14b) associated with a remote user (e.g., not necessarily at the event/in the venue), a plurality of tags (16a, 16b) and one or more networks (18). Generally, each user device (14a, 14b) may be used to scan, read, or otherwise detect (collectively "scan") machine-readable code ("MRC") (17a, 17b) associated with a respective tag (16a, 16b). The act of scanning a tag (16a, 16b)/MRC (17a, 17b) initiates communications between the user device (14a, 14b) that scanned the tag (16a, 16b) and the platform (20), which may result in the rendering of a Web page or the like (e.g., related to the event) by a Web browser and/or other application running on the user device (14a, 14b). Communications between user devices (14a, 14b) and platform (20) is typically via one or more networks (18), which may include, without limitation, the Internet, mobile networks, cloud-based platforms, or combinations thereof.

A proprietor may use a network of encoded tags (16a, 16b) to identify points of interest (e.g., locations, objects, people, etc.). The number of tags (16a, 16b) in the network and placement of tags on, in, or near points of interest is at the discretion of the proprietor to fit its particular assets and needs. Further, a proprietor may add to or subtract from the number of tags (16a, 16b) in the network at will. Thus, the number of tags (16a, 16b) in a proprietor's network may be dynamic, either more or less than an original network of tags. Each tag (16a, 16b) in the network of tags has a unique identifier (tag ID), which may be used to identify a particular point of interest. For example, a tag (16a, 16b) may be situated on or near a seat in a stadium, and the user who purchased a ticket to sit in that seat is the "limited owner" or renter of that seat for a particular event. In certain embodiments, it may be possible to have multiple copies of the same tag, each with the same tag ID, in locations where multiple scans would be desirable at the same time by multiple users. Thus, at the entrance to a stadium, a plurality of tags could be located at different entrance points, each having the same tag ID.

As is implied in FIG. 1, a certain number of tags (16a) may be present at the venue ("in-venue tag"), and additional one or more tags (16b) may be remote from the venue ("remote tag") where the MRC (17b) is displayed in/on a video transmission, signal, or the like, or on a Web page associated with the event, venue, and/or television network, as a few non-limiting examples. Of course, there is the possibility that a user at the event/in the venue scans the remote tag (16b) with his/her user device (14a). Each user device (14a, 14b) may also include, or may eventually include, a unique identifier (22a, 22b) to uniquely identify the user device (14a, 14b) and a digital wallet (24a, 24b) to securely store sensitive information such as a driver's licenses, account information (e.g., banks, crypto currencies, credit cards), titles, tokens, tickets, vouchers, coupons, and the like.

The proprietor may also access platform (20), albeit via the administrator device (12) and one or more networks (18). The administrator device may be located at the venue, or it may be at a location remote from the venue. Generally, the proprietor may access a proprietor portal (FIG. 3 at) [322]) hosted by platform (20) to perform administrative and/or other activities such as determining what content (or other) will be sent to the user device (14a, 14b) in response to scanning a tag (16a, 16b).

In addition to hosting the proprietor portal, platform (20) may host a variety of other services including, without limitation, event user and remote user access to content associated with the event, venue, proprietor, and the like. As such, platform (20) may include, or may include access to, one or more servers, databases, application programming interfaces (APIs), artificial intelligence/machine learning algorithms, other algorithms, code, blockchains, blockchain platforms, geofences, third-party integrations, times stamp, and more, which is detailed below, with reference to accompanying figures.

Figure 2:
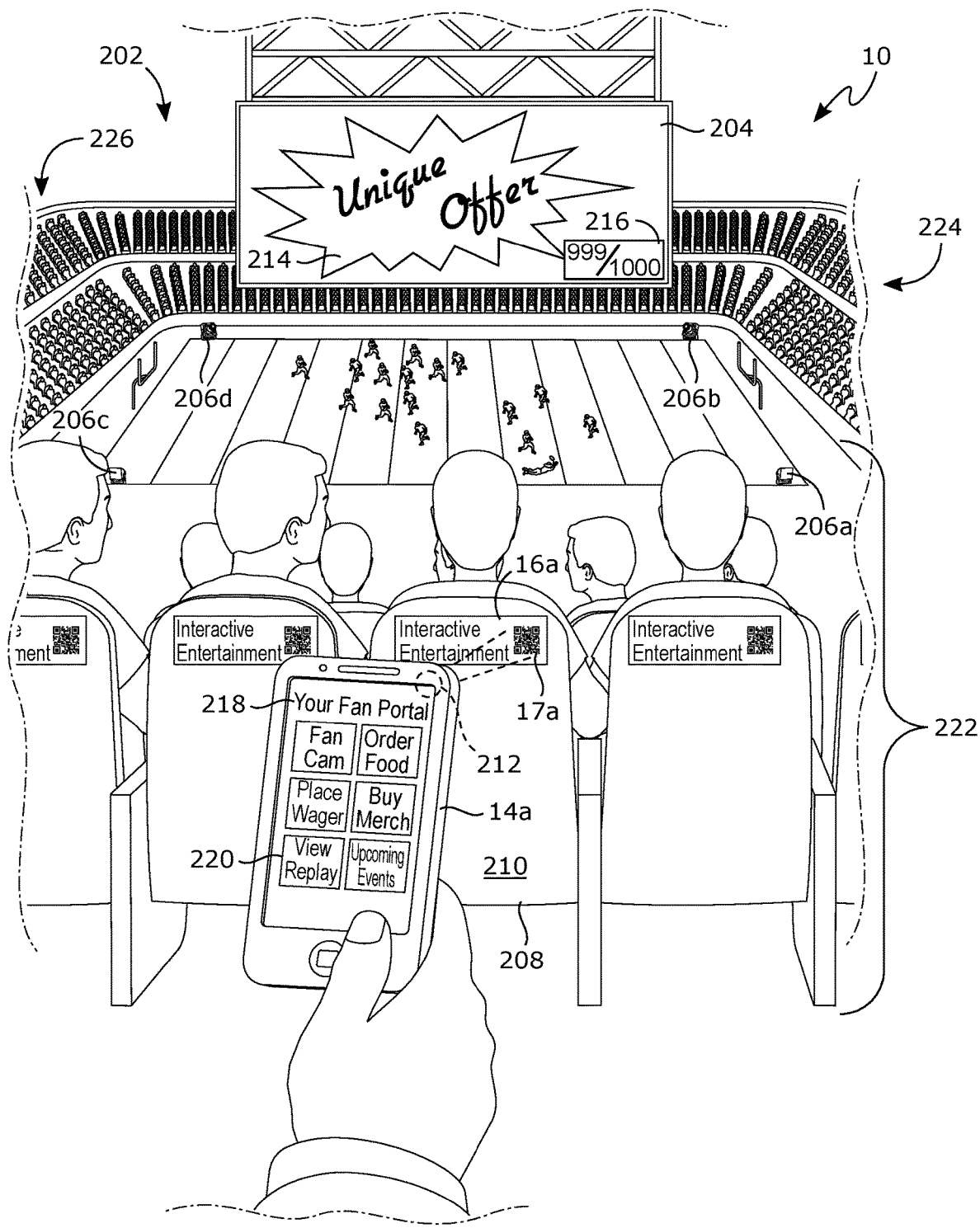
FIG. 2 depicts a stadium comprising a plurality of seats, rows, and sections and a user device that is accessing a user portal including an option for exchanging or upgrading seats.

FIG. 2 shows an exemplary venue (202), which includes a portion of system (10) shown in FIG. 1. In this case, the venue (202) is a football stadium including a jumbo screen (204), recording devices (206 a-d), seats (208), and a plurality of tags such as tag (16a). Although a stadium is shown, the venue (202) can be any venue: small, large, indoor, outdoor, permanent, temporary, one structure, several structures, an entire city, and variations thereof. Thus, a venue (202) can be any area or space occupied by or intended for something, and as such associated amenities and accoutrements may drastically vary from venue to venue. In this example, the stadium has jumbo screen (204), which may display a wide variety of video content as is customary for a football game, though such display screen is not necessary for functionality of the system. The stadium also includes optional recording devices (206 *a-d*) such as video cameras for recording the football game and other activity, which is also customary for this type of venue (202). Likewise, an event may be any event including sporting events, artistic performances, trade shows, conferences, ceremonies, services, self-guided tours (e.g., at museums, historic sites), and zoos as a few non-limiting examples. Notably, museums, historic sites, zoos, and similar examples may be both the venue and the event or house the event.

In the example of FIG. 2, each seat (208) has a seatback (210) with a tag (e.g., 16*a*) disposed thereon. In this way, event users can easily see a tag (e.g., 16*a*) directly in front of them while they are sitting in their seats (208). Thus, the tag (e.g., 16*a*) that the event user sees is associated with the seat (208) in which the user is sitting. Tag association with a particular seat (208) is desirable in embodiments that take advantage of knowing the event user's seat location such as for food or merchandise delivery directly to the seat (208), as non-limiting examples. In-venue tags (e.g., 16*a*), however, are not limited to being positioned on seatbacks (210); they may be placed in a wide variety of locations within a venue (202). For example, if in-venue tags (16*a*) are associated with particular seats (208), they may be placed in any other location on or near the associated seat (208) such as an arm rest, a cup holder, on the seat (208) next to the event user's leg, on the ground, or on a structure near the seat (208) such as a wall, a pillar, or the like. It should be noted that in-venue tags (16*a*) may be associated with other locations/points of interest, and thus may be placed at or near the locations/points of interest such as entrances, levels, sections, isles, loge seats, individual people (e.g., with a tagged badge, tagged ticket, or the like), restrooms, various additional possibilities, or combinations thereof. Therefore, while one example of in-venue tag (16*a*) placement is illustrated in FIG. 2, in-venue tag (16*a*) placement should be broadly construed to include any placement suitable for use as described herein. Tags (16*a*) may be associated with one or more groupings, for example, by a section, (222, 224, or 226), wherein grouping of tags (16*a*) may provide certain benefits in the various embodiments detailed herein. Alternative placement schemes that may be devised by one skilled in the art, consistent with the teachings of the present invention, should be considered within the scope of the present disclosure.

As was mentioned with respect to FIG. 1, each tag (16*a*, 16*b*) in the system (10) has a machine-readable code (17*a*, 17*b*) associated therewith. The term machine-readable code ("MRC") as used herein should be broadly construed to include "graphics" type codes such as quick response (QR) codes, universal product code (UPC), snapcodes, and/or any other type of machine-readable graphics (e.g., having a pattern, matrix, or the like) coding known in the art or later developed. Importantly, as used herein, the term machine-readable code/MRC should also be construed to include "chip" technologies that store data on a chip such as, without limitation, near-field communication (NFC) and radio-frequency identification (RFID) technologies, as is known in the art or is later developed. Thus, MRC can be read, scanned, detected or otherwise decoded (collectively, "scanned") by an appropriately enabled (e.g., camera, QR scanner, and/or NFC reader) [212]) user device (14*a*, 14*b*).

In-venue tags (16*a*) may be physical (e.g., tangible), digital (e.g., virtual/intangible), or combinations of both forms. Physical tags may be constructed from diverse types of materials. In the case of tags having one or more graphical/matrix type codes such as QR codes, barcodes, and the like, the code may be printed, etched, fabricated, or the like on materials such as paper, glass, plastic, metal, fabric, and the like, as a few nonlimiting examples. In the case of NFC/RFID enabled tags, chips/antennae may be adhered to, attached to, embedded in, or fabricated on (or combinations thereof) a natural or manufactured material such as metal (e.g., aluminum, stainless steel), semiconductor, wood, polymer (e.g., plastic), film, glass, and combinations thereof, without limitation. The material may be incorporated into or affixed (e.g., adhesive, or other form of attachment) where desired. Digital tags may be displayed on a screen or communicated via radio waves. In the case of QR codes, barcodes, and the like, the graphical code may be displayed on a display screen such as the jumbo screen (204) or a display screen associated with the event user's seat (208), other locations/point of interest, or combinations thereof. Thus, the in-venue tag (16*a*) may be a video display, such as LCD, LED, e-ink, or other visual display and/or text accompanying the MRC (17*a*). In fact, most, if not all, remote tags (16*b*) will be a display screen such as on a television screen, computer screen, appliance screen, and the like, having the MRC (e.g., 17*b*) displayed thereon, or text on the display screen identifying the MRC (17*b*), although embodiments are not limited thereto.

Information encoded on or in each tag in the system (10) may include an address to direct a request (e.g., for a Web page) from the user device (14*a*, 14*b*) to a server or the like on the network (18) such as a server on platform (20). The address may be in the form of a uniform resource identifier (URI) such as a uniform resource locator (URL), according to a non-limiting embodiment. In this way, when the user scans the tag (16*a*, 16*b*) with the user device (14*a*, 14*b*), the user device (14*a*, 14*b*) sends a request to the appropriate network (18) location. In the example shown in FIG. 3, when the event user uses his/her user device (14*a*) to scan tag (16*a*), the event user device (14*a*) obtains an address from the MRC (17*a*) associated with the scanned tag (16*a*) and sends a request via the network (18) to the address destination. As one example, the address is a URL that causes the event user device (14*a*) to send a request to a redirect/identification server (302), on platform (20), which receives the request. Similarly, when the remote user uses his/her user device (14*b*) to scan the MRC (17*b*) on a screen (304), a similar URL is obtained which causes the request from the remote user device (14*b*) to be sent to the redirect/identification server (302), which receives the request.

In a typical embodiment, each tag (16*a*, 16*b*) in the plurality has a unique tag identification number (i.e., "tag ID"), which may be appended to the URI/URL, although embodiments are not so limited. The tag ID may be used by the platform (20) for several reasons, one of which is to identify a point of interest/location associated with the tag (14*a*, 14*b*) via a tag ID lookup. For example, when a request comes from the event user device (14*a*), the platform (20) knows that the request came from within the venue (202) and is associated with the seat (208) in which the event user is sitting. And when the request comes from the remote user device (14*b*), the platform (20) knows that the request is in response to scanning a tag (e.g., 16*b*/MRC 17*b*) in transmission, on a Web page, or the like, and the platform (20) knows which transmission/Web page is associated with the scanned tag (16*b*). In an embodiment, the tag ID may be appended to the URL (or URI) such as by one or more parameters, pattern matching techniques, or other such mechanism for encoding information in a URI, URL and/or browser request.

Figure 3:
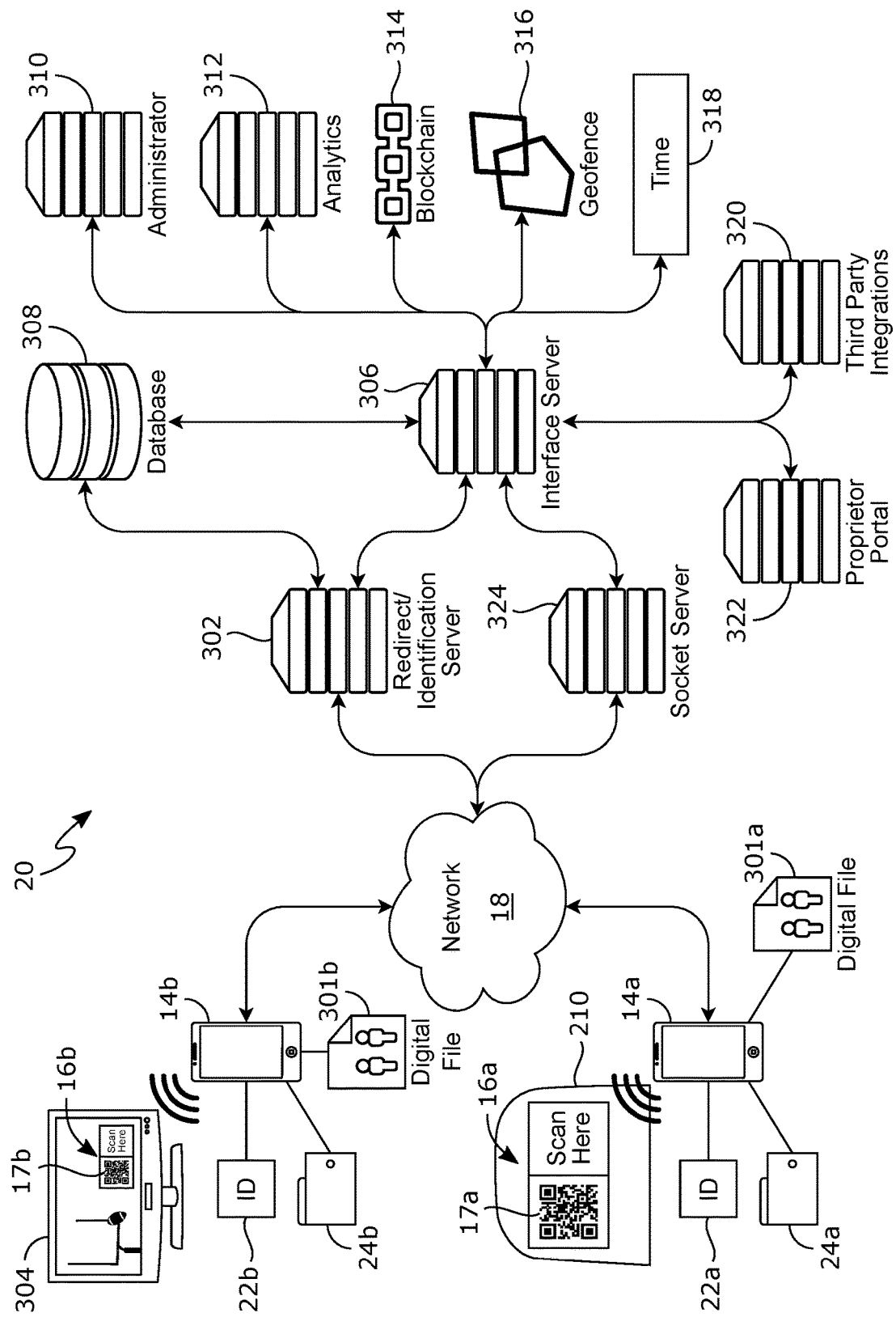
FIG. 3 depicts an embodiment of a system for accessing target information from a user device from within a venue or outside of a venue and various back-end platforms for implementing certain target information or for delivering content to the user device.

FIG. 3 details an exemplary infrastructure that may be used by platform (20) although infrastructures are not limited thereto. This infrastructure may include the redirect/identification server (302), an interface server (306), a database (308), an administration server (310), containing an administration software tool, an analytics server (312), a blockchain, access to a blockchain, or both (314), a geofence (316) a timestamp (318), one or more third-party integrations (320), the proprietor portal (322), and a socket server (324). Generally, user device (14a, 14b) communicates with the platform (20) via redirect/identification server (302) as was previously described. Redirect/identification server (302), accept requests from user devices (14a, 14b), sends responses to user devices (14a, 14b), and performs various other methods as described herein. As one non-limiting example, the redirect/identification server (302) may forward information (e.g., URLs, parameters, etc.) from user device (14a, 14b) requests to the interface server (306). The interface server (306) manages most, if not all the tasks involved with processing requests, such as handing off/directing tasks, functions, calls, and the like where needed. The interface server (306) may also return request responses to the redirect/identification server (302). If a request came from a user device (14a or 14b), then the redirect/identification server (302) forwards the response to the requesting user device (14a or 14b). Examples of tasks, functions, calls, and the like that the interface server (306) may hand off include, without limitation, database (308)/blockchain storage, lookups, etc., administrative and back-end tasks/functions to the administration server (310), analytical tasks/functions to the analytics server (312), geolocation tasks/functions (316), time/timestamps (318), API calls to third-party servers for third-party integrations (320) and establishing socket connections via socket server (324).

Module #1: Purchasing a Ticket

Figure 6B:
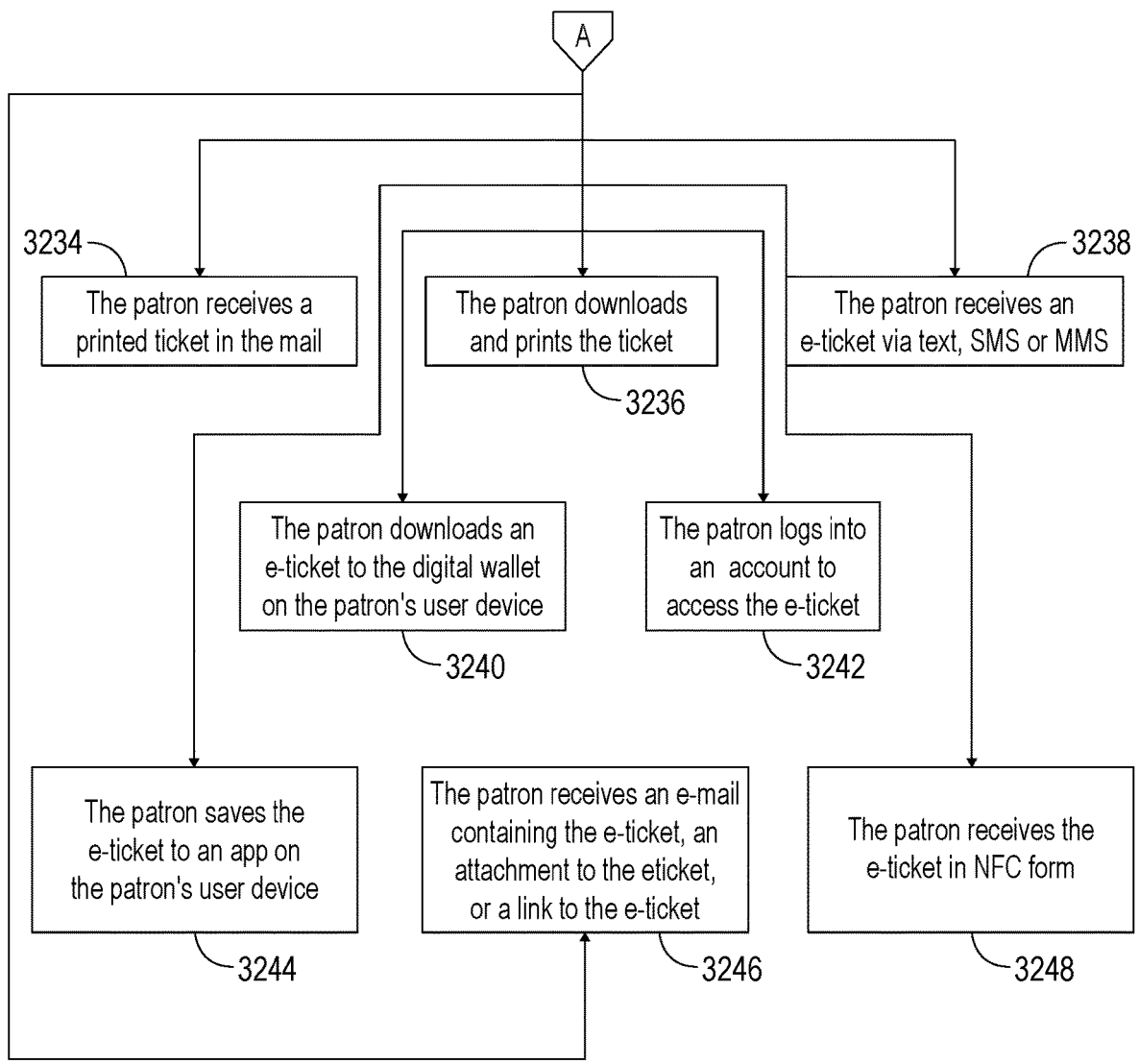

Every embodiment described herein begins with a patron purchasing a ticket to an event. As shown in FIG. 6A and FIG. 6B, starting at 3200, a venue puts tickets on sale for a particular event. A patron interested in purchasing tickets to the event accesses the available tickets through the venue's primary ticketing platform (3202) such as Ticketmaster® or TicketLeap® or through a third-party resale platform (3204) such as StubHub®. The patron selects his desired seats via conventional software utilized by the primary ticketing platform or third-party resale platform (3206). Next, the patron initiates the transaction (3208). If the transaction is via a primary ticketing platform, the primary ticketing platform collects unique identifying information from the patron (3210). Non-limiting examples of unique identifying information includes: name, cell phone number, e-mail address, mailing address, credit card information, and the like. The primary ticketing platform stores the unique identifying information in a database on the primary ticketing platform server (3212), which is remote from the platform (20).

Returning to (3208), if the patron initiates the transaction through a third-party resale platform, the third-party resale platform collects unique-identifying information from the patron (3214) and the third-party resale platform stores the patron's unique identifying information in a database on the third-party resale platform server (3216), which is remote from the platform (20).

After the unique identifying information is collected and stored at (3212) or (3216), the patron completes the transaction (3218) to purchase the tickets. If utilizing a primary ticketing platform, the primary ticketing platform assigns a unique identifying ticket code such as, but not limited to a bar code, QR code or NFC code, that is unique to that patron's purchased seat for the particular event (3220). The primary ticketing platform stores the unique identifying ticket code in the primary ticketing platform database on the primary ticketing platform server (3222). The primary ticketing platform associates the unique identifying ticket code with the unique identifying information for the patron and stores this information on the primary ticketing platform server (3224).

Returning to 3218, if utilizing a third-party resale platform, the third-party resale platform assigns a unique identifying ticket code to the seat that is unique to that patron's purchased seat for the particular event (3226). The third-party resale platform stores the unique identifying ticket code in the third-party resale platform database on the third-party resale platform server (3228). The third-party resale platform associates the unique identifying ticket code with the unique identifying information for the patron and stores this information on the third-party resale platform server (3230).

Regardless of whether the purchase is made through a primary ticketing platform or a third-party resale platform, once the transaction is complete, the tickets are delivered to the patron (3232). The tickets can be delivered in a number of different ways such as (i) the patron receives a printed ticket in the mail (3234), (ii) the patron downloads and prints the ticket (3236), (iii) the patron receives an e-ticket via text, SMS or MMS (3238), (iv) the patron downloads an e-ticket to the digital wallet on the patron's user device (3240), (v) the patron logs into an account to access the e-ticket (3242), (vi) the patron saves the e-ticket to an app on the patron's user device (3244), (vii) the patron receives an e-mail containing the e-ticket, an attachment to the e-ticket, or a link to the e-ticket (3246), or (viii) the patron receives the e-ticket in its NFC form (3248).

Module #2: Attending the Event

Turning to FIG. 7, once the patron has purchased and received or downloaded a ticket as described in Module #1, the patron attends the event (3300). Typically, a venue employee scans the patron's ticket with the venue ticket scanning device (3302) that is on a network (18). The venue ticketing scanning device reads the unique identifying ticket code (3304), whether in paper or electronic format. The venue ticket scanning device communicates with the interface server (3306) and the interface server updates the system seat record database on the platform (20) to indicate that the ticket for a particular seat was scanned (3308).

Returning to (3304), once the venue ticket scanning device reads the unique identifying ticket code (3304), the venue ticket scanning device communicates with the ticketing platform server (3310) external to the platform (20). Next, the ticketing platform server queries the ticketing platform database and retrieves the record for the unique identifying ticket code associated with the patron's ticket (3312) and the ticketing platform server updates the record for the patron's unique identifying ticket code to indicate the patron has entered the venue (3314). Thus, within a database, the ticket is recorded as being used. Finally, the patron sits in the seat in the venue as indicated on the ticket (3316).

As shown in FIG. 7 when the patron attends the event at the venue (3300), sometimes the patron's ticket is not scanned (3318) and the patron simply enters the venue and the patron sits in the seat in the venue as indicated on the ticket (3316) with neither the records on the interface server, nor the ticketing platform server being updated.

Module #3: Accessing the System

Figure 4:
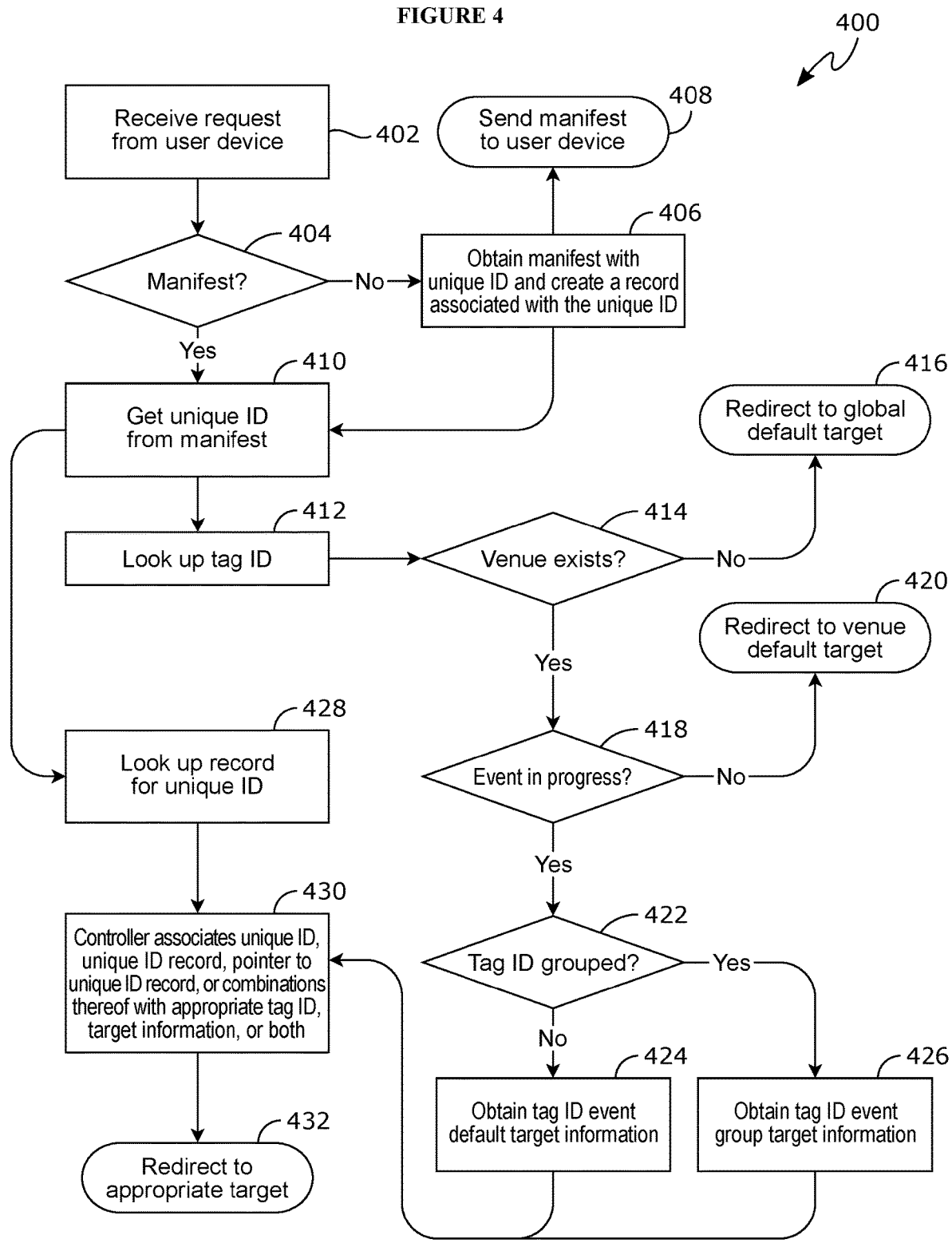
FIG. 4 depicts an embodiment of a system for identifying and using information particular to a user device and/or to a tag for directing the user device to an appropriate target.

Upon sitting in his seat, the patron accesses the system by scanning the tag on his seat (16a) with the patron's user device (14a). Referring to FIGS. 3 and 4 together and using the request from the patron's user device (14a) as an example, a method (400) may begin with the redirect/identification server (302) receiving the request (step 402) from the patron's user device (14a). From there, the redirect/identification server (302) may check to see if the patron's user device (14a) has a manifest (containing the unique ID, or just the unique ID alone) loaded thereon (step 404). If no, the redirect/identification server (302) may obtain a manifest and assign a unique ID (e.g., from database [308]) for the patron's user device (14a, step 406). The manifest includes a unique ID to identify the event user device (14a) with an identifier that is not shared with any other user device (e.g., 14b). The redirect/identification server (302) will also cause the unique ID for the patron's user device (14a) to be stored in a database such, as database (308), as is appropriate for the database management system (step 406). As used herein, the term "record" refers to information that is stored in an electronic or other intangible medium without limitations on how the data is structured. A record may include and/or point to related data. For example, a record for a unique ID may include the unique ID and any other data related thereto, which may be stored in database (308) or other appropriate data storage. After obtaining the manifest and/or the unique ID, the redirect/identification server (302) may then send the manifest together with the unique ID to the patron's user device (14a, step 408), which may be maintained on the patron's user device (14a) in a digital wallet, other secure repository, or both. At step (410), the redirect/identification server (302) may maintain a copy of the unique ID for further use in the method (400), other methods described herein, or both. If the patron's user device (14a) already has a manifest (step 404, yes), the redirect/identification server (302) obtains the unique ID from the manifest (step 410). In an embodiment, the redirect/identification server (302) may also obtain data such as current time, date, location, etc. from the patron's user device (14a), manifest, request, or combinations thereof at step (410).

In an embodiment, the redirect/identification server (302) may pass information needed to further method (400). For example, the tag ID may be passed to the interface server (306) for a tag ID lookup (step 412), such as in database (308), the administration server (310) and/or any other suitable database or server. In this instance, the redirect/identification server (302) obtained the tag ID from the request made by the patron's user device (14a). In an embodiment, the tag ID is appended to the URL, and thus the entire URL, or a portion thereof, may be passed to the interface server (306) for use in looking up the tag ID. Looking up the tag ID provides information about the venue (202) and/or event. To clarify, when a particular venue (202) installs tags (16a) and/or uses tags (16b), the tag IDs for the installed/used tags (16a, 16b) are associated with the point/location of interest and the particular venue (202). Thus, if a tag is installed proximate seat 1, row A, section 100, database (308) information associates the installed tag's (16a) tag ID and that particular seat (208), which is in that particular venue (202). Since the tag ID is known to belong to a particular venue (202), the interface server (306), the administration server (310) via the interface server (306), any other suitable server, or combinations thereof makes a series of determinations using the tag ID, which was received in response to a request from a user device (14a, 14b) prompted by scanning the tag (16a, 16b). One determination is if the venue (202) is actively implementing platform (20) services (step 414). For example, the venue (202) may have tags (16a) installed but it is no longer using the tags (16a), or it is not using the tags for a particular event. If not, the patron's user device (14a) is redirected to a global default target (step 416) that may inform the patron that the services are no longer available, are temporarily out of service, or the like. If the venue (202) is actively implementing platform (20) services, the method (400) may make another determination. At step (418), the method (400) may determine if a particular event is currently (or soon to be) in progress, or recently ended. In an embodiment, an event may be determined to be in progress based on the time that the event is scheduled to begin. Since many venues (202) open before the actual event begins, and close after the actual event ends, the window set for an event to be in progress may encompass a given amount of time before and after the actual activity begins/ends. In an embodiment, the time that the "event in progress" determination is made (step 418) may be recorded to serve as a timestamp to approximate the time that the patron's user device (14a) scanned the tag (16a). In other words, the unique ID, tag ID, and time determination may be recorded for later use, in certain embodiments. If the event is not in progress, the patron's user device (14a) may be redirected to a venue default target (step 420) such as a Web page for the venue, or another Web page such as a page to identify that an incident has occurred at the venue (202) at the location/point of interest in which the tag (16a) was scanned. Incidents may encompass any sort of incident such as a need for something to be cleaned up to calling emergency services.

If the event is in progress, the method (400) may also determine if the tag ID belongs to a grouping of tag IDs (step 422). Tags (16a, 16b) may be grouped for many reasons and in many different ways. Tags (16a, 16b) may also belong to more than one group. As one non-limiting example, in the stadium of FIG. 2, the tags (16a) may be grouped by seating type or section (e.g., FIG. 2, 222, 224, or 226), e.g., VIP seats may belong to one group, loge seats to another group, and discount/student seats may belong to yet another group. If data associated with the tag ID indicates that the tag belongs to a group, the patron's user device (14a) may be redirected to a target for the particular group. Thus, the method (400) obtains the information it needs to enable redirection to the appropriate group target (step 426). If data associated with the tag ID indicates that the tag does not belong to a specific group, the event user device (14a) may be redirected to an event default target such as a standard Web page for the event. Thus, the method (400) obtains the information it needs to enable the redirection (step 424) to the default target for the event. In an embodiment, the information needed for redirection may include a URL for the target with parameters, values, patterns, or the like appended thereto such as a target ID to identify the target and the tag ID.

Method (400) may simultaneously process other data such as looking up one or more records associated with the unique ID (step 428). In embodiments, the platform (20) may gather information relating to user activities via the user device and unique ID. For example, the platform (20) may gather data relating to tags that the user has scanned in the past (across a variety of different events, venues, or the like) and activities associated with those tag scans (e.g., purchases made, content looked at, coupons downloaded), although embodiments are not limited thereto. This data may be stored in association with the unique ID assigned to the patron's user device (14a). Thereafter, a controller may associate the unique ID, its record, its record location or the like with the tag ID, target ID, a URL, any other determined information, or combinations thereof (step 430). The patron's user device (14a) may then be redirected to the appropriate target that has been determined for the patron's user device (14a).

In an embodiment, the user device (14a, 14b) may receive a redirect URL from the redirect/identification server (302) at the end of method (400) to redirect the user device (14a, 14b) to the appropriate target. For instance, the method (400) may return a target ID to identify the particular target. The target ID, tag ID, unique ID (and/or information associated therewith), or combinations thereof may be appended to the redirect URL for the target, which is sent to the requesting user device (14a, 14b). The requesting user device (14a, 14b) then uses the redirect URL to send a new request, this time for the target, which is received by the redirect/identification server (302) and is forwarded to the interface server (306) for processing. Alternatively, the target ID, tag ID, and unique ID may be used by the platform (20) without sending a redirect URL to the requesting device at the end of method (400). Regardless of the forgoing, the requesting user device (14a and/or 14b) receives the target of the redirection whatever that target may be. For example, a target may be a static Web page, a dynamic Web page, an application delivered by way of one or more Web pages, files, data, information, or combinations thereof. As one non-limiting example, the GUI (218), such as a fan portal or ticket exchange/swap portal may have been the target identified by the target ID, and it may include application code "wrapped" or embedded in in an HTML document. Application code includes, but is not limited to, Web application code, progressive Web application code, cloud-based application code, native application code, native mobile application code, other such code, or combinations thereof. The HTML document (and cascading style sheet, etc.) generally determines the format/layout of what the user sees as is known in the art.

Furthermore, targets are not necessarily static. In fact, the same tag (e.g., 16a) may cause a user device (e.g., 14a) to be redirected to distinct targets depending upon when the particular tag (16a) is scanned. For example, a venue (202) hosts many events over the course of a season, year, decade, etc. Each event may have its own target as the individual events are distinct. A single tag (16a) may be used by a proprietor to redirect a user device (14a, 14b) to any desired target. Thus, the target to which the user device (14a) is redirected may be changed from game-to-game.

At any time during the event, the jumbo screen (204) may display a hidden "unique offer" (214) that informs patrons of an opportunity to exchange/swap seats. This opportunity may only be available for example to the first 1,000 users who respond to the "unique offer" (214) after it is displayed on the jumbo screen (204) by scanning a tag (16a) or the like. A countdown (216) on the jumbo screen (204) shows the number of event user devices (14a) that have claimed the "unique offer" (214). Another way a user may be able to respond to the "unique offer" (214) is by a pop-up window (e.g., in/over the GUI [218], such as a fan portal or ticket exchange/swap portal) or the like, which may be pushed via the socket server (324) in a non-limiting embodiment. Thus, the term "target" should be broadly construed although it may be described herein with respect to obtaining a GUI (218) such as a fan portal or ticket exchange/swap portal or other specific examples. One of ordinary skill in the art would understand a target of redirection as described herein may be a multitude of different targets with various purposes, designs, capabilities, and the like. Therefore, the target to which a particular tag (16a, 16b) is assigned, may be changed by simply changing the target identifier ("target ID") associated therewith.

There may be instances where the content delivered via the target may need to be changed, updated, altered, released, opened, or other such stipulations based on a rule and/or other conditions. The embodiments described herein largely function based upon rules. Rules may be defined to force a modification of content already delivered, deliver additional content, information, data, release content, and/or make other such changes as would be appreciated by one skilled in the art. In this non-limiting example, the target delivered at (432) FIG. 4 includes a Web application, such as a progressive Web application (PWA), that has a pull function, which may be rule-based. The pull function, as one non-limiting example, may be time based, requesting information to be pulled from the platform (20) via the interface server (306) every 10 seconds, minutes, N seconds, N minutes or the like. As another non-limiting example, the pull function has the ability to have data updated on a rolling basis. In the sporting world, this is common when updates are provided to the score of a game, the time left in a game, or both as non-limiting examples. The platform (20), however, may push rolling data to a user device (14a, 14b) instead of having it pulled from the platform. Pushed data may be sent to user devices (e.g., 14a, 14b) without being requested. Data may be pushed to a user device (14a, 14b) for any number of reasons, a few of which are detailed herein. Thus, information, data, etc., may be pushed to a user device (14a, 14b), pulled for a user device (14a, 14b) or both. In many instances, a Web application or the like may be based on a template having dynamic elements embedded therein. The contents of such dynamic elements may be altered via push techniques, pull techniques, or both. Content, data, information, and the like, may be pushed and/or pulled via a socket connect utilizing a socket server (324) or any other socket connection, communication connection, protocol, or combinations thereof as is available to the platform (20) under a set of given circumstances.

The method detailed in FIG. 5 may be invoked while the target of redirection (e.g., GUI [218] such as a ticket exchange/swap portal) is loading on the requesting user device (e.g., 14a and/or 14b), after the target is already loaded on the requesting user device (14a and/or 14b), or both. As with all methods detailed herein, steps in the method (500) may be used in whole or in part, in the order shown or a different order, be executed on one device or more than one device, be used in combination with some/all of the other methods described herein or as is known in the art, or combinations thereof.

Using GUI (218) such as a ticket exchange/swap portal as a non-limiting example while referring to FIG. 5, oftentimes it may be desired to alter information, regardless of type (e.g., video, images, instructions, etc.) while the patron is using the GUI (218) ticket exchange/swap portal. Information may be altered using push, pull, and other techniques, taking advantage of the communication connection (504). The communication connection (504), which may be a socket connection or any other appropriate type of connection, allows communications between the user device (14a and/or 14b) and the platform (20) via the one or more networks (18). A controller (at 506) may be a set of software code for managing, directing, or generally being in charge of one or more rules, enabling pushing and/or pulling of information per the rules. In this example, rules may be used to change content on the user device (14a and/or 14b). The interface server at (510) may be the same interface server shown in FIG. 3 (306), just at the data sources at (512) may be the same data sources shown in FIG. 3 such as database (308), administrator server (310), analytics server (312), blockchain (314), geofence (316), time (318), third party integrations (320), and proprietor portal (322), without limitation. Moreover, interface server at (510) may facilitate utilization of the forgoing, in the same manner or similar manner as described with respect to FIG. 3. Thus, in a sense, user device (14a or 14b), communication connection (504), interface server (510), and data sources (512) are shown in FIG. 5 just to help the reader visualize interactions detailed in FIG. 5.

Examples of rules that are detailed with respect to FIG. 5 include event rules and local rules, although embodiments are not so limited. Here, the metric or trigger of the rule can be monitored (step 516) such as by directly sending a request or query to a data source (at 512) via the interface server (at 510), receiving data from the data source (at 512) on a regular basis such as every 5 seconds, 5 minutes, or the like (via the interface sever [at 510]), or combinations of both. The platform (20) may monitor for the metric/trigger e.g., the release of a new seat for exchange/swap (step 520) and continue to do so (step 522) until a metric/trigger e.g., a new seat being released has occurred (step 520, yes). If the rule has been satisfied, the platform (20), can push the available seat to all of the qualifying user devices (i.e., that have scanned a tag [16a, 16b]).

A more complex event rule may include more than one trigger/metric. For example, the rule may be that if a new seat is available in the 100 level, push a notification of the available seat to all patrons in the 300 level that have used their user device (14a) to scan a tag (16a) in the venue (202). The first metric/trigger of whether a seat has been released is monitored as described above. The second metric/trigger may be monitored (at 518, 524) in the same or similar manner if the metric/trigger warrants, or it may be determined before or after the first trigger/metric has been satisfied. For example, since in this example the second metric/trigger relates to seat location of other patrons, a query may be sent to one or more data sources (at 512) to find all patrons with tickets in the 300 level. Records stored on database (308), for example, may be consulted to lookup data in connection with unique ID data to determine if the patron who has loaded the GUI (218) such as ticket exchange/swap portal on his/her device (14a) holds a ticket for the 300 level. As an alternative source of data or for any other reason, the interface server (at 510) may cause another data source (at 512) to be consulted to determine this information. For example, one or more third-party integrations (320) may have information; thus, an API call or other query may be made to the third-party integrations (320) to obtain data. As with the first example, if the first metric/trigger (step 520, no) is not met (i.e., ticket released), then the platform (20) continues to monitor the metric/trigger (step 522). If the metric/trigger (step 520, yes) has been met the platform (20) determines if the second metric/trigger (518) has also been met (step 524). Where the second trigger/metric has not been met (step 524, no) then the target on the user device (14a) is not updated (step 528), such as with the notification. Depending upon the rule, the second metric/trigger may continue to be monitored or not. For example, if the notification was to be sent only one time, then the rule is satisfied, and no additional monitoring is needed. If, however, the rule is to send the same notification every time a new seat is released, the second metric/trigger would not have to be redetermined. Going back to step (524), if the determination is yes, the notification may be pushed (526), such as via the controller (at 514, 506) to those users who have scanned a tag (16a) and who have a ticket for the 30 level. Pushed content may update an element, such as a dynamic element, on a Web page, cause a popup to show on the user device (14a, 14b), or any other way to push content as is known in the art.

As is also indicated in FIG. 5 at (508), the platform (20) may collect a large amount of data via user devices (14a, 14b). For example, after scanning a tag (16a, 16b) the platform (20) may receive data from the user device (14a, 14b) such as date, time, and GPS or other location, the device orientation (i.e., landscape, portrait), type (e.g., iPhone, Android), IP and other addresses, and operating system as a few examples. Thus, methods such as methods (400, 500, or both) may be configured to collect and aggregate data. Additionally, tools such as cookies, widgets, plug-ins, and similar tools may also be used to obtain data from user devices (14a, 14b). This, and other, information may be stored in a data source (at 512) such as database (308) or other data storage and in association with the unique ID. Data acquired using the aforementioned tools and other tools/techniques may relate to user engagement with a target such as a GUI or fan portal (218) as one non-limiting example. Such data may relate to digital offers presented to the user, digital offers downloaded by the user, products viewed by the user, purchases made by the user, to name a few examples. Such tools/techniques may also gather data relating to other user engagements such as total screen time, Internet browsing (times, sites/pages accessed, software used), updates to Web pages, other Web sites visited, the Internet, and the like. The user may also directly provide information via the user device (14a, 14b) such as by inputting personally identifiable information to obtain opportunities or offers such as unique information relating to user interests, user responses to questions, generic information about age or sex, or any other type of personally identifiable information. Such data is of high value to, for example, advertisers, proprietors, and the like, as it provides a large insight into consumer purchasing and Web browsing habits.

Data related to user devices (14a, 14b) may also be obtained from third party sources. As one example, when a query, request, or the like sent to a third party, the platform (20) may provide certain information with that query, request, etc., such as the unique ID, tag ID/target information, or combinations thereof. Thus, data returned by the third parties may also be stored (e.g., temporarily, or persistently) in association with unique IDs, tag IDs, target information, or combinations thereof. As one non-limiting example, service providers such as mobile/cellular providers may be queried to obtain information about user devices (14a, 14b). The unique ID identifying a particular user device may be sent to the service provider to obtain information about the particular device, or the service provider may provide information that may be later associated with a particular device. Either way, the platform (20) may collect and store information about users via the unique ID assigned to each user device (14a, 14b). As another non-limiting example, information associated with unique IDs assigned to user devices (14a, 14b) may be collected from various third-party integrations (320) such as in-venue/event metrics, integrated third-party metrics, ticket brokerage, and other tools, without limitation to the forgoing. In-venue/event metrics may include data collected relating to the venue, event, or both. For example, information relating to user purchases at the venue and/or during an event such as tickets, food, merchandise, and upgrades and the like may all be gathered and stored in association with the unique ID. Similarly, ticket brokerage integrations (e.g., 320) may be used to gather information from ticket brokers who sell tickets for the venue (202), event, or both, and may include a wide range of marketing data, not only about ticket purchases made, but also related information about the user. Thus, third-parties, including third party metrics integrations (320) may enable collecting information about users, user devices (14a, 14b), or both from third-parties including those who participate in a shared program or who sell or otherwise provide marketing information, demographics, and other data about the user.

In addition to collecting and storing data associated with unique ID, the platform (20) may analyze such data, which may or may not be recorded in association with unique IDs. Data analysis may occur while it is being collected, after it is collected and before it is stored, after storage, or combinations of the forgoing. Data, raw, analyzed, or both, may be stored in database (308) or another data store (at 512) such as blockchain (314), without limitation. The analytics server (312) may communicate with various aspects of the platform (20), to ensure data received from various sources is appropriately captured for decision making, analytics, and the like. That is, analytics server (312) may communicate with (either directly or via the interface server [306]), user devices (14a, 14b), third parties, third party integrations (320), time/timestamp (318), geofence (316), blockchain (314), database (308), even proprietor portal (322), or combinations thereof, so that data is captured as needed for desired analytics, decision making, and the like. For example, data may be subject to artificial intelligence analysis include machine learning/pattern recognition/deep learning as is now known or will be known in the art. Collected and/or analyzed data may be coupled with other information relating to the user/user device (14a, 14b), such as the unique ID associated with the user device (14a, 14b) for a variety of reasons, including content selection as one non-limiting example.

The forgoing has been described largely with reference to a sports environment where event users can scan tags (16a) located proximate each seat (208). Other environments may utilize the same sort of tag (16a) placement strategy, such as an artistic performance where tags (16a) may be placed proximate a seat.

Concerts and concert/festivals (collectively "concerts") may utilize the tags (16a) already in place at the venue (202) in which the concert is being held if the proprietor so allows; alternatively, concert proprietors may utilize a system that is not attached to the venue (202), or they may use both. As an example, concert proprietors may include tags (16a) separate from or integral with concert tickets, passes, credentials, or the like so users can scan (or click on if digital) the MRC (17a) to access the desired target. In an embodiment, the ticket, pass, credentials, or the like may be a badge or badge-like so that it can be attached to a lanyard, put in a wallet, etc. Lanyards may be distributed with the ticket, pass, credentials, etc., or they may be purchased.

Module #4: Verifying the Authenticity of the Seat

Figure 8A:
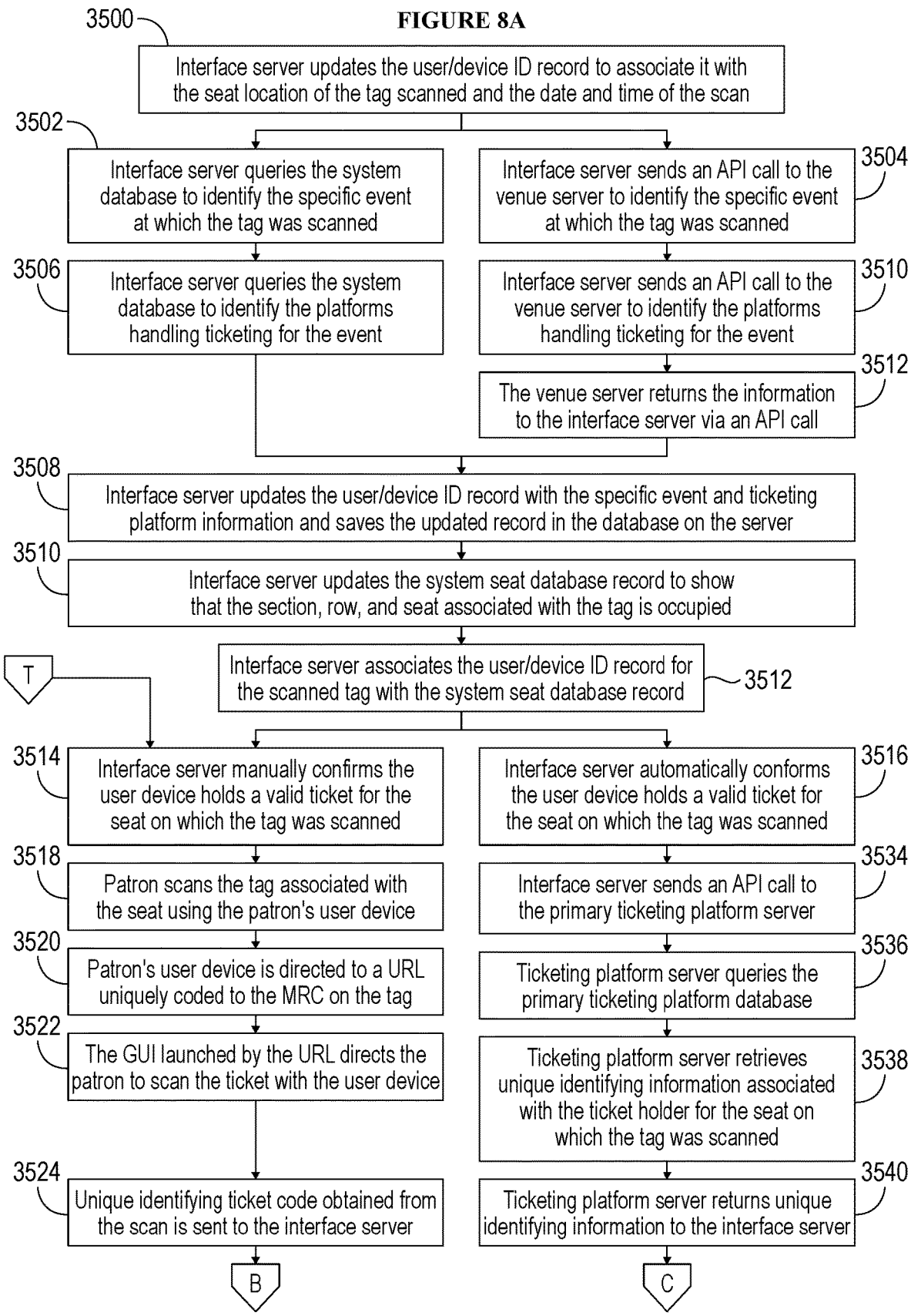

As shown in FIGS. 8A and 8B, the next step in the process is to verify that the user device that scans the tag and enters the system, holds a valid ticket for the seat associated with the tag scanned. The redirect/identification server updates the user/device ID record to associate it with the seat location of the tag scanned and the date and time of the scan (3500). Next, either the interface server queries the system event database or other appropriate databases to identify the specific event at which the tag was scanned (3502), or the interface server sends an API call to the venue server to identify the specific event at which the tag was scanned (3504).

Returning to (3502), if the interface server queries the system event database, next the interface server queries the system event database to identify the platforms handling ticketing for the event stored on the unique event record (3506). For example, the system would know that the tag was scanned at Lincoln Financial Field on Jun. 1, 2021, at 8:00 pm and so by querying the system event database to find the unique event record (150 from FIG. 12) for this date and time, the system identifies that the event is a Rolling Stones concert, the primary ticketing platform handling the event is Ticketmaster® and the third-party resale platform handling the event is StubHub®. The interface server then updates the user/device ID record stored in the system user record database, or other appropriate database, with the specific event and ticketing platform information and saves the updated record in the appropriate databases on the system server (3508).

Returning to (3504) if the interface server sends an API call to the venue server, or other appropriate server, to identify the specific event at which the tag was scanned, next the interface server sends an API call to the venue server which queries the venue event database to find the unique event record (150) which identifies the specific platforms handling ticketing for the event (3510). The venue server returns the information to the interface server via an API call (3512) and the interface server then updates the user/device ID record stored in the system user record database with the specific event and ticketing platform information and saves the updated record in the appropriate databases on the system server (3508).

Regardless of whether the event information was obtained by querying the system database at (3502) or making an API call at (3504), once the user/device ID record is update at (3508), next, the interface server updates the resource record to show that the section, row, and seat associated with the tag is occupied (3510).

Next, the interface server associates the user/device ID record of the user device that scanned the tag with the resource record (3512) for the tag ID. The interface server now has two options. Either the interface server manually confirms the user device holds a valid ticket for the seat on which the tag was scanned (3514) or the interface server automatically confirms the user device holds a valid ticket for the seat on which the tag was scanned (3516).

Module #4.A—Manual Verification

If the seat is verified manually at (3514), the patron scans the tag associated with the seat using the patron's user device (3518). The patron's user device is directed to a tag URL that is uniquely encoded to the MRC on the tag (3520). The interactive GUI launched by the tag URL, via the methods 400 and 500 directs the patron to scan his ticket (3522) or otherwise load the unique identifying ticket code associated with the seat into the GUI (i.e., enter the unique identifying ticket code manually via a keyboard or upload the digital ticket into the GUI). The unique identifying ticket code obtained from the scan is sent to the interface server (3524). The interface server queries the system seat record database and either confirms the seat was marked as scanned by the patron's user device (3526) or determines the seat was marked as not scanned by the patron's user device (3528). In the case of not scanned at (3528), the interface server updates the resource record in the system seat record database to scanned (3530). Now that the resource record is set to scanned at either (3526) or (3530), the interface server directs the interactive GUI, such as a ticket exchange/swap portal, to collect unique identifying information from the patron that was used to purchase the ticket from the ticketing platform such as name, e-mail address, cell phone number, credit card number, etc. (3532). The patron enters his unique identifying information into the GUI (3552) and the interface server updates the user/device ID record with the patron's unique identifying information and stores that record on the system user record database (3554).

Next, the interface server sends an API call to the primary ticketing platform server (3556), external to the platform (20) and the primary ticketing platform server queries the primary ticketing platform database (3558) for unique identifying information for the account holder associated with the unique ticket code assigned to the seat on which the tag was scanned and the primary ticketing platform server retrieves unique identifying information associated with the patron associated with the seat on which the tag was scanned (3560). The ticketing platform server, external to the platform (20), returns the unique identifying information to the interface server (3562) within the platform (20). Once the system has received the unique identifying information from the ticketing platform server, the interface server compares the unique identifying information retrieved from the ticketing platform database with the unique identifying information from the user/device ID record stored on the system user record database (3564). Here, the system has compared the unique identifying information known to the platform (20) with the unique identifying information known independent from the platform.

If the unique identifying information does not match (3566), the interface server marks the seat as unverified but occupied in the system seat record database (3568) and the patron is unable to proceed to with any of the embodiments discussed below, to the extent that they require verification. If the unique identifying information does match (3570) then the redirect/identification server, or other appropriate server, marks the seat as verified in the system seat record database (3572), on the platform, and the interface server directs the user device to a redirect URL, which in one non-limiting embodiment launches a GUI such as ticket exchange/swap portal, that is uniquely coded to the tag ID (3574) and the patron is able to access the embodiments discussed below.

In a non-limiting example of Module #4.A, John has purchased tickets to see the Rolling Stones concert held at Lincoln Financial Field on Jun. 1, 2021, at 8:00 pm through Ticketmaster®. John's ticket is for Section 100, Row A, Seat 10. He purchased the tickets using his credit card and provided Ticketmaster® with his e-mail address and cellphone number as part of the transaction. John attends the concert using a printed paper ticket containing a unique identifying ticket code in the form of a QR code. When John enters the venue, a venue employee scans John's ticket with the venue ticket scanning device which updates both the platform's interface server seat record database and optionally, the external ticketing platform server database to indicate that the ticket sold for that particular seat was scanned. John sits in his seat and scans the tag on his seat with his user device. Via method 400, the redirect/identification server determines that John's user device has accessed the system before and associates John's user/device ID record with the tag ID and resource record for the tag he scanned. The system then queries the system event database, within the platform (20) or sends an API call to the venue event database, external to the platform, via the venue server and determines that because John scanned the tag on his seat located within Lincoln Financial Field at 7:45 pm on Jun. 1, 2021, the event must be the Rolling Stones concert, via method 400. The system then updates John's user/device ID record to indicate his device is currently at the Rolling Stones concert and the primary ticketing platform for this event is Ticketmaster®. Next the system updates the resource record in the system seat record database, on the platform, to show that Section 100, Row A, Seat 10 is occupied and associates John's user/device ID record with the resource record for Section 100, Row A, Seat 10.

In this Module #4.A, the authenticity of John's right to occupy Section 100, Row A, Seat 10 is verified manually. John scans the tag on his seat to launch an interactive GUI, such as a ticket/exchange portal that directs John to scan his ticket. The system confirms that this seat was previously marked as occupied in the resource record. The GUI then directs John to enter unique identifying information. In this example, John enters that his e-mail address is john.doe@email.com, his cell phone number is 987.654.3210 and he purchased the ticket using a Visa® card ending in 1234. The system updates John's user/device ID record, on the platform (20), with this information and sends an API call to the Ticketmaster® database to retrieve unique identifying information for the purchase of Section 100, Row A, Seat 10 for the Rolling Stones concert on Jun. 1, 2021, at 8:00 at Lincoln Financial Field. Ticketmaster® returns that the ticket was purchased by a patron using the e-mail address john.doe@email.com and a Visa® card ending in 1234. Because the two sets of unique identifying information match, the platform sends a unique redirect URL to John's user device and John is permitted to access the system to utilize one of the embodiments described below.

Module #4.B—Automatic Verification

Returning to (3516), if the interface server is automatically confirming the user device holds a valid ticket for the tag scanned, the platform's interface server sends an API call to the primary ticketing platform server (3534), external to the platform, for unique identifying information known to the primary ticketing platform for the patron account associated with the unique identifying ticket code for the seat on which the tag was scanned. To accomplish this, the ticketing platform server queries the primary ticketing platform database (3536), and the ticketing platform server retrieves unique identifying information associated with the account holder of the unique identifying ticket code for the seat on which the tag was scanned (3538). The ticketing platform server then returns that patron's unique identifying information to the interface server (3540) within the platform. The interface server compares the unique identifying information retrieved from the ticketing platform database (external source) with the unique identifying information from the user/device ID record stored in the user record database stored on the platform's server (3542). While one embodiment has been described in detail, verification can also be achieved in other ways such as linking the patron's third-party accounts (i.e., Ticketmaster®, Paypal®, credit cards, etc.) with the platform (20) to provide verification. The end result is that the ticket is verified through one or more verification protocols, indeed, verification may be completed simply by confirmation of a digital ticket corresponding to the given seat on the user device, such digital tickets are routinely stored on user devices.

If the unique identifying information does not match (3544) then the patron must manually verify his seat (3546)

and the patron begins the manual verification process described in Module #4.A above starting at (3514).

If the unique identifying information matches (3548) then the interface server marks the seat as verified in the system seat record database (3550) and the interface server, via the redirect/identification server, sends a redirect URL to the user device that is uniquely coded to the tag ID (3574) and the patron is able to access the embodiments discussed below.

Module #5: Completing a Transaction Requiring Payment to a Ticketing Platform

Figure 9:
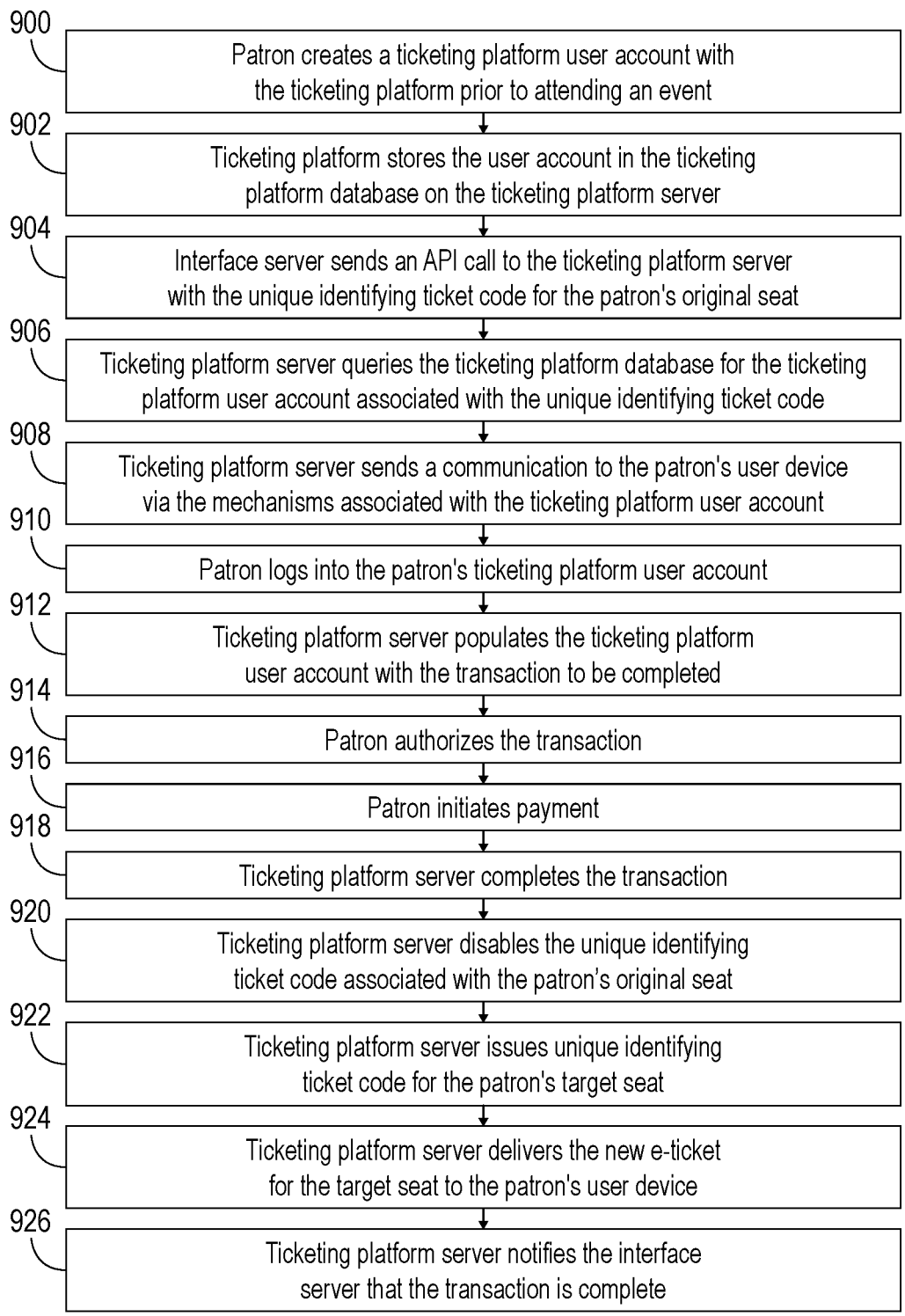
FIG. 9 is a flowchart depicting a method of completing a transaction.
Figure 10:
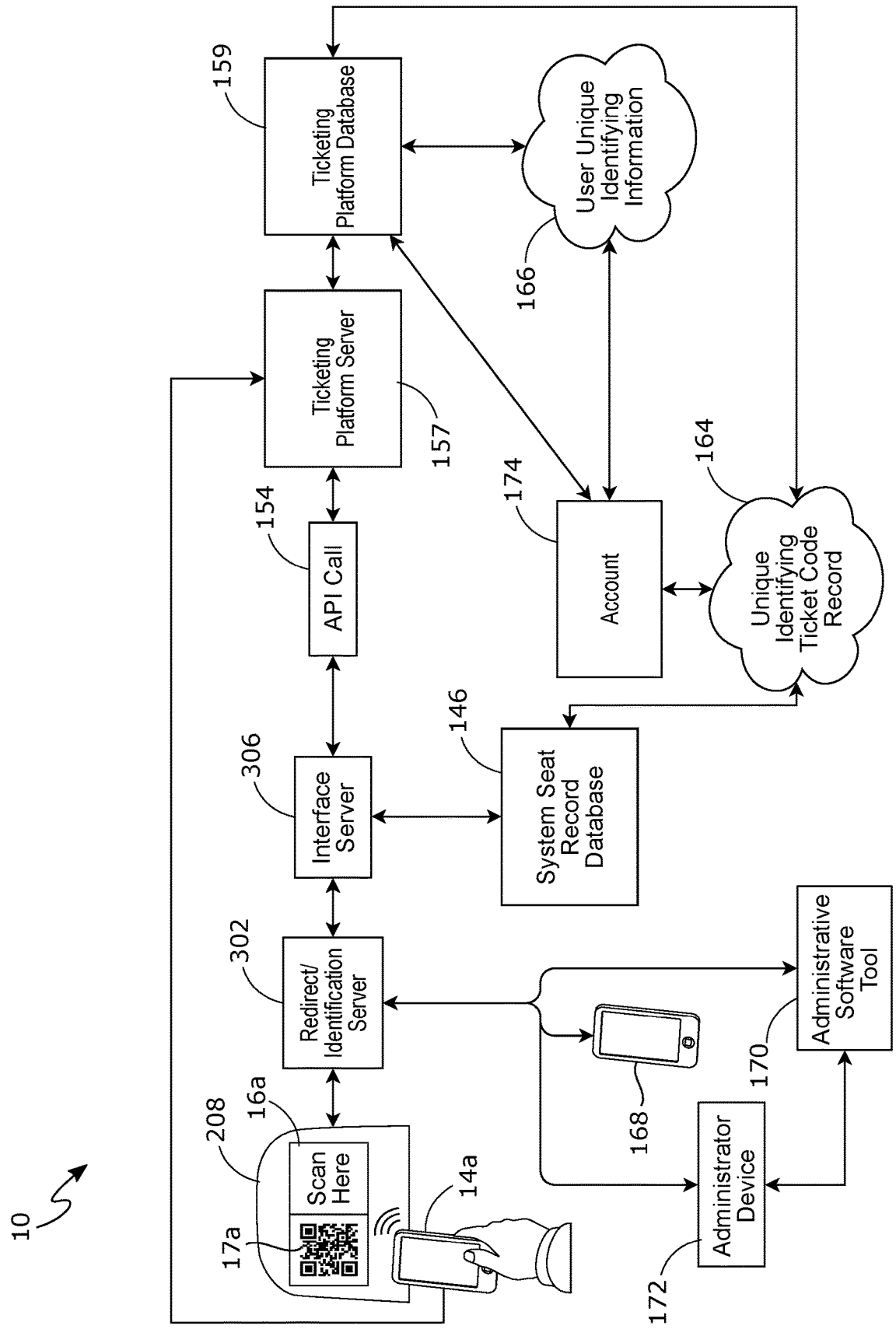
FIG. 10 is a block diagram of "Embodiment #1A: Exchange/Upgrade Seat(s) from a Selection of Available/Empty Seat(s) Using the Assistance of a Venue Employee."

Many of the embodiments described in detail below require an additional, in-event payment to a ticketing platform, external to the platform (20) in order to complete the transaction contemplated by the embodiment. FIG. 9 depicts this process in detail. Starting with (900), the patron preferably creates a ticketing platform user account with the ticketing platform, external to the platform (20) prior to attending the event. This would typically occur when the patron initially purchases a ticket(s) through the ticketing platform. As part of the external account creation process, the patron supplies unique identifying information non-limiting examples of which include name, cell phone number, e-mail address, mailing address and credit card information. Additionally, the patron selects the means by which the ticketing platform can communicate with the patron for example, the ticketing platform sever may contact the patron via e-mail, SMS, MMS, text message, phone call, push notification or socket notification. The ticketing platform stores the user account, the user communication preferences and the unique identifying information in the ticketing platform database on the external ticketing platform server (902).

In any of the embodiments discussed below, when the patron is ready to complete the in-event transaction, the platform's (20) interface server sends an API call to the external ticketing platform server with the unique identifying ticket code for the patron's original seat (904). Next, the ticketing platform server queries the ticketing platform database for the ticketing platform user account associated with the unique identifying ticket code for the seat to be acquired (906). Once the correct external ticketing platform user account is identified, the ticketing platform server, independent of the platform (20), sends a communication to the patron's user device via the mechanisms associated with the ticketing platform user account (908) directing the patron to log into or otherwise access his account, external to the platform (20). For example, if the patron has enabled text message communication, the external ticketing platform server will send a text message to the patron's user device directing the patron to log into his external ticketing platform user account.

The patron logs into his external ticketing platform user account (910) and the ticketing platform server populates the ticketing platform user account with the transaction to be completed as supplied by the platform (912). For example, if the patron chooses to exchange/upgrade his seats as described in Embodiments #1A and 1B described in detail below, the ticketing platform user account will display the price difference for purchasing the target seat location. Next, the patron authorizes the transaction (914) and the patron initiates payment (916) via any of the generally acceptable payment methods available on the ticketing platform. Non-limiting examples include credit cards, ACH bank transfers, PayPal®, mobile payment solutions such as ApplePay®, Vemo® or Zelle®, cryptocurrency, or any other generally accepted methods of payment.

Once the payment is complete, the ticketing platform server completes the transaction (918), and the ticketing platform server disables the unique identifying ticket code associated with the patron's original seat (920). The ticketing platform server then issues a new, unique identifying ticket code for the patron's target seat (922) and the ticketing platform server delivers the new e-ticket for the target seat to the patron's user device (924). Finally, the external ticketing platform server notifies the interface server of the platform (20) that the transaction is complete (926). While one embodiment for payment has been described in detail, it should be understood that the transaction could also be completed within the platform (20) and the external primary ticketing platform notified of the completion of the transaction so that unique ticket codes can disabled and reissued. While the unique ticket codes can be exchanged, to prevent fraud or misuse of the exchange platform, it is safer to disable and reissue the unique ticket code.

Embodiment #1A: Exchange/Upgrade Seat(s) from a Selection of Available/Empty Seat(s) Using the Assistance of a Venue Employee In this non-limiting example of Embodiment #1, a venue such as, but not limited to, a sports arena, concert stadium, or theater, sells tickets to an event via various online ticketing platforms, in-person box office sales and third party re-sale outlets. Each seat is uniquely identified by a generally known system of section, row and seat. When a patron purchases a ticket to Section 101, Row A, Seat 5, which occurs external to the platform (20), the master ticket database (external to the platform) updates that seat as sold and removes it from the available pool of seats for sale. The patron who has purchased the seat, receives confirmation that this seat has been assigned to him. This can be done in various ways, for example, the widely used physical ticket has now largely been replaced by various electronic methods of delivery such as e-mailed tickets that indicate the specific seat purchased, PDF tickets that contain a unique identifying code such as a QR code which contains information regarding the specific seat purchased or downloadable electronic tickets that contain a unique identifying code and can be downloaded to a user device, such as, but not limited to, a mobile device, smart phone or smart watch.

Venues have the ability to end ticket sales at any time prior to or during the event. For example, for a Sunday football game, the venue may end online ticket sales by midnight on Saturday and box office sales 15 minutes prior to kickoff. At any time, the venue's ticketing database (or other appropriate database) knows which seats have been sold including the price for which they were sold, and which seats remain available and unpurchased. The generally established methods by which a patron purchases and receives tickets to an event is more fully described in Module #1.

Patrons at the venue have the ability to visually see which seats are occupied and which seats remain empty. Once in his seat at the venue, a patron may want to change his seat for any number of reasons, for example, the view from the current seat may not be optimal, the patron may not enjoy the company of the other patrons seated in the section, or the patron may simply see a block of unoccupied seats in a premium section. Currently, these is no way for the patron to conveniently change or upgrade his currently purchased seat. If the option exists at all, the patron would need to stand in a long line at the box office and physically exchange his tickets. Alternatively, the patron could attempt to bypass security and sit in the seat without paying for it.

Figure 11A:
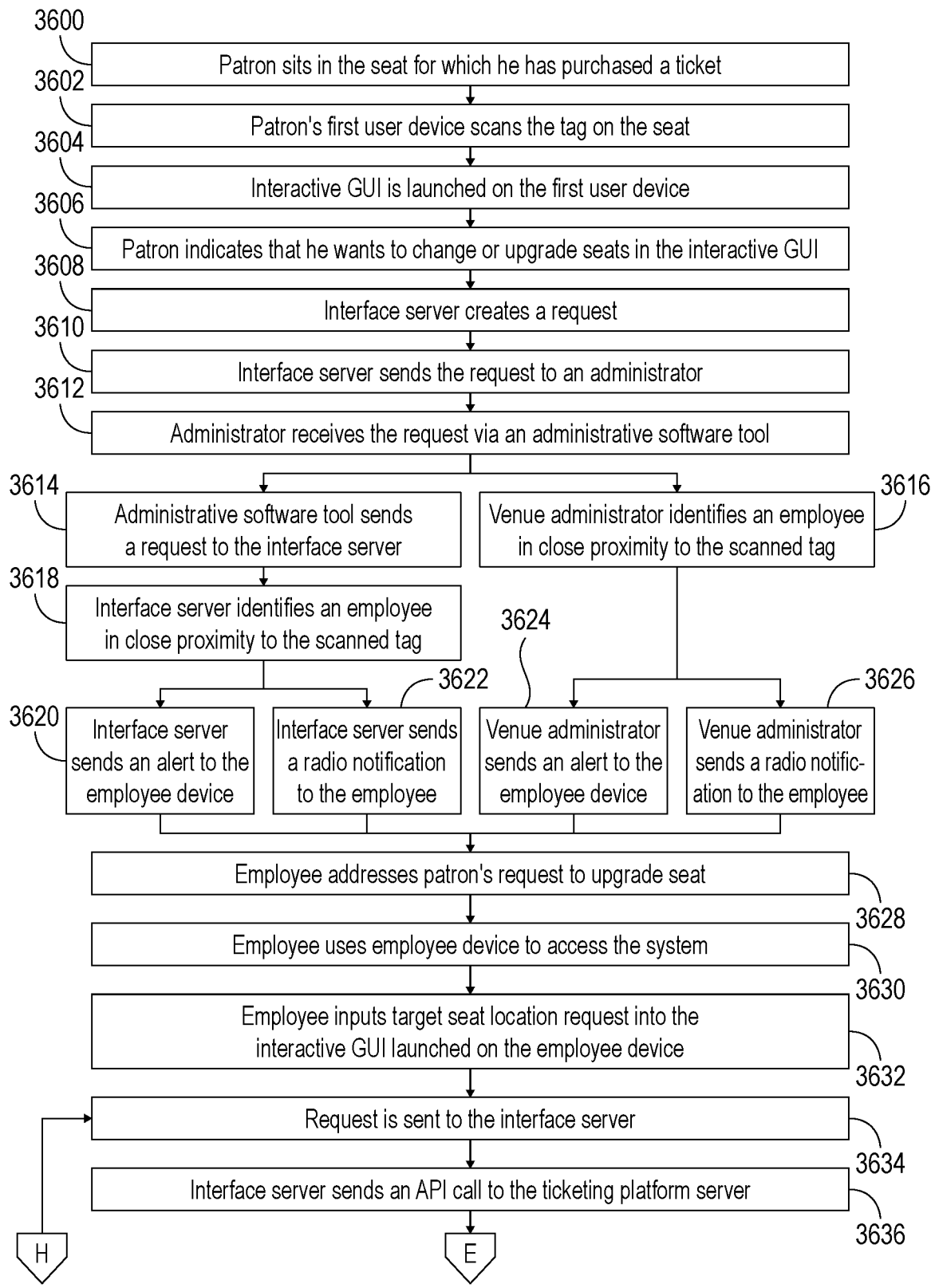
Figure 11C:
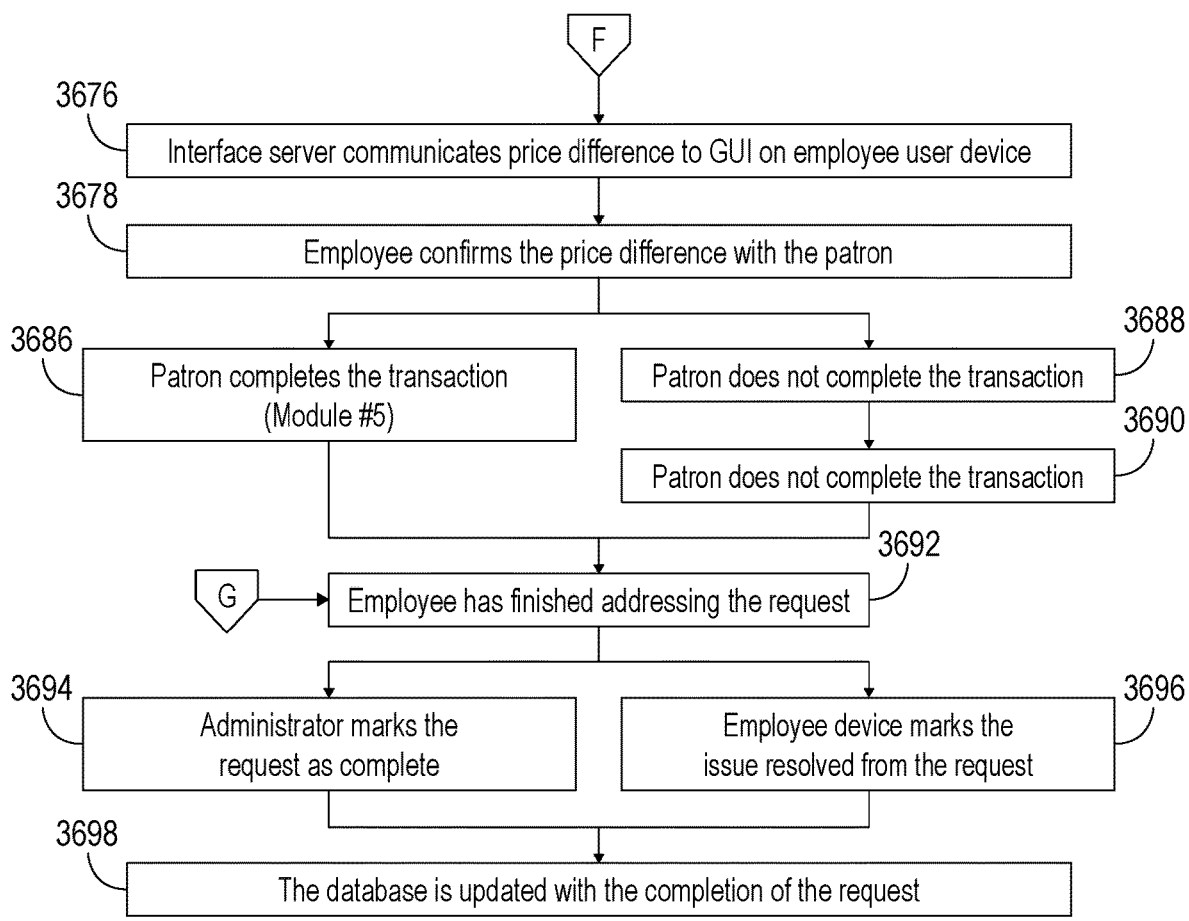

The present invention provides an elegant mechanism for exchanging and upgrading ticketed seats at a venue at any time during the event as shown in FIG. 11A. FIG. 11B and FIG. 11C, which in this non-limiting embodiment is accomplished in-event via a concierge type service. The patron has purchased his ticket as more fully described in Module #1, has entered the venue as more fully described in Module #2, has accessed the system as more fully described in Module #3 and has verified the ticket as more fully described in Module #4. Starting at (3600), the patron sits in the seat for which he has purchased a ticket. The patron uses his first user device to scan the tag on the seat (3602). The act of scanning the tag launches an interactive GUI, such as a ticket exchange/swap portal, on the first user device (3604). The patron indicates that he wants to change or upgrade his seats using the functional selection buttons in the interactive GUI (3606). Based upon this selection sent from the GUI on the user device to the interface server, via the redirect/identification server, the interface server creates a request (3608) and sends the request to an administrator (3610). Next, the administrator receives the request via an administrative software tool (3612).

If the administrative software is being controlled using artificial intelligence ("AI"), the administrative software tool sends the request to locate the employee closest to the location of the user device that scanned the tag to the interface server (3614). The interface server identifies the venue employee in closest proximity to the scanned tag (3618) and either the interface server sends an alert to the employee device via push notification, socket notification, SMS, MMS, or e-mail (3620) or the interface server sends a radio notification to the employee (3622).

Returning to (3612), if the administrative software tool is not running AI, then the venue administrator (who may be located in the venue or in a location remote from the venue) identifies an employee in close proximity to the scanned tag (3616) and either the venue administrator sends an alert to the employee device via push notification, SMS, MMS, or e-mail (3624) or the venue administrator sends a radio notification to the employee (3626).

Regardless of how the employee is notified of the request, the employee addresses the patron's request to upgrade the seat (3628). The employee uses his user device to access the system (3630) which launches an interactive GUI on the employee device. The employee inputs the seat upgrade location request (the "target seat" i.e., the desired seat to upgrade to) into the interactive GUI launched on the employee device (3632). The target seat location is sent from the employee's user device to the interface server (3634). The interface server sends an API call to the ticketing platform server (3636), which can be both for the primary sale and the resale, external to the platform (20). The ticketing platform server queries the ticketing platform database to determine if the target seat location is sold or available (3638). If the target seat location is sold (3642) then the ticketing platform server returns the status of the requested seat to the interface server via an API call (3646) and the interface server updates the interactive GUI on the employee device with the status of the requested seat (3648) in this instance, the target seat status is unavailable (3652) and is communicated by the venue employee to the patron. At this point, the patron has two options. Option #1—The patron takes no further action (3680) and therefore the venue employee has finished addressing the request (3692) and either the administrator marks the request as complete (3694), or the employee user device marks the issued resolved from the request (3696) and the database on the interface server is updated with the completion of the request (3698). Option #2—The patron selects a new target seat location (3682), and the process restarts at (3632).

Returning to (3638), if the target seat is unsold (3640) then the ticketing platform server puts a hold on the target seat (3644) and the ticketing platform server returns the status of the requested seat to the interface server via an API call (3646). Subsequently, the interface server updates the interactive GUI on the employee's user device with the status of the target seat (3648) in this instance, the target seat status is available (3650) is communicated by the venue employee to the patron. The venue employee confirms that the patron wishes to proceed with the exchange/upgrade and reports that decision in the interactive GUI on the employee's user device (3654). If after being informed that the target seat is available, the patron declines the exchange/upgrade, the decline decision is sent from the employee's user device to the interface server (3656). The interface server sends the decline instructions to the ticketing platform server via an API call (3658) and the ticketing platform server releases the hold on the seats (3660). Therefore, the venue employee has finished addressing the request (3692) and either the administrator marks the request as complete (3694), or the employee user device marks the issued resolved from the request (3696) and the database on the interface server is updated with the completion of the request (3698).

Returning to (3654), if the patron elects to proceed to exchange/upgrade to the target seat location, that confirmation is entered into the interactive GUI on the employee's user device and is sent from the employee's user device to the interface server (3662). The interface server sends the confirmation and the patron's original seat location to the ticketing platform server via an API call (3664). Next, the ticketing platform server queries the price of the ticket for the patron's current seat location (3668) and the ticketing platform server queries the price of the ticket for the target seat location (3670). The ticketing platform server calculates the price difference between the current seat location and the target seat location (3672), and the ticketing platform server returns the price difference to the interface server via an API call (3674). The interface server communicates the price difference to the interactive GUI on the employee's user device (3676) and the venue employee verbally confirms the price difference with the patron (3678).

Here again, the patron has two options. Option #1—the patron completes the transaction (3686) as more fully described in Module #5. Option #2—the patron does not complete the transaction (3688) and the ticketing platform server releases the hold on the seat (3690). Regardless of the option chosen, the venue employee has finished addressing the request (3692) and either the administrator marks the request as complete (3694), or the employee user device marks the issue resolved from the request (3696) and the database on the interface server is updated with the completion of the request (3698). Finally, the now vacant original seat location is added to the pool of seats available for exchange/upgrade.

In a nonlimiting illustration of Embodiment #1, MRC's (17a) are located on tags (16a) affixed to seats (208) in a venue (202 from FIG. 2). The patron has purchased his ticket as more fully described in Module #1, has entered the venue as more fully described in Module #2, has accessed the system as more fully described in Module #3 and has verified the ticket as more fully described in Module #4. The patron's current ticket is for Section 302, Row C, Seat 12 at a football game and that patron sees that front row seats in Section 101 remain unoccupied after the start of the game. The patron desires to upgrade his seat in Section 302 to the premium seat in Section 101. To initiate the transaction, the patron uses his first user device (14a), in this example, a mobile device such as a smart phone, to scan the tag (16a). The scan launches a Web browser, URL or GUI (218 from FIG. 2) from which the patron can indicate that he wants to upgrade or exchange his seats. The system (10) creates a request based on the tag (16a) scanned noting the location of the tag, the date and time of the scan and the nature of the request and sends that request to the interface server (306).

The request is received by an entity administrator via an administrative software tool (170). The entity administrator could be located within an office or command center located at the venue and accessing the administrative software via an administrator device (172) such as a desktop computer, laptop computer or tablet. Alternatively, the administrator could be roving through the venue and access the administrative software via a mobile device, tablet, or smart watch. Alternatively, the administrator could be at a remote location external to the venue and access the administrative software via a desktop computer, laptop computer, tablet, or any other computing device capable of accessing the Internet.

The administrative software tool (170) can be a GUI that is operated and controlled by the administrator with modules for viewing requests, the status of the request, employees on duty with their location and skill set that can be assigned to the request, completed requests and any other module or icon that is required to efficiently operate the system. Alternatively, the administrative software tool (170) can utilize AI and machine learning to operate the system without the assistance of a human administrator.

When the request is received, if the administrative software tool (170) is utilizing AI and machine learning without human involvement, when the request is sent from the user device (14a) to the interface server (306) it is analyzed by the AI to determine the location of the request. The system (10) is able to use the geolocation of the employee's user device (168) to determine which employee is closest to the request.

Once the appropriate employee is identified, the system has two options. Option One: The interface server (306) can send an alert to a third device, i.e., the employee's user device (168). In this instance, the third device/employee device is a mobile device such as a smart phone, but the employee device could also be a tablet, laptop computer, smart watch, smart glasses, or other wearable device. The alert could be a push notification, socket notification, SMS, MMS, or e-mail. In this example, the system (10) sends a text message to employee Mary's employee user device (168), a smart phone, indicating that the patron in Section 302, Row C, Seat 12 would like to upgrade his ticket. Option Two: Since it is common for employees in venues such as this to carry one-way or two-way radios such as a walkie talkie, the system (10) can send an alert to Mary's radio notifying her that the patron in Section 302, Row C, Seat 12 would like to upgrade his ticket.

Returning to step (3612 from FIG. 11A), when the request is received, if the administrative software tool (170) is being operated by a human administrator, the administrator will review the request. Via the administrative software tool (170), the administrator will then use the geolocation of the employees' user devices (168) to determine which employee is closest in proximity to the request. Again, the administrator has identified that Mary is closest in proximity to the tag (16a) that was scanned to create the request.

Once the appropriate employee is identified, the system has two options. Option One: The administrator can send an alert to the third device/employee's user device (168). In this instance, the employee user device (168) is a mobile device such as a smart phone, but the employee device could also be a tablet, laptop computer, smart watch, smart glasses, or other wearable device. The alert could be a push notification, SMS, MMS, or e-mail. Option Two: Since it is common for employees in venues such as this to carry one-way or two-way radios such as a walkie-talkie, the administrator can call Mary on her radio or smart phone notifying her that the patron seated in Section 302, Row C, Seat 12 would like to upgrade his ticket.

Regardless of how the notification is sent to the employee, the employee addresses the patron's request to upgrade/exchange his seat. In this example, Mary reports to Section 302, Row C, Seat 12, and locates the patron who has made the request. Mary uses her employee user device (168) to access the system (10). Mary inputs that the patron would like to upgrade his ticket to the target seat which in this example is Section 101, Row A, Seat 5 into the GUI on her employee user device (168). The GUI on Mary's employee user devices (168) then sends a request to the interface server (306) makes an API call (154) to the ticketing platform server (157) to run a query of the ticketing platform database (159) to determine whether a ticket was sold for the target seat of Section 101, Row A, Seat 5. Alternatively, the interface server (306) can query the system seat record database (146), which is internal to the platform (20) to determine whether a ticket was sold for the target seat. The latter option, therefore, excludes the third-party sales platforms. The results of the query are returned via and API call (154) via the interface server (306) which updates the GUI on the employee user device (168). In this example, the results of the query indicate that a ticket has not been sold for this target seat. If the query returns a result that the seat is available, the ticketing platform server (157) and/or the system seat record database (146) places a hold on the queried seat(s) for a period of time determined by the venue or the ticketing platform, for example, five minutes, to ensure that the target seat(s) do not appear available for any other employee user device that might query the system while Mary completes the transaction for her patron. Mary confirms that the patron wishes to upgrade to the target seat. Mary inputs the patron's response into the GUI on her employee user device (168) which communicates the information to the interface server (306). The interface server (306) then sends and API call (154) to query the ticketing platform server (157) for the purchase price of the patron's original ticket purchased for Section 302, Row C, Seat 12 stored in the unique identifying ticket code record (164) in the ticketing platform database (159) and the purchase price for the target seat to which the patron wished to upgrade, Section 101, Row A, Seat 5 and calculates the difference in the price. The interface server (306) communicates the price difference to Mary's employee user device (168). Mary confirms the price to upgrade to the target seat with the patron and inputs the patron's decision into the GUI on her employee user device (168) which communicates with the interface server (306) to initiate the transaction with the patron.

Ticketing platforms, external to the platform (20) typically give patrons the option to create an account (174) and store unique identifying information (166) such as e-mail address, cell phone number and payment information. Any tickets sold to the patron are associated with this account stored in the ticketing platform database (159). When Mary's employee user device (168) sends the unique identifying ticket code (164) for the patron's original seat (208) to the interface server (306), the interface server (306) sends an API call (154) to the ticketing platform server (157) which accesses the patron's account (174) associated with the unique identifying ticket code record (164). Accordingly, in order to complete the transaction that Mary initiates above, the ticketing platform server (157) will send a communication to the patron's user device (14*a*) via the mechanisms enabled in the patron's account (174). For example, the ticketing platform server (157) can send an e-mail, SMS, MMS, text message, phone call, or push notification via the ticketing agency or venue app or via the patron's digital wallet. Regardless of the delivery system, the ticketing platform server (157) will request that the patron confirm the transaction, authorize payment if payment information is stored on the ticketing platform server (157), or request payment information if no information is stored in the ticketing platform database (159). Non-limiting types of payment can be credit cards, ACH bank transfers, PayPal®, mobile payment solutions such as ApplePay®, Vemo® or Zelle®, cryptocurrency, or any other generally accepted methods of payment.

Once the financial transaction is complete, the ticketing platform server (157) disables any unique identifying ticket codes (164) originally associated with the patron's ticket and releases that seat into the pool of the seats available in the system seat record database (146), within the platform, and the ticketing platform database (159), external to the platform. The ticketing platform server (157) then delivers electronic tickets with a unique identifying ticket code record (164) for the target seat to the patron's user device (14*a*) via the delivery mechanism specified in the account (174) such as e-mail, SMS, MMS, text message, or push notification via the ticketing agency or venue app or via the patron's digital wallet and the patron is now free to access the target seat in Section 101, Row A, Seat 5. If the patron does not complete the financial transaction in the amount of time predetermined by the ticketing platform, the ticketing platform server (157) and/or the system seat record database (146) will remove the hold on the seat(s) and the seat(s) will be made available to other patrons wishing to change locations.

Mary now has two options to mark this assignment complete in the system. Option One: The employee user device (168) marks the issue resolved from the request. In this example, Mary can either use her device (the third device/employee user device (68)) to scan the tag and mark the request resolved, or Mary can access the request record received on her employee device without scanning the tag and marking the issue resolved.

Alternatively, the administrator can resolve the request by marking it complete. This can be done by the employee contacting the administrator via SMS, MMS, text message, phone call, or two-way radio communication to report that the request has been resolved and the administrator marking the request as resolved in the administrative software tool (170).

Embodiment #1B: Automated Exchange/Upgrade Seat(s) from a Selection of Available/Empty Seat(s)

In another nonlimiting example of Embodiment #1, interaction with a human employee of the venue is removed and the ticket exchange takes place seamlessly within the system (10). The system (10) may communicate with the ticketing platform server (157) or the ticketing platform server (157) may release any number of unsold seats into the platform (20) which the platform (20) stores in the system seat record database (146) so that there is no external communication between the platform (20) and the ticketing platform server (157) when the transaction is made.

Figure 13A:
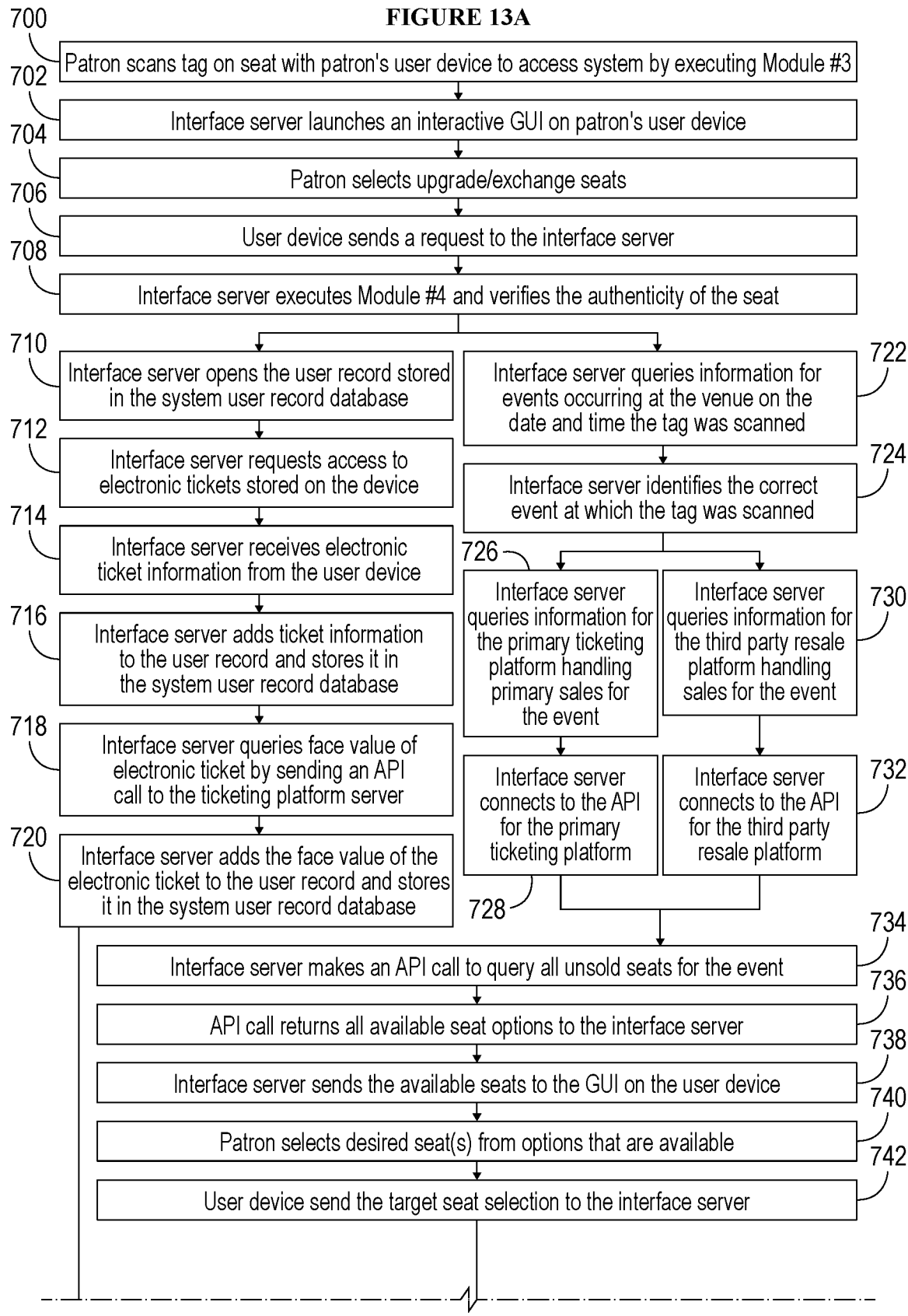
FIGS. 13A and 13B are a flowchart for "Embodiment #1B: Automated Exchange/Upgrade Seat(s) from a Selection of Available/Empty Seat(s)."
Figure 13B:
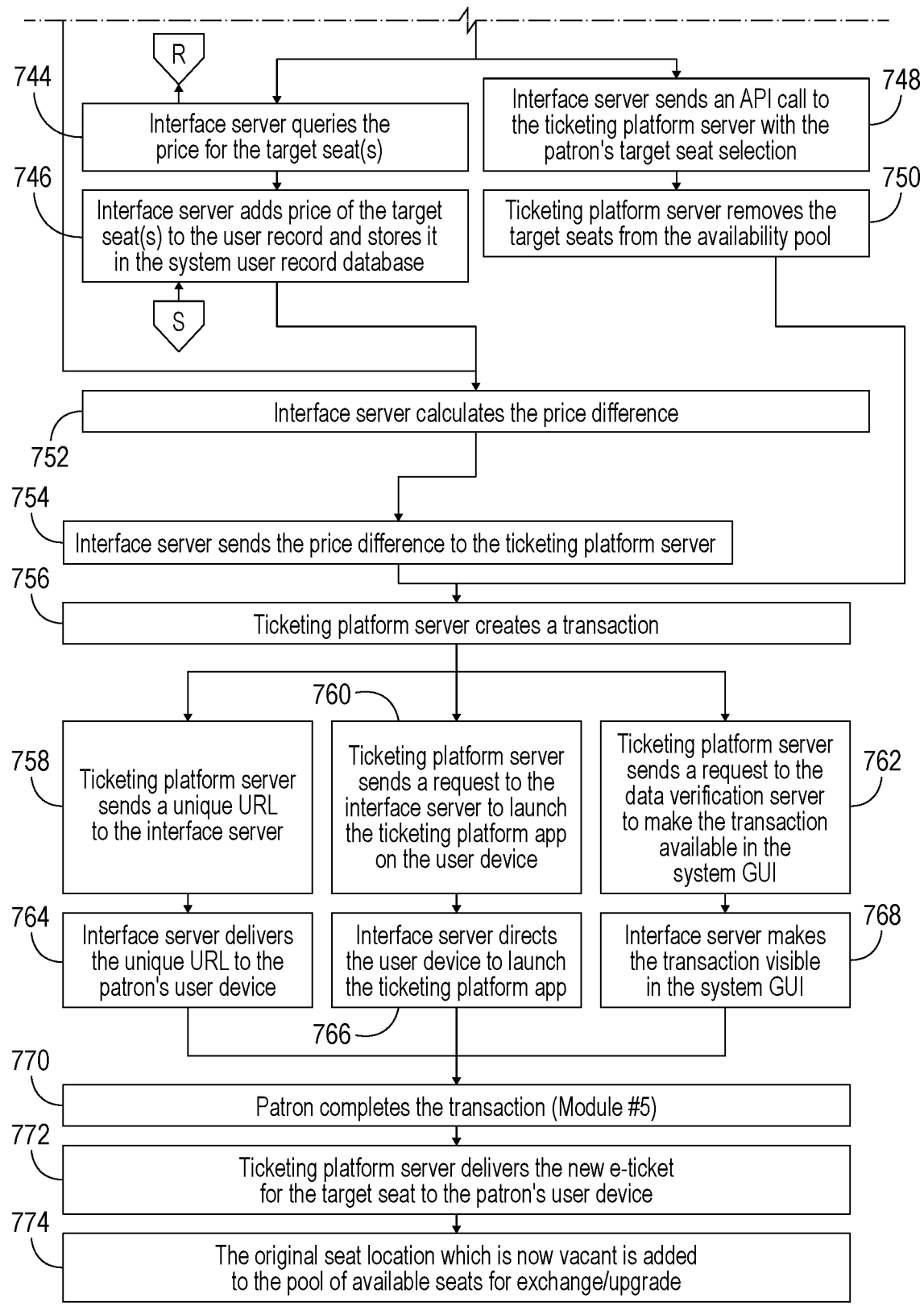

Turning to FIGS. 13A and 13B, the patron has purchased his ticket as more fully described in Module #1, has entered the venue as more fully described in Module #2. Starting at (700), the patron sits in his seat and scans the tag on the seat with the patron's user device to access the system by executing Module #3. The interface server launches an interactive GUI on the patron's user device (702). From the GUI, the patron selects upgrade/exchange seats (704) which prompts the user device to send the request to the interface server (706). Next, the interface server executed Module #4 and verifies the authenticity of the seat (708).

Once the patron's seat has been verified in (708), the system simultaneously launches two series of actions. In one series, starting at (710), the interface server opens the user/device ID record associated with the unique ID that is stored in the system user record database. Next, the interface server sends a request to the patron's user device asking to access electronic tickets stored on the user device (712). The patron's user device returns the electronic information and the unique identifying ticket code to the interface server (714) via the redirect/identification server. The interface server adds the ticket information to the user/device ID record and stores it in the system user record database (716). Next, the interface server queries the face value of the electronic ticket by sending an API call to the ticketing platform server (718). Finally, the interface server adds the face value of the electronic ticket to the user record and stores it in the system user record database (720).

Returning to (708), in the second series simultaneously occurring, the interface server queries information for events occurring at the venue on the date and time the tag was scanned from the system event database within the platform or via an API call to the venue server which queries the venue event database (722) external to the platform. The interface server identifies the correct event at which the tag was scanned (724). Next, the interface server simultaneously queries information for the primary ticketing platform handling primary sales for the event (726) from the system event database or via an API call to the venue server which queries the venue event database and the interface server connects to the API for the primary ticketing platform (728) and queries information for the third-party resale platform handling sales for the event (730) via the aforementioned databases and the interface server connects to the API for the third-party resale platform (732).

Once the interface server is connected to the API's at (728) or (732), the interface server makes an API call to query all unsold seats for the event (734). The API call returns all available seat options to the interface server at (736) and the interface server send the available seat options to the interactive GUI on the patron's user device (738). Next, the patron selects the desired target seat from the options that are available (740), and the patron's user device sends the selection to the interface server (742).

Once the interface server receives the target seat location at (742), it simultaneously queries the price of the target seat location (744) and adds the price of the target seat to the user/device ID record and store it in the system user record database (746), and it also sends an API call to the ticketing platform server with the patron's target seat selection (748)

and the ticketing platform server removes the selected target seat(s) from the availability pool (750).

Returning to (746), once the price of the target seat is saved to the user/device ID record, at (752), the interface server calculates the price difference between the face value stored in the system user/device ID record at (720) and the price of the target seat stored in the system user/device ID record at (746). Finally, the interface server sends the price difference to the ticketing platform server (754) external to the platform.

Next, the ticketing platform server, external to the platform, creates a transaction (756) which can be delivered to the patron's user device in several different ways. Nonlimiting examples include: (i) the ticketing platform server sends a unique URL to the interface server (758) and the interface server delivers the unique URL to the patron's user device (764); (ii) the ticketing platform server can send a request to the interface server to launch the ticketing platform app on the user device (760) and the interface server directs the user device to launch the ticketing platform app (766); or (iii) the ticketing platform sends a request to the interface server to make the transaction available in the platform's interactive GUI (762) and the interface server makes the transaction visible in the system's interactive GUI (768). Regardless of the delivery mechanism the final step is that the patron completes the transaction as more fully described in Module #5 (770) and the ticketing platform server delivers the new e-ticket for the target seat to the patron's user device (772). Finally, the patron's original seat location is put back into the pool of available seats for upgrade/exchange (774). Alternatively, the transaction at 756 can be created with the platform and payment initiated and received within the platform and the new unique identifying ticket code delivered by the platform.

Figure 12:
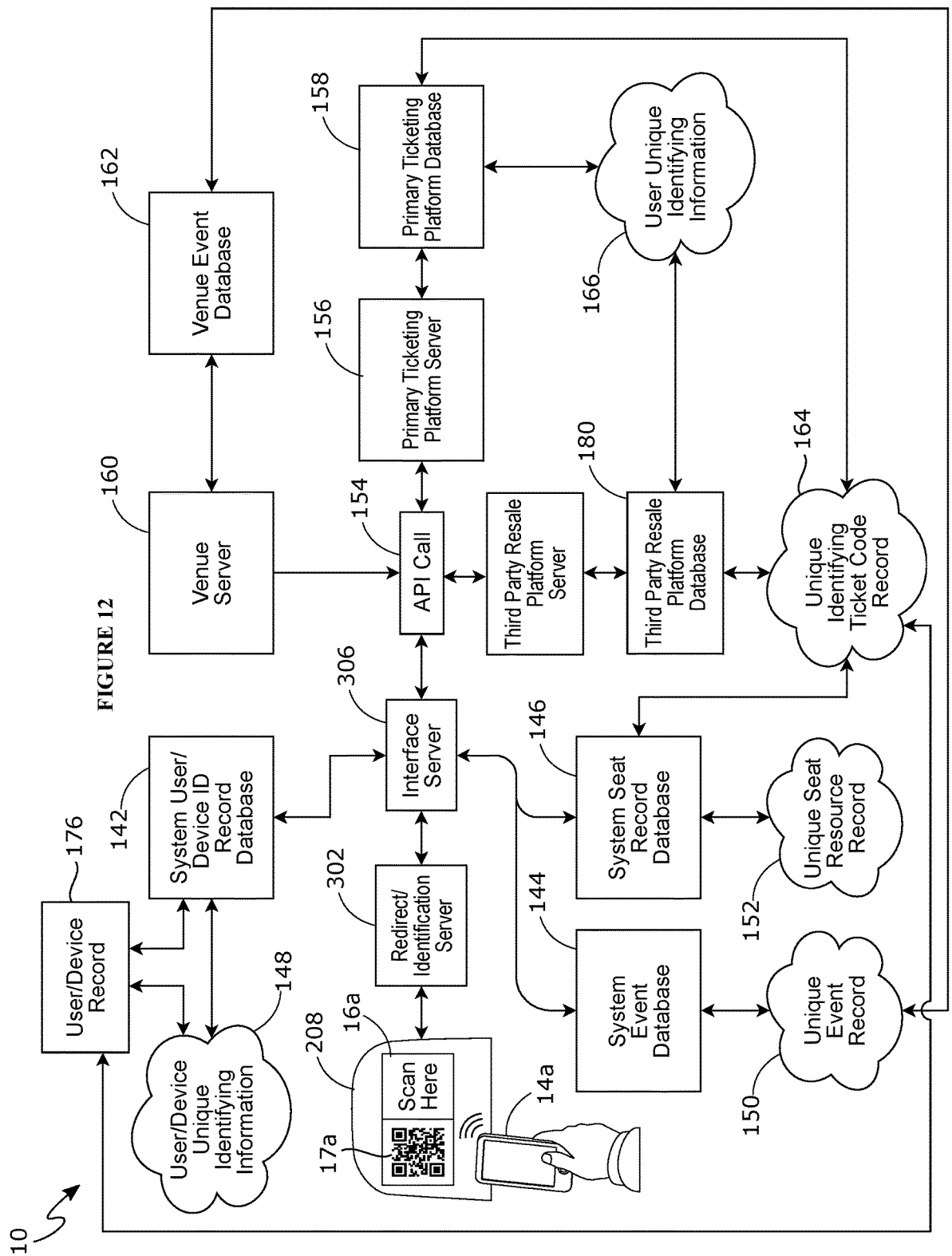
FIG. 12 is a block diagram for "Embodiment #1B: Automated Exchange/Upgrade Seat(s) from a Selection of Available/Empty Seat(s)."

FIG. 12 is a nonlimiting illustration of Embodiment #1B, MRC's (17a) are located on tags (16a) affixed to seats (208) in a venue (202 from FIG. 2). The patron, Sara, has purchased her ticket as more fully described in Module #1, has entered the venue as more fully described in Module #2, has accessed the system as more fully described in Module #3 and has verified the ticket as more fully described in Module #4. When Sara's user device (14a), scans the tag (16a), Module #3 is activated, and the interface server (306) launches an interactive GUI (218 from FIG. 2) on Sara's user device (14a). From the interactive GUI, Sara selects the options to exchange/upgrade seats and Sara's user device (14a) sends a request to the interface server (306). Next, the interface server (306) executes Module #4 to confirm that Sara's user device (14a) holds a valid ticket for the original seat (208) and therefore Sara is authorized to sit in that seat (208). As part of Module #4 at (3500 from FIG. 8), the interface server (306) has captured that Sara's user device (14a) has scanned the tag (16a) located in Section 202, Row C, Seat 10 on Mar. 15, 2021 at 8:00 pm and has saved that to the user/device ID record (176) in the system user record database (142) and in the unique seat resource record (152) stored in the system seat record database (146). Also, as part of Module #4 at (3508 from FIG. 8) the specific event and the ticketing platforms handling the event have been identified and saved to the user/device unique ID record (176) in the system user record database (142) and in the unique seat resource record (152) stored in the system seat record database (146). The aforementioned databases (142, 146) and records (176, 152) are all within the platform (20). In this example, the system (10) know that Sara is at a Lakers game and tickets were sold through Ticketmaster® and Stub Hub®.

After the authenticity of the seat is verified, the interface server (306) opens Sara's user/device ID record (176) containing Sara's user/device unique identifying information (148) and the interface server (306) requests access to the electronic ticket information (i.e., the unique identifying ticket code [164]) stored on Sara's user device (14a) (i.e., stored in the digital wallet [24a] from FIG. 1) which Sara's user device (14a) returns to the interface server (306) which in turn stores it on Sara's user/device ID record (176) in the system user record database (142). Next, the interface server (306) initiates an API call (154) to the ticketing platform server (157) and queries the face value of the tickets for Sara's original seat (208). In this example, the system (10) knows that Sara purchased her tickets to the Lakers game from Ticketmaster® so the interface server (306) queries the Ticketmaster® server (15) which determines that the face value for the ticket sold for Section 202, Row C, Seat 10 is $50.00. This information is returned from the primary ticketing platform server (156) to the interface server (306) via the API call (154) and is saved in Sara's user/device ID record (176) in the system user record database (142).

Concurrently with the sequence described in the paragraph above, the interface server (306) queries information for events occurring at the venue on the date and time that Sara's user device (14a) scanned the tag (16a) by sending an API call (154) to the venue server (160), external to the platform, which queries the venue event database (162) or the interface server (306) internally queries the system event database (144) and identifies the correct event, in this instance the Laker's game. Next, the interface server (306) queries information for the primary ticketing platform and third-party resale ticketing platform handling ticketing for the event, which in this example are Ticketmaster® and Stub Hub®. The interface server (306) connects to the primary ticketing platform server (156) and the third-party resale ticketing platform server (178) via an API call (154) and queries all unsold seats for the event. In this example, Ticketmaster® has 200 unsold seats to the Laker's game at various locations throughout the venue and Stub Hub® has 150 unsold seats to the Laker's game at the various locations throughout the venue. The primary ticketing platform server (156) and the third party-resale platform server (178) return all available target seat locations to the interface server (306) via the API call (154) and the interface server (306) sends the available target seat locations to the interactive GUI on the user device (14a).

In an alternative embodiment, all primary ticketing platforms and third-party resale platforms can discontinue direct ticket sales at a predetermined time and report all available seats as of the specified time to the platform (20). These available seats are then stored in the system seat record database (146) within the platform for the particular event. In this instance, the system does not need to send an external API call to the various platforms but rather the interface server (306) internally queries the system seat record database (146) for the particular event and determines which seats are unsold and the interface server (306) sends the available target seat locations to the interactive GUI on the user device (141).

Regardless of how the available target seat locations are delivered to the patron's user device (14a), the user selects the desired target seat location. In this example, Sara sees that a premium target seat is available in Section 105, Row B, Seat 13 and Sara selects this target seat from the GUI on her user device (14a) which in turn sends Sara's target seat selection to the interface server (306). The interface server (306) then queries the price of the ticket for Section 105, Row B, Seat 13 from the primary ticketing platform server (156) and the interface server adds the price of the target seat to the user/device ID record (176) stored in the system user record database (142). For Sara's ticket, the interface server (306) queries the Ticketmaster® database and determines that the price of a ticket for Section 105, Row B, Seat 13 is $100.00 and the interface server (306) stores that price on Sara's user/device ID record (176).

Simultaneously with the sequence described in the aforementioned paragraph, the interface server (306) sends an API call (154) to the primary ticketing platform server (156) and the third-party resale platform server (178) with the patron's selected target seat location and the primary ticketing platform server (156) and the third-party resale platform server (178) remove the selected target seat location from the availability pool. Or, if the alternative embodiment is utilized, the interface server (306) removes the selected target seat location from the availability pool stored on the system seat record database (146) within the platform (20). In our current example, the interface server (306) tells the Ticketmaster® server to remove Section 105, Row B, Seat 13 from the availability pool.

Next, the interface server (306) calculates the price difference between the ticket for the original seat location and the ticket for the target seat location. In the current example, the interface server (306) accesses Sara's user/device ID record (176) and sees that the price of the ticket for the original seat location Section 202, Row C, Seat 10 is $50.00 and the price of the ticket for the target seat location Section 105, Row B, Seat 13 is $100.00 so the price difference is $50.00. The interface server (306) sends this price difference to the primary ticketing platform server (156). Alternatively, the primary ticketing platform server (156) can calculate the price difference.

Regardless of how the price difference is calculated, the next step is for the primary ticketing server (156) to create the transaction, or alternatively, the interface server (306) can create the transaction. This can be accomplished in a variety of ways. The primary ticketing platform server (156) can send a redirect URL to the interface server (306) which in turn delivers the redirect URL to the redirect/identification server and on to the user device (14*a*) via e-mail, SMS, MMS, text message, phone call, push notification or socket notification. Or the primary ticketing platform server (156) can send a request to the interface server (306) to launch the primary ticketing platform app on the patron's user device (14*a*) and the interface server (306) launches the app. Or the primary ticketing platform server (156) can send a request to the interface server (306) to make the transaction available in the platform's interactive GUI (218 from FIG. 2 such as the ticket exchange/swap portal) and the interface server (306) makes the transaction available in the GUI.

Regardless of how the patron receives the transaction, the patron now completes the transaction as more fully described in Module #5 and the primary ticketing platform server (156) delivers the new e-ticket with a unique identifying ticket code (164) for the target seat to the patron's user device (14*a*) via e-mail, SMS, MMS, text message, phone call, push notification or socket notification and the patron sits in the target seat. So, in this example, Sara receives the transaction on her user device (14*a*). She completes the transaction by paying the $50.00 price difference between the tickets using one of the mechanisms described in Module #5. The primary ticketing platform server (156) disables the unique identifying ticket code (164) for her original seat and delivers a new unique identifying ticket code (164) for the target seat to Sara's user device (14*a*) and Sara uses that unique identifying ticket code (164) to access the target seat Section 105, Row B, Seat 13. Finally, Sara's original seat location which is no longer occupied is placed back into the pool of available seats on either the platform's system seat record database (152) or in the external primary ticketing platform database (158) or the third-party reseal platform database (180)

Due to the dynamic nature of updating the availability of open seats within a venue, Embodiments #1A and 1B maximize the number of seats that can be sold for a particular event.

Embodiment #2: Seat Swap Between Two Patrons with No Fees

In Embodiment #2, patrons who have purchased tickets to an event via the event's primary ticketing platform or a third-party resale outlet as more fully described in Module #1 and have entered the venue as more fully described in Module #2 are able to utilize the system to digitally exchange their seats with another patron who has entered the venue. There are a number of unforeseen reasons two patrons may wish to swap seats once they have entered a venue. For example, a patron may have purchased a ticket to sit in a particular seat at an event. Once in the venue, that patron may find out that his friends are at the same event but sitting in a different section of the venue. The patron may wish to exchange his seat with another patron sitting in the same section as his friends. With the ticket industry migrating to paperless ticketing, it is no longer possible for the two patrons to physically swap paper tickets. Embodiment #2 provides for an elegant solution for swapping electronic tickets after a patron has entered a venue.

Figure 14:
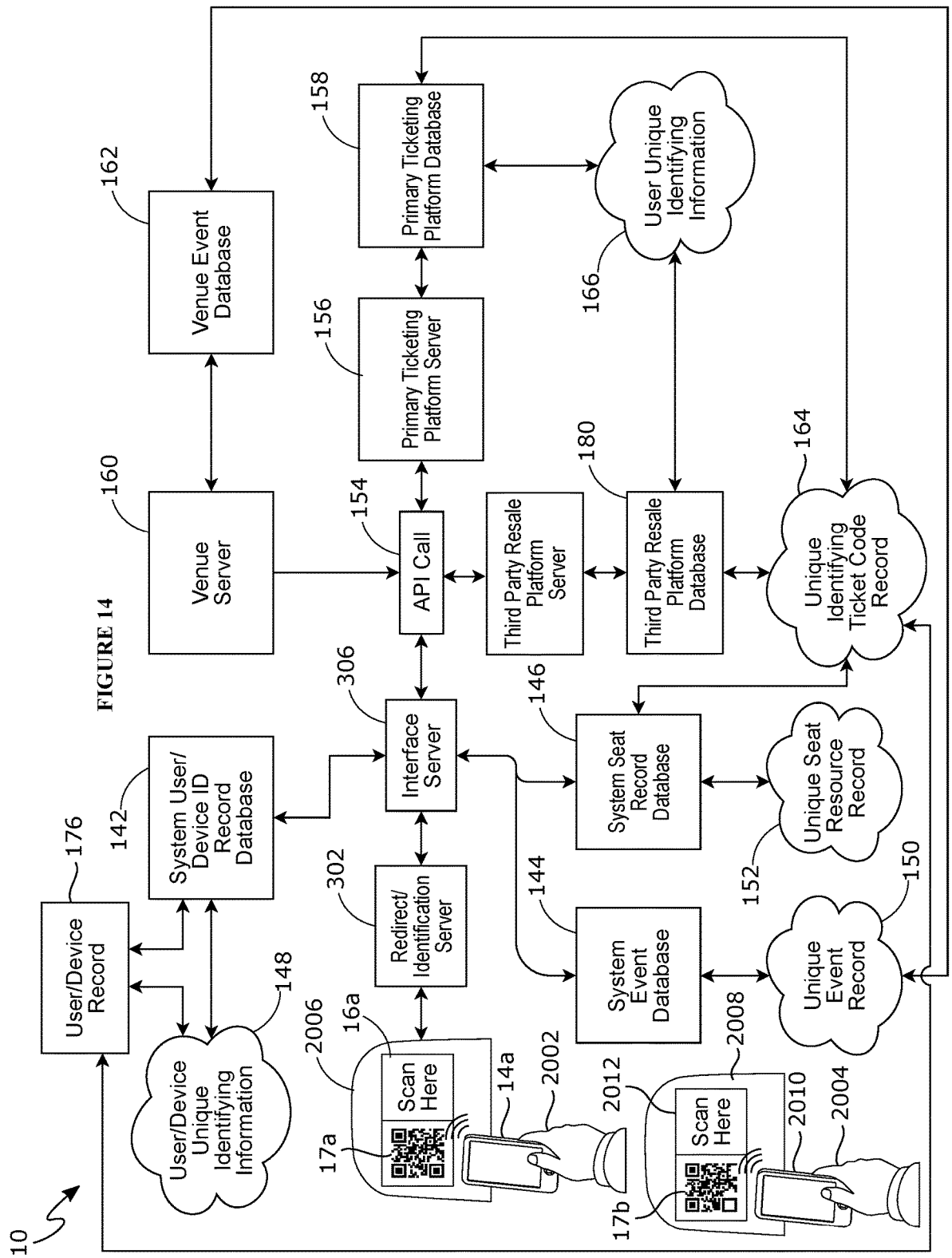
FIG. 14 is a block diagram of "Embodiment #2: Exchange Seats Between Two Patrons at an Event."
Figure 15A:
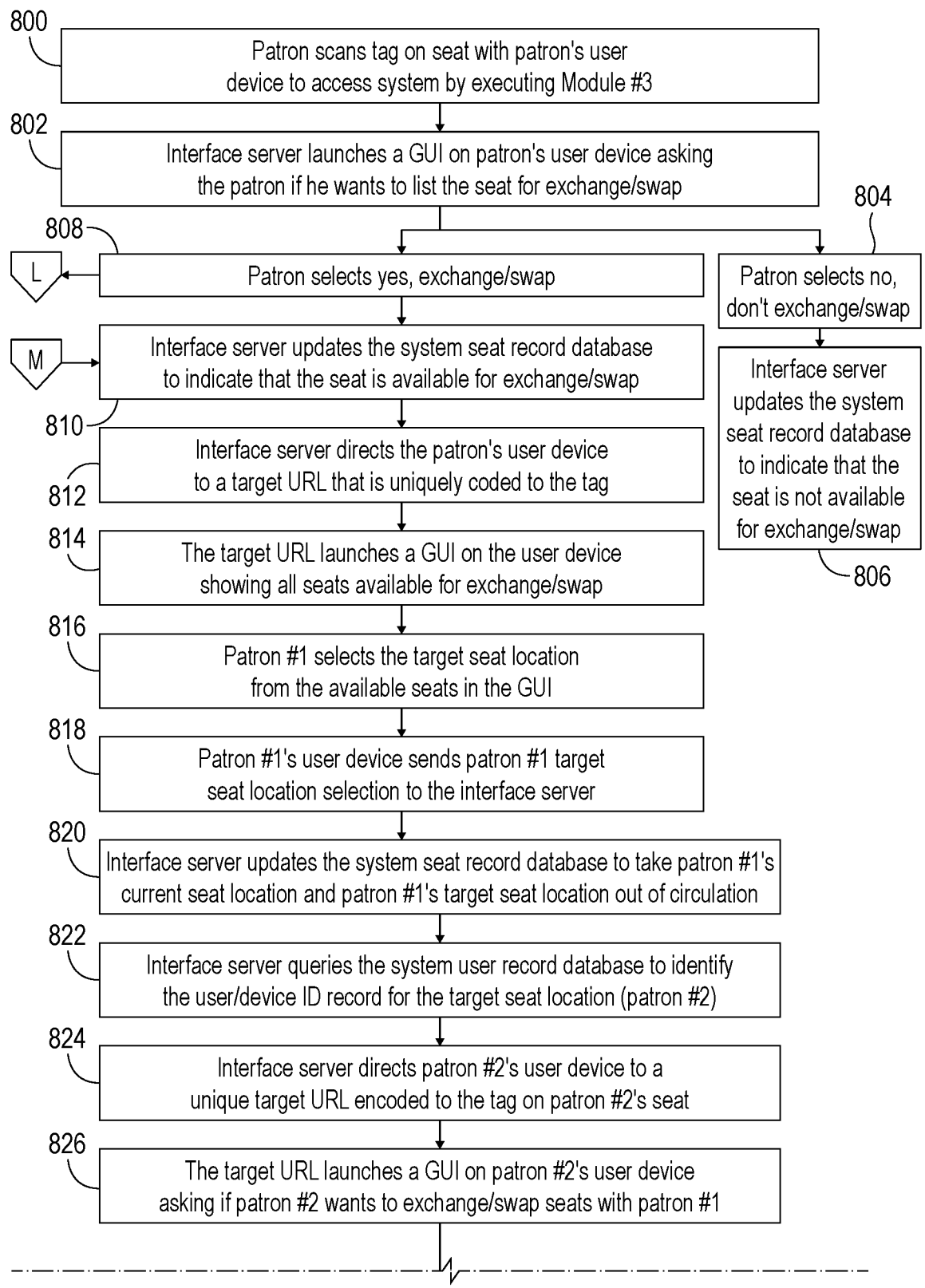
FIGS. 15A and 15B are a flowchart for "Embodiment #2: Exchange Seats Between Two Patrons at an Event."
Figure 15B:
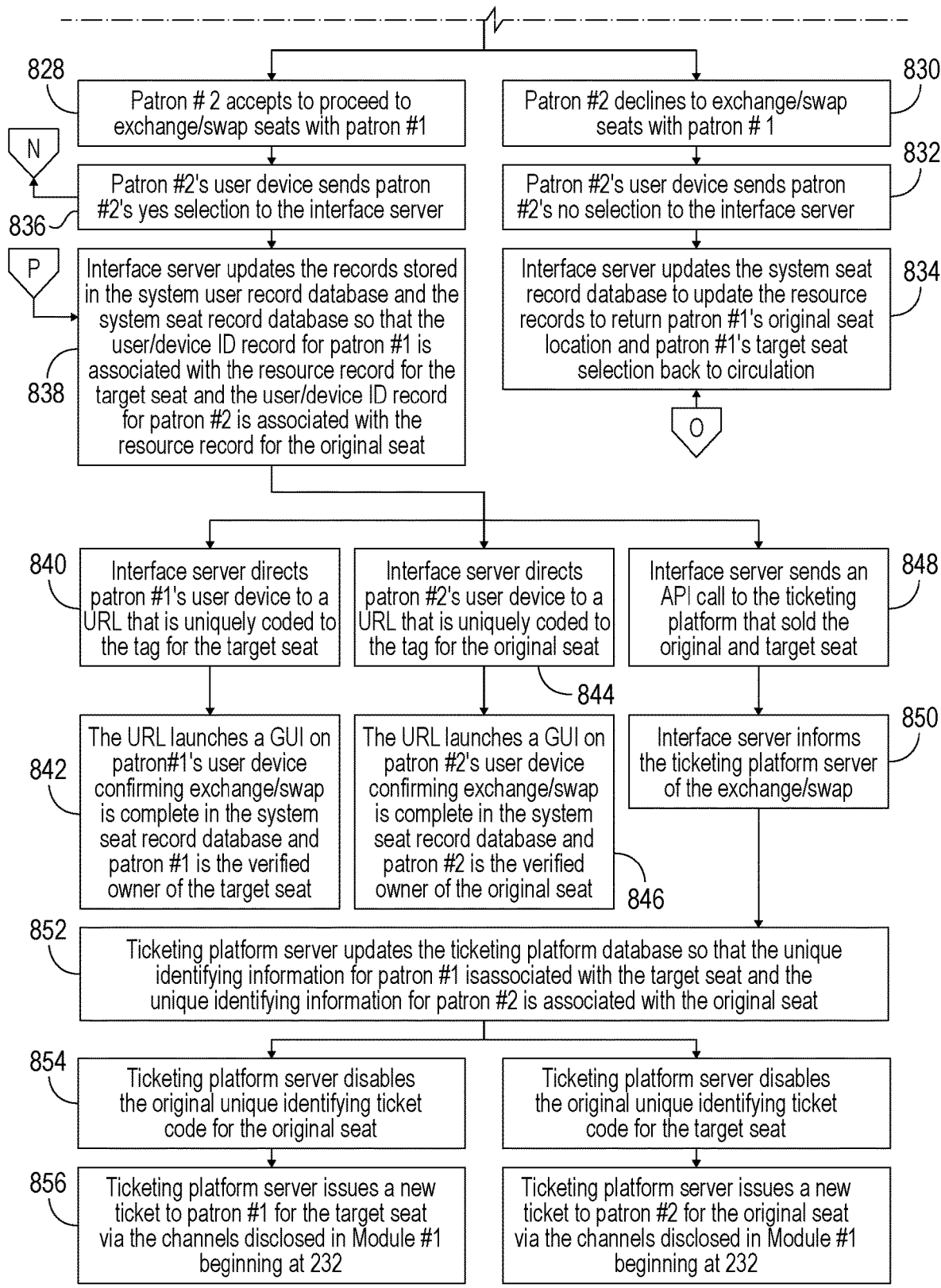

A non-limiting illustration of this Embodiment #2 shown in FIG. 14, FIG. 15A and FIG. 15B utilizes one or more databases stored on one or more separate servers which are able to communicate with one another, with the system and with the patron(s) user device(s). The first database is the system's interface server (306) or the system's redirect/identification server (302) which stores the unique tag ID for each for each MRC (17*a*, 17*b*) in the venue as the unique seat resource record (152). The interface server (306) or the redirect/identification server (302) associates the tag URL and/or tag ID of the MRC (17*a*, 17*b*) with information specific to the location of that MRC (17*a*, 17*b*) in the venue such as the section, row and seat number, latitude and longitude, and scan status of the MRC (17*a*, 17*b*). This association is more fully described in Module #3. Because the patron's user device (14*a*) contains a unique ID, the interface server (306) also contains information about the patron's user device (14*a*) that scanned the tag (16*a*) and can associate that unique user ID and user device (14*a*) with the patron's user/device ID record (176) stored in the user/device record database (142) on the interface server (306) or the redirect/identification server (302).

The second database is the ticketing platform database (159) which is external to the platform (20). It is understood that there can be any number of second databases and the system is not limited to a certain number of databases. The ticketing platform database (159) could be the primary ticketing platform used by the venue or a third-party ticket resale outlet. For each ticket sold, the ticketing platform database (159) will store user unique identifying information (166) about the transaction including, but not limited to, the name of the patron, personal information for the patron including cell phone number, e-mail address and ticketing platform account number, the section, row and seat number for each ticket purchased, the unique identifying ticket code (164), if any, associated with each ticket and the scan status of the ticket. The scan status of the ticket is generally understood to mean whether the ticket was scanned at the entrance of the venue to indicate that the patron has entered the event.

In Embodiment #2, a patron purchases a ticket to an event, online via the venue's primary ticketing platform, prior to attending an event. The patron could also purchase the ticket via a third-party ticket resale outlet or in person at the venue box office. As shown in FIG. 15A and FIG. 15B, the patron has purchased his ticket as more fully described in Module #1, has entered the venue as more fully described in Module #2, has accessed the system as more fully described in Module #3 and has verified the ticket as more fully described in Module #4. Starting at (800), the patron sits in the seat for which he has purchased a ticket and scans the tag on the seat with his user device to access the system by executing Module #3. This causes the interface server to launch an interactive GUI, such as a ticketing exchange/swap portal on the patron's user device asking the patron if he wants to list the seat for exchange/swap (802). The patron can either select yes, I want to exchange/swap (808) or no, I do not want to exchange/swap (804). If the patron indicates no at (804), the interface server updates the system seat record database to indicate that the seat is not available for exchange/swap (806) and no further action is taken. It should be understood that all patron responses are being updated and recorded in real time in the system seat record database so at any given time, the system seat record database knows exactly which seat locations are available for exchange/swap and which seat locations are unavailable. So, at any given time, the number of seats in the venue available for swap/exchange can range from none to all.

Returning to (808), if the patron selects yes, the interface server updates the system seat record database to indicate that the seat is available for exchange/swap (810). Next, the redirect/identification server directs the patron's user device to a redirect URL that is uniquely coded to the tag (812) and the redirect URL launches a GUI on the user device showing all seats available for exchange/swap (814). Next, patron #1 selects the target seat location to which he wishes to exchange from the selection of currently available seats in the system seat record database as displayed in the GUI on the patron's user device (816). Patron #1's user device sends patron #1's target seat location selection to the interface server (818) and the interface server updates the system seat record database to take patron #1's current seat location and patron #1's target seat location out of circulation for the seats available for exchange/swap in the system seat record database (820).

Next, the interface server queries the system user record database to identify the user/device ID record for the target seat location (822). Once identified, this patron associated with the user/device ID record for the target seat location will be known as patron #2. The interface server directs patron #2's user device to a unique redirect URL encoded to the tag ID on patron #2's seat (824). The redirect URL launches an interactive GUI on patron #2's user device that gives patron #2 the location of patron #1's original seat and asks patron #2 if he wants to exchange/swap seats with patron #1 (826).

After seeing the location of patron #1's original seat location, patron #2 has two options. First, patron #2 can decline to exchange/swap with patron #1 (830) by clicking the appropriate selection in the interactive GUI launched on patron #2's user device, in which case, patron #2's user device sends patron #2's decision of "no" to the interface server (832) and the interface server or the redirect/identification server updates the system seat record database to update the resource records to return patron #1's original seat location and patron #1's target seat location back to circulation for the seats available for exchange/swap (834) on the platform. After this, the process is complete and patron #1 is free to restart at (808) to select another seat.

Second, patron #2 can accept to exchange/swap with patron #1 (828) by clicking the appropriate selection in the interactive GUI launched on patron #2's user device, in which case, patron #2's user device sends patron #2's decision of "yes" to the interface server (836). In this instance of "yes", the interface server updates the user/device records for patron #1 and patron #2 stored in the user/device record database and the seat resource records for the original seat location and the target seat location stored in the system seat record database so that the user/device ID record for patron #1 is associated with the resource record for the target seat location and the user/device ID record for patron #2 is associated with the resource record for the original seat (838).

Once the records have been correctly associated to reflect the swap at (838), three things occur simultaneously. The interface server directs patron #1's user device to a redirect URL that is uniquely coded to the tag ID for the target seat (840) and the redirect URL launches an interactive GUI on patron #1's user device (or alternatively sends an e-mail, SMS, MMS, text message, phone call, push notification or socket notification) confirming that the exchange/swap is complete in the system seat record database and patron #1 is the verified owner of the target seat (842). The interface server also directs patron #2's user device to a redirect URL that is uniquely coded to the tag ID for the original seat (844) and the redirect URL launches an interactive GUI on patron #2's user device (or alternatively sends an e-mail, SMS, MMS, text message, phone call, push notification or socket notification) confirming that the exchange/swap is complete in the system seat record database and patron #2 is the verified owner of the original seat (844).

Also, simultaneously, the interface server sends an API call to the ticketing platform that sold the original and target seats (848), and the interface server informs the ticketing platform server of the exchange/swap (850). The ticketing platform server then updates the ticketing platform database so that the unique identifying information for patron #1 is associated with the target seat and the unique identifying information for patron #2 is associated with the original seat (852), after which the ticketing platform server disables the original unique identifying ticket code for the original seat (854) and the ticketing platform server disables the original unique identifying ticket code for the target seat (858). Finally, to complete the process, the ticketing platform server issues a new ticket to patron #1 for the target seat (856) via the channels disclosed in Module #1 beginning at (3232 from FIG. 6A) and the ticketing platform server issues a new ticket to patron #2 for the original seat (860) via the channels disclosed in Module #1 beginning at (3232 from FIG. 6A). Patrons are free to exchange/swap seats an infinite number of times during any event by restarting the process at (808).

In a non-limiting example of Embodiment #2 depicted in FIG. 14, patron #1 (2002) Sam and patron #2 (2004) Jane, two unrelated patrons, are attending a football game at Southside Stadium. While this example discusses only two patrons, it should be understood that there can be as many, or more patrons as there are seats in the venue or tickets sold for the event. Sam and Jane have each purchased tickets as more fully described in Module #1, entered the venue as more fully described in Module #2, accessed the system as more fully described in Module #3 and verified their ticket as more fully described in Module #4.

When patron #1 (2002), Sam, sits in his original seat location (2006) and with his user device (14a), scans the tag (16), Module #3 is activated and the interface server (306) via the redirect/identification server launches an interactive GUI (218 from FIG. 2) on Sam's user device (14a). Likewise, when patron #2 (2004) Jane sits in her target seat location (2008) and with her second user device (2010), scans the tag (2012), Module #3 is activated, and the interface server (306) launches an interactive GUI (218 from FIG. 2) on Jane's second user device (2010). While this example discusses only two user devices, it should be understood that there can be as many, or more, user devices as patrons attending the event.

As previously discussed in Modules #3 and 4, each tag is assigned a tag ID that is uniquely coded to a seat in the venue. In this example, Sam's original seat (2006) in Section 212, Row E, Seat 5 is assigned a tag ID that is uniquely coded to the tag (16) on the original seat and that information is stored as a unique seat resource record (152) in the system seat record database (146). Likewise, Jane's target seat (2008) in Section 220, Row G, Seat 2 is assigned a tag ID that is uniquely coded to the tag (2012) on the target seat and that the information is stored in its own unique seat resource record (152) in the system seat record database. When patron #1 (2002), Sam, scans his tag (16) with his user device (12) the interface server (306) updates both Sam's user/device ID record (176) and the unique seat resource record (152) for Sam's seat and the interface server (306) associates Sam's user/device ID record (176) with the unique seat resource record (152) associated with Sam's original seat (2006) in Section 212, Row E, Seat 5. The same process applies to patron #2 (2004), Jane, and any/all patrons that scan the tag with a user device to access the system (10).

The system seat record database (146) is unique to each event at each venue and is dynamically updated in real time to capture information for the particular event such as, which seats have been sold, which seats are available, which seats are sold, occupied and verified, which seats are sold but unoccupied and/or verified, which seats are available for exchange/swap, which seats are unavailable for exchange/swap, or any combination of the foregoing. The system seat record database (146) may interface with any number of external servers or databases such as the primary ticketing platform server (156) or the third-party resale platform server (178) via API calls (154) or any other means of communication generally known in the art. Through these interfaces, the system record database (146) can be updated to have a real time inventory of all unsold tickets/seats for a particular event which can be queried by the interface server. In this non-limiting embodiment, the system seat record database (146) keeps an accurate inventory of all seats that are available for exchange/swap during a particular event in real time so that when the patron accesses the inventory in the GUI on his user device, the patron sees only those seats available at that exact moment. The system seat record database (146) also has the ability to place a hold on seats effectively taking them out of circulation until the exchange/swap transaction described in this embodiment is either completed or terminated. A particular unique seat resource record (152) can be shown as available or unavailable for exchange/swap an infinite number of times during the course of an event. The unique seat resource record can also store or be associated with any number of unique identifying ticket code records assigned to a seat at a particular time. However, it should be noted that the unique seat resource record's (152) association with a particular tag ID will never change as this is a constant.

Returning to this non-limiting example, the interactive GUIs on user device (14a) and second user device (2010) ask the patrons if they would like to list their seat locations for exchange/swap. In this example, Sam and Jane each select yes, list for exchange/swap, but if either Sam or Jane had selected no, don't list for exchange/swap, that patron's user device, either (14a or 2010) as appropriate relays the selection to the interface server (306) which in-turn updates the unique seat resource record (152) stored on the system seat record database (146) to indicate that particular seat is not available for exchange/swap.

As previously indicated, patron #1 (2002), Sam, has selected, yes, exchange/swap from the interactive GUI on his user device (14a). The interface server (306) updates the unique seat resource record (152) for Sam's original seat (2006), Section 212, Row E, Seat 5 to show that it is available for exchange/swap and stores the updated record in the system seat record database (146). Next, the interface server (306) directs Sam's user device (14a) to a first unique redirect URL that is uniquely coded to the tag ID. The first unique redirect URL launches an interactive GUI (218 from FIG. 2) on Sam's user device (14a) showing all seats in the system seat record database (146) that are available for exchange/swap at that exact moment in time. Sam selects the desired target seat location from the pool of all available seats. In this example, Sam selects that he wants to exchange/swap his original seat (2006) for Section 220, Row G, Seat 2, which becomes the target seat (2008). Patron #1's user device (14a) sends the target seat (2008) selection to the interface server (306) and the interface server (306) updates the system seat record database (146) to take Sam's original seat (2006) and Sam's selected target seat (2008) out of circulation.

Next, the interface server (306) queries the system user/device ID record database (142) to identify the user/device record (176) associated with the target seat (2008). In this example, when the interface server (306) queries the system user/device ID record database (142), it determines that Jane is the patron sitting in Section 220, Row G, Seat 2 and the interface server (306) directs Jane's second user device (2010) to a second unique redirect URL encoded to the tag ID on Jane's seat (2008). The second unique redirect URL launches an interactive GUI (218 from FIG. 2) on patron #2's user device (2010) asking patron #2 (2004) if she would like to exchange/swap seats with patron #1 (2002). In this example, the GUI on Jane's user device (2010) asks her if she wants to exchange/swap her target seat (2008) in Section 220, Row G, Seat 2 for Sam's original seat (2006) in Section 212, Row E, Seat 5.

Jane now has two options: accept the exchange/swap or decline the exchange/swap. If Jane, patron #2 (2004) declines, patron #2's second user device (2010) sends the no selection to the interface server (306) and the interface server (306) updates the system seat record database (146) to update the unique seat resource records (152) to return patron #1's current seat location (2006) and patron #1's target seat (2008) selection back to circulation and the interface server (306) notifies patron #1's user device (14a) that the exchange/swap has been declined by patron #2 (2004). If patron #1 chooses, he can start the process over again by picking a new target seat from the pool of available seats from the system seat record database (146).

Returning to this illustration, Jane has selected to accept the exchange/swap with Sam. Here again patron #2, Jane's second user device (2010) sends the yes selection to the interface server (306) and the interface server updates the records so that Sam's user/device ID record is associated with the unique seat resource record (152) for the target seat (2008) in Section 220, Row G, Seat 2 and Jane's user/device ID record is associated with the unique seat resource record (152) for the original seat (2006) in Section 212, Row E, Seat 5.

Following this, the interface server (306) does several things simultaneously. The interface server (306) directs patron #1's user device (14a) to a first unique redirect URL and the first unique redirect URL launches an interactive GUI on patron #1's user device (14a) confirming that the exchange/swap is complete and patron #1 (2002) is now the verified owner or the target seat (2008). Simultaneously, the interface server (306) directs patron #2's second user device (2010) to a second unique redirect URL and the second unique redirect URL launches an interactive GUI on patron #2's second user device (2004) confirming that the exchange/swap is complete and patron #2 (2004) is now the verified owner of the original seat (2006).

Also simultaneously, the interface server (306) sends an API call (154) to the ticketing platform server (157) that sold tickets for the original seat (2006) and the target seat (2008), and the interface server (306) informs the ticketing platform server (157) of the exchange/swap. The ticketing platform server (157) updates the ticketing platform database (159) so that the unique identifying information (166) for patron #1 (2002) is associated with the target seat (2008) and the unique identifying information (166) for patron #2 (2004) is associated with the original seat (2006). The ticketing platform server (157) then disables the unique identifying ticket code (164) for the original seat (2006) and issues a new unique identifying ticket code (164) to patron #1 for the target seat (2008) via the channels described in Module #1. Also, the ticketing platform server (157) disables the unique identifying ticket code (164) for the target seat (2008) and issues a new unique identifying ticket code (164) to patron #2 for the original seat (2006) via the channels described in Module #1. So, in this example, Sam receives a unique identifying ticket code (1164) for Section 220, Row G, Seat 2 and Jane receives a unique identifying ticket code (64) for Section 212, Row E, Seat 5.

While this Embodiment #2 only describes the exchange/swap process happen one time, it should be understood that a patron can exchange/swap seats an infinite number of times before or during an event and the time duration for what constitutes the event shall be determined by an administrator or proprietor. It should also be understood that while this Embodiment #2 describes only a first and second patron device, there are as many, or more, different patron devices as there are patrons at the event and while this embodiment only describes a first and second tag URL and redirect URL, there are as many or more tag URLs and redirect URLs as there are tags in the venue. Additionally, while the system described in this Embodiment #2 depicts a single interface server (306) this can also be a plurality of servers and while this Embodiment #2 depicts a plurality of databases stored on the interface server (306), this can also be a single database with one or a plurality of different types of records.

Embodiment #3: Seat Swap Between Two Patrons with Fees Exchanged Between the Patrons Embodiment #3 is a variation on Embodiment #2 wherein rather than two patrons exchanging/swapping seats for no fee, patrons are able to assign an exchange/swap value to their seat, or have the system place a value on their seat based upon a dynamic pricing model determined by the system, and exchange/swap with patrons who are willing to pay this fee for the exchange/swap. There are many reasons that a patron may want to offer his seat for exchange/swap for a fee at an event. For example, patron #1 may hold a ticket for a premium seat at a NASCAR race. If patron #1's favorite driver drops out of the race early and patron #1 no longer has a vested interest in the outcome of the event, he has the opportunity to make a profit from exchanging/swapping the seat with another patron currently sitting in a less desired seat. Likewise, a patron who purchases premium seats to a music festival but who is only interested in seeing one band from the lineup may wish to make a profit from exchanging/swapping his seat with another patron after the band he came to see has finished performing.

Embodiment #3 functions essentially the same as Embodiment #2 except Embodiment #3 contains a pricing and payment feature within the platform. As discussed above in Embodiment #2, the patron has purchased his ticket as more fully described in Module #1, has entered the venue as more fully described in Module #2, has accessed the system as more fully described in Module #3, has verified the ticket as more fully described in Module #4 and has completed steps 800-808 from FIG. 15A. However, at (808), Embodiment #3 deviates as depicted in FIG. 15A as after patron #1 selects yes, exchange/swap at (808 from FIG. 15A), the GUI launches three options from which the patron can select. If patron #1 selects, no fee for the swap/exchange at (902), the system returns to (810 from FIG. 15A). If patron #1 selects exchange/swap for a fee that the patron determines at (900), the interactive GUI asks patron #1 to input the price patron #1 is requesting for the seat to be exchanged/swapped (904). The price can be any currency amount selected by the patron from zero to infinity. The price could also be a negative number. Next, the patron's user device sends the price the patron has set to the interface server (906) after which, the interface server updates the unique seat resource record to include the price patron #1 has set for another patron to acquire the seat through the exchange/swap (908). The interface server includes the price set to acquire the seat through an exchange/swap in the GUI launched to all patrons' user devices showing available seats (910) and then the process returns to (810 from FIG. 15A). The patron is able to change the price set for the seat an infinite number of times by restarting the process at (900).

Alternatively, patron #1 can select exchange/swap seat for a dynamically determined price set by the system (912). If patron #1 makes this selection, patron #1's user device sends the decisions to have the price for exchange/swap determined dynamically by the system to the interface server (914). The interface server updates the unique seat resource record to indicate the price will be dynamically determined by the system (916) and the interface server executes an algorithm to determine the dynamic pricing fee (918). The algorithm continues to adjust to price based upon various datapoint variables set by the system such as time left in the event, significance of the event, current market price for the tickets, etc. (920) and the interface server updates the unique seat resource record to include the current price for the swap (922). The interface server includes the price set to acquire the seat through an exchange/swap in the GUI launched to all patrons' user devices showing available seats (910) and then the process returns to (810 from FIG. 15A). The algorithm at (920) is able to adjust the price of the seats an infinite number of times during the event based upon the datapoints and the unique seat resource record is updated at (922) each time the price adjusts.

Figure 17B:
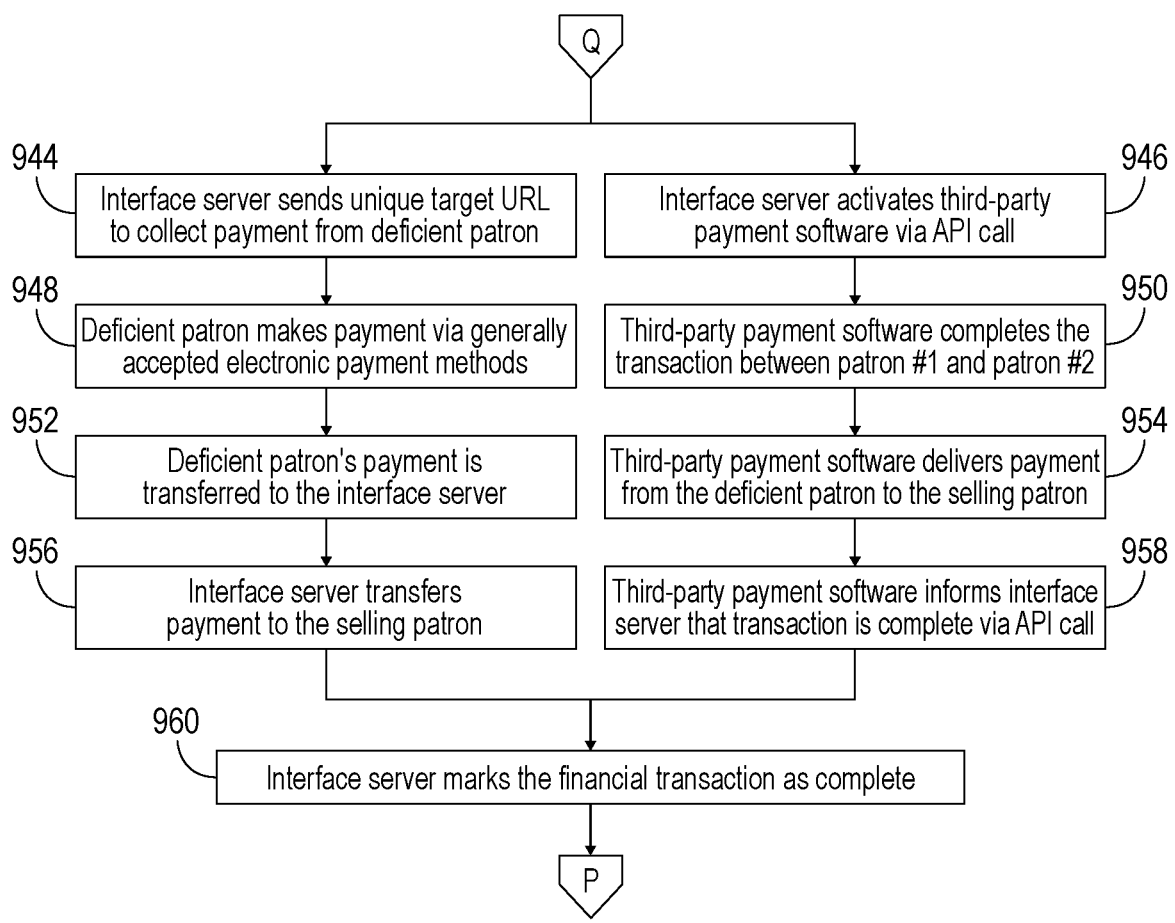

Embodiment #3 continues to follow the process detailed in Embodiment #2 until (836 from FIG. 15B) when patron #2's user device sends patron #2's acceptance to proceed to exchange/swap seats with patron #1 to the interface server. Here, as shown in FIG. 17A and FIG. 17B, the interface server queries the exchange/swap value of patron #1's original seat from the unique seat record database (924) and the interface server queries the exchange/swap value of patron #2's target seat from the unique seat record database (926). Next, the interface server calculates the price difference (928), and the interface server sends the price difference to the GUI on patron #1's user device (930) and the interfaces server sends the price difference to the GUI on patron #2's user device (932). In this Embodiment #3, after the price difference has been calculated, the patron whose ticket has the larger exchange/swap value will be referred to as the selling patron and the patron whose ticket has the lesser exchange/swap value will be referred to as the deficient patron for purpose of the payment module described below.

Here, patron #1 and patron #2 are asked to proceed or decline the exchange/swap. If patron #1 declines to proceed (936) and/or patron #2 declines to proceed (938), the process returns to (834 from FIG. 15B) and the original seat and the target seat are returned to circulation.

However, if patron #1 confirms, yes, proceed with exchange/swap (934) and patron #2 confirms, yes, proceed with exchange/swap (940), the interface server launches a payment module (946). The payment module can be a third-party peer-to-peer payment service such as Paypal®, Venmo®, Zelle®, Google Pay® or any other peer-to-peer payment system generally known in the art. In this instance, the interface server activates the third-party payment software via an API call (946) and the third-party payment software completes the transaction between patron #1 and patron #2 (950). The third-party software delivers payment from the deficient patron to the selling patron (954) and the third-party payment software informs the interface software that the transaction is complete via an API call (958). At this point, the process returns to (838 from FIG. 15B) and the interface server updates the records and completes the process as described in Embodiment #2.

Returning to (942) rather than engaging third-party peer-to-peer payment software, the system completes the transaction within the platform by having the interface server send a redirect URL to the deficient patron's user device to collect payment from the deficient payment (944). Using the redirect URL, the deficient patron makes a payment via generally accepted channels (948) such as, but not limited to, digital wallet transfer, credit card payment, ACH payment, cryptocurrency payment, etc. The deficient patron's payment is transferred to the interface server (952) after which the interface server transfers the payment to the selling patron (956) and the interface server marks the financial transaction complete (960). At this point, the process returns to (838 from FIG. 15B) and the interface server updates the records and completes the process as described in Embodiment #2.

Figure 16:
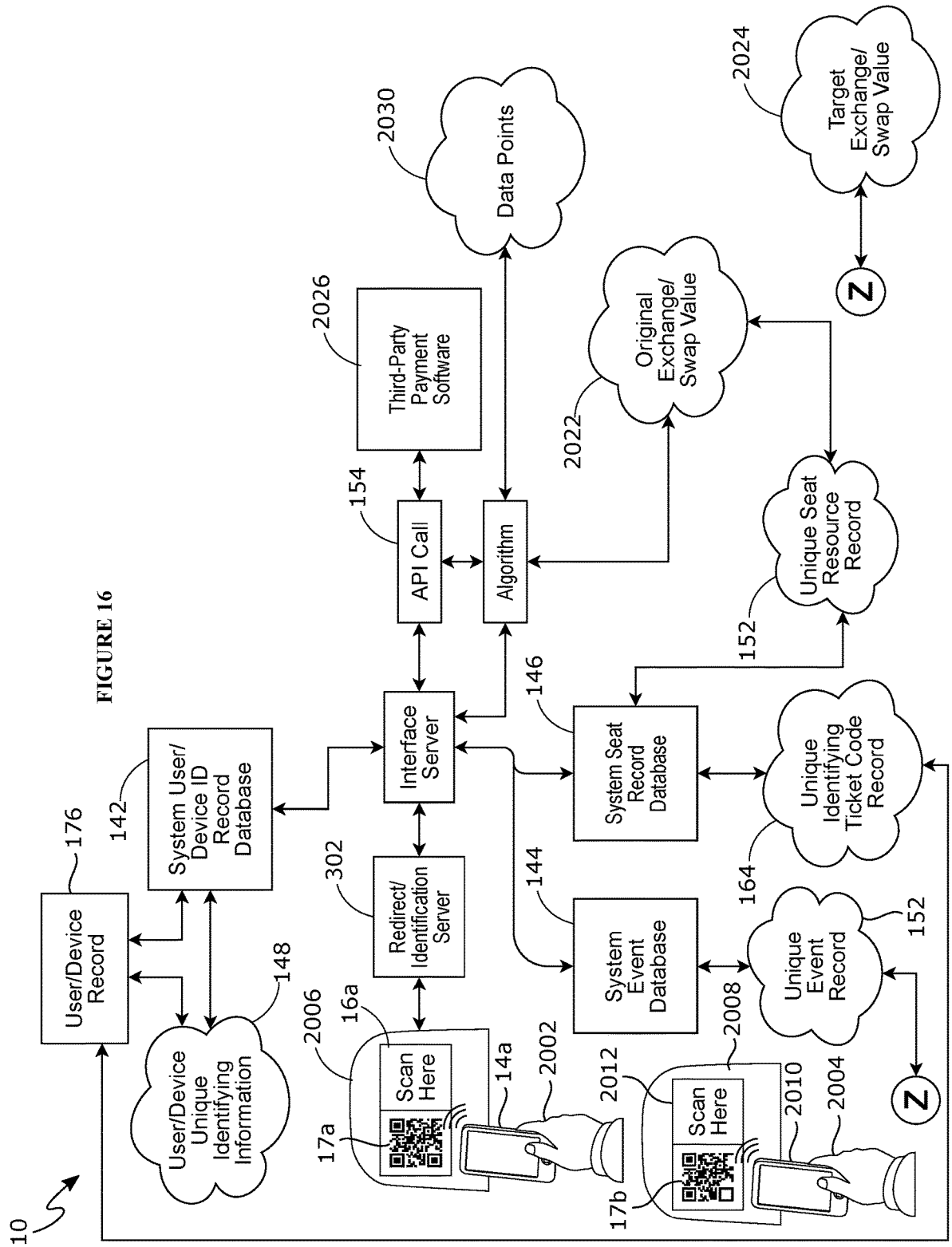
FIG. 16 is a block diagram of "Embodiment #3: Exchange Seats Between Two Patrons at an Event Wherein Funds are Exchanged Between the Patrons."

In a non-limiting example of Embodiment #3 depicted in FIG. 16, patron #2 (2004) Sally has purchased tickets to the Summer Music Festival at Tunes Arena. There are ten bands playing at the festival and Sally's favorite band is act seven of ten. Sally has purchased a premium seat in Section 104, Row D, Seat 15, to ensure a good view of the stage while her band is playing but she is indifferent to seeing the acts that follow her favorite band. Sally has purchased tickets as more fully described in Module #1, entered the venue as more fully described in Module #2, accessed the system as more fully described in Module #3 and verified her ticket as more fully described in Module #4. After Sally's favorite band completes its set, Sally decides to list her ticket for exchange/swap. She starts the process more fully described in Embodiment #2 completing steps from FIG. 15A at (800-808). However, after completing (808), patron #2 (2004), Sally, selects that her seat will be listed for a patron determined fee from the interactive GUI on her second user device (2010). The interactive GUI asks Sally to input the price for which she would like to list the seat for exchange/swap. Knowing that the bands that follow are extremely popular, Sally believes that another patron would pay $30 to sit in her target seat location (2008). Sally enters $30 into the interactive GUI on her second user device (2010) and her second user device (2010) sends that price to the interface server (306) which updates the unique seat resource record (152) associated with patron #2's (2004) target seat location (2008) and stores that record in the system seat record database (146). This exchange/swap fee will be displayed on the GUI launched on other patron devices accessing the inventory of all available seats for exchange/swap. Sally has the ability to edit this price at any time during the event. For example, if no one has selected to exchange/swap with her and the final act is getting ready to take the stage, Sally may drop the price of her ticket to $10 for exchange/swap. After Sally has specified the price of her ticket for exchange/swap, the process previously described in Embodiment #2 resumes at (810 from FIG. 15A).

Mark, patron #1 (2002) has also bought a ticket to Summer Music Festival at Tunes Arena. Mark's ticket is for Section 310, Row K, Seat 5. Mark has purchased a ticket as more fully described in Module #1, entered the venue as more fully described in Module #2, accessed the system as more fully described in Module #3 and verified his ticket as more fully described in Module #4. When Mark, patron #1 (2002) sits in his seat, his user device (14*a*) scans the tag (16*a*) on his original seat (2006), and he starts the process more fully described in Embodiment #2 completing steps from FIG. 15A at (800-808). However, after completing (808), patron #1 (2002), Mark, selects that his seat will be listed for exchange/swap at a patron determined fee from the interactive GUI on his user device (14*a*). In this example, Mark knows that his seat is not a premium one, so he lists the fee to exchange/swap to his original seat location (2006) at $5. Mark enters $5 into the interactive GUI on his user device (14*a*) and his user device (14*a*) sends that price to the interface server (40) which updates the unique seat resource record (52) associated with patron #1's (2002) original seat location (2006) and stores that record in the system seat record database (46). Here, after Mark has specified the price of his ticket for exchange/swap, the process previously described in Embodiment #2 resumes at (810 from FIG. 15A).

The Summer Music Festival is drawing closer to the end. Band #8 is about to take the stage and Mark wishes he had a better view. Via his user device (14*a*) Mark accesses the system (10) which launches an interactive GUI. The GUI displays an inventory of all seats currently available for exchange/swap and the prices associated with each. Mark sees that Sally's premium seat has just been listed for swap/exchange for $30 which to Mark is a reasonable price to sit closer to the stage. Following the steps outlined in greater detail in Embodiment #2, from the GUI on the user device (14*a*), Mark, patron #1 (2002) selects exchange/swap seats with Sally, patron #2 (2004). This selection is sent to the interface server (306) from Mark's user device (14a) and the interface server (306) sends a unique second redirect URL to Sally's second user device (2010) which launches the patron #2 interactive GUI showing Sally that Mark wants to swap his original seat (2006) in Section 310, Row K, Seat 5 for Sally's target seat (2008) in Section 104, Row D, Seat 15. If Sally, patron #2 (2004), accepts to proceed to exchange/swap seats with patron #1 (2002) at (828 from FIG. 15B), then when patron #2's second user device (2010) sends patron #2's selection to the interface server (306) at (836 from FIG. 15B), then again, this Embodiment #3 deviates from the previously described Embodiment #2 in that the interface server (306) queries the exchange/swap value (2022) for patron #1's original seat location (2006) from the system seat record database (146) and the interface server (306) queries the exchange/swap value (2024) for patron #2's target seat location (2008) from the system seat record database (146). The interface server then calculates the price difference between the exchange/swap value of patron #1's seat (2022) and the exchange/swap value of patron #1's seat (2024) and the interface server (306) sends the price difference to the interactive GUI on patron #1's user device (14a) and also to the interactive GUI on patron #2's second user device (2010). Here, the interface server (306) sends a first redirect URL to the interactive GUI on Mark's user device (14a) informing Mark that the cost to swap seats with Sally will be $25. Because Mark is paying Sally for the exchange/swap, Mark will also be referred to as the "deficient patron". The interface server (306) sequentially or simultaneously sends a second redirect URL to the interactive GUI on Sally's second user device (2010) informing Sally that she will receive a $25 profit from exchanging/swapping seats with Mark. Because Sally is receiving money from Sally for the exchange/swap, Sally will also be referred to as the "selling patron".

In addition to displaying the cost/profit of the exchange/swap, the GUI will ask each patron if they want to proceed or decline the exchange/swap. If either patron #1 (2002) or patron #2 (2004) selects to decline the exchange/swap from their respective GUIs, that decision is sent from the respective patron's user device (either 14a or 2010) to the interface server (306) at which time the process returns to the steps detailed in Embodiment #2 at (834 from FIG. 15B). However, if both patron #1 (2002) and patron #2 (2004) confirm, yes, proceed with the exchange/swap then the interface server (306) launches a payment module. Returning to this example, Mark believes that paying an additional $25 to sit in a premium seat for the remainder of the Summer Music Festival is a worthwhile purchase and Sally is happy to make a $25 profit from exchanging/swapping her seat now that her favorite band has concluded its performance. Accordingly, they both select yes, proceed with exchange/swap, and the interface server (306) launches the payment module. It should be understood that the currency used throughout this example can be any national currency such as US dollars or Euros, or a cryptocurrency such as Bitcoin or Ethereum, and the system will be capable of calculating the currency exchange rate and facilitating transactions between any two currencies used within the system.

The payment module can function in one of two ways. The interface server (306) can activate third-party, peer-to-peer payment software (2026) via an API call (54) and the third-party payment software (2026) will complete the transaction between patron #1 (2002) and patron #2 (2008) by collecting payment from the deficient patron and transferring the payment to the selling patron. Once the transaction is complete, the third-party payment software (2026) informs the interface server (306) that the transaction is complete via and API call (154) at which time the process returns to the steps detailed in Embodiment #2 at (838 from FIG. 15B). Third-party payment software can be any off-the-shelf or proprietary software that facilitates peer-to-peer transactions such as Venmo®, Zelle®, Google Pay®, Apple Pay®, a digital wallet feature or a cryptocurrency exchange.

Alternatively, the interface server (306) can complete the transaction within the platform (20) by sending a unique redirect URL to collect payment from the deficient patron by launching an interactive GUI on the deficient patron's user device. The deficient patron makes a payment via generally accepted electronic payment methods such as a credit card or digital wallet payment and the deficient patron's payment is transferred to the interface server (306) which in turn transfer the payment to the selling patron. The interface server (306) marks the financial transaction as complete at which time the process returns to the steps detailed in Embodiment #2 at (838 from FIG. 15B).

Returning to this example, Mark, the deficient patron, chooses to pay the fee associated with the exchange/swap to Sally, the selling patron, via the third-party payment software (2026) Venmo®. After Mark makes the payment using his Venmo® account and Sally receives the payment, the interface server (306) marks the financial transaction as complete and the process continues through the remaining steps in Embodiment #2 until Mark is issued the unique identify ticket code (164) for the target seat location (2008) in Section 104, Row D, Seat 15 and Sally is issued the unique identifying ticket code (164) for the original seat location (2006) in Section 310, Row K, Seat 5.

In another non-limiting example of Embodiment #3, Jack is a season ticket holder of a premium seat for his favorite baseball team. Jack attends every game, but his level of interest in the game varies based upon the skill level of the opposing team and the number of star players of the home team playing in any given game. Some games just aren't as good as others and for the games that are not as interesting to Jack, he'd rather exchange/swap his premium seat for a less expensive seat and make a profit from exchanging/swapping his ticket. At this particular game, the opposing team has the worst record in the league and the home team has opted to rest most of its starting players. According at (912 from FIG. 17A), Jack, patron #2 (2004) selects dynamic system determined fee for exchange/swap from the interactive GUI launched on his second user device (2010).

Jack's second user device (2010) sends his selection to the interface server (40) which updates the unique seat resource record (152) for the target seat (2008) to indicate the target exchange/swap value (2024) will be a dynamic system determined fee and stores that information in the system seat record database (146). Next, the interface server (306) executes the algorithm (2028) to determine the dynamic pricing. The algorithm (2028) adjusts the target exchange/swap value (2024) based upon a single datapoint (2030) or a plurality of datapoints (2030) such as the time left in the event, the significance of the event, the current market price for the tickets, etc. The algorithm (2028) may obtain these datapoints from the system event database (144) or any other servers or databases internal or external to the platform (20). The interface server (306) continuously updates the unique seat resource record (152) to include the current price of the target exchange/swap value (2024) and the interface server (306) includes the current price for exchange/swap in the GUI showing available seats sent to all patrons. Here, at (910 from FIG. 17A), Embodiment #3 functions exactly as described above and in conjunction with Embodiment #2 as appropriate.

Returning to this non-limiting example, because Jack has selected dynamic system determined fee, the algorithm (2028) may determine that based upon the data points (2030), the baseball game is likely to be a blowout for the home team and therefore, the target exchange/swap value (2024) is only $10 for patron #1 to obtain Jack's premium target seat (2008). However, as the game progresses into the 6th inning, the opposing team's pitcher has thus far pitched a no-hitter. Accordingly, if Jack's target seat location (2008) has not yet been exchanged/swapped with another patron, the algorithm (2028) adjusts the target exchange/swap value (2024) to $50 based upon the datapoints (2030). If going into the 7th inning, the opposing team's pitcher still has the opportunity to pitch a no-hitter, the algorithm (2028) will adjust the target exchange/swap value (2024) to $100. However, if at the end of the 6th inning, the home team has gotten a hit, the algorithm (2028) will adjust the target exchange/swap value (2024) to $5. The algorithm (2028) will continue dynamic pricing of the target exchange/swap value (2024) until patron #1 (2002) selects the target seat (2008) from the interactive GUI on his user device (14a) and indicates patron #1 (2002) would like to swap/exchange for the target seat (2008) at which time the target exchange/swap value (2024) is locked. Essentially, the algorithm (2028) uses artificial intelligence ("AI") and machine learning to set the price.

While throughout these non-limiting examples, patron #2 is known as the patron selling his target seat which is a premium seat which he his exchanging for less desirable seat at a profit and patron #1 is known as the purchasing or deficient patron who is relinquishing his original seat for an upgraded premium for a fee, it should be understood that any patron attending the event can be either patron #1 or patron #2 at any time during the event and patron # and patron #2 can interchangeably be the ticket holder for the original seat or the target seat at any time during the event depending upon which patron initiates the exchange/swap.

Embodiment #4: Dynamic Pricing Applied to Exchanging/Upgrading Seat(s) from a Selection of Available/Empty Seat(s)

Embodiments #1A and #1B, provide patrons with a mechanism to exchange or upgrade their seats by paying the price difference between the face value of the patron's original seat and the target seat. However, an advantage exists for a proprietor such as a venue, promotor, performer, team, production company or ticketing platform to control dynamic pricing of seats before or during an event for any number of reasons. For example, premier seats for an event that is being televised may remain unsold leading up to an event or after the event has started. Those vacant seats will be shown in the televised broadcast which may not reflect favorably on the event, venue, promotor, perform, team or production company. Accordingly, by dynamically pricing those vacant seats to lower the price of the seat from face value, patrons may be incentivized to upgrade their seats to fill the vacancy that would otherwise be seen in the televised broadcast. Alternatively, a limited number of premier seats may remain unsold for a highly popular event. In this instance, knowing that the seats are of greater value to patrons than the face value of the ticket, a venue, promotor, performer, team, production company or ticketing platform may want to charge a premium price for the exchange/upgrade. In yet another example, an event may gain historical significance as the event proceeds, for example, a baseball game where, as the game progresses, it becomes evident that the pitcher may have the opportunity to pitch a no hitter. In this instance, the face value of the ticket for an unoccupied seat may increase as the game draws closer to its conclusion. Additionally, by exchanging/upgrading patrons currently at the event to more premium seat locations, less expensive seats become available to be released for sale to those not at the event.

Figure 18:
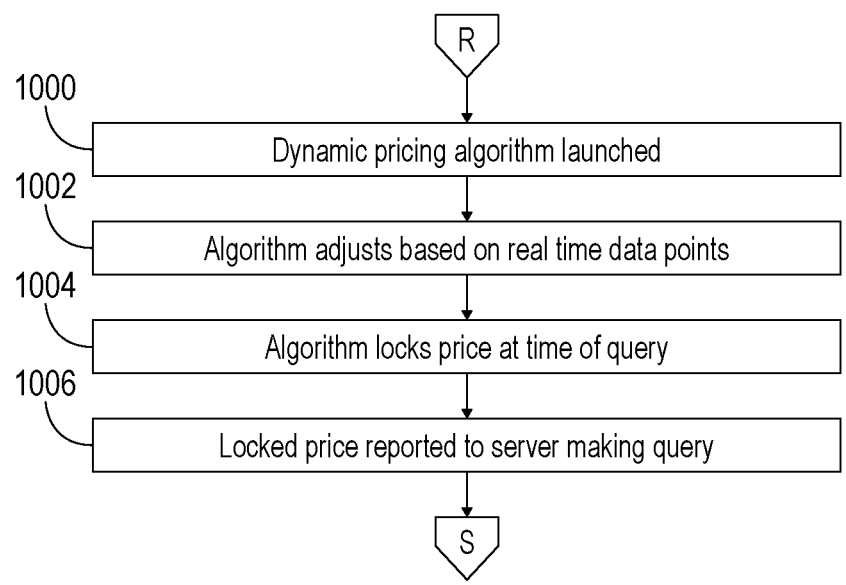
FIG. 18 is a flowchart for "Embodiment #4: Exchange Seats Between Two Patrons at an Event Wherein Pricing is Dynamic."

As this Embodiment #4 is a variation of Embodiments #1A and #1B, it is activated at (3670 from FIG. 11B) and at (744 from FIG. 13B) when the ticketing platform server queries the price of the ticket for the target seat location. As shown in FIG. 18, when the interface server sends a query to the ticketing platform, the dynamic pricing algorithm is launched (1000). The algorithm adjusts the price of the ticket for the selected seat based upon real time data points (1002). The algorithm utilizes AI and machine learning in connection with the data points to adjust the price of the ticket based upon many factors. For example, if a multitude of tickets remain unsold after the start of the event, the algorithm may decrease the price of the ticket for a premium seat to entice patrons to upgrade their seat. However, if during the course of the event, something takes place that will make the event of greater historic significance, the algorithm may increase the price of a seat as it has now become more valuable. The algorithm may adjust the price of a ticket either up or down, an infinite number of times before or during an event until the ticketing platform queries the price at which time the price is locked (1004) until the seat is returned to the pool of available seats. The locked price is reported to the server making the query (1006) at which point the process from Embodiment #1A resumes at (3670 from FIG. 11B) or the process from Embodiment #1B resumes at (746 from FIG. 13B).

Embodiment #5: Venue-Wide Exchange/Swap Occurring at a Set Time Before the Event Starts In this embodiment, a venue, promotor, performer, team, production company or ticketing platform designates a time prior to the start of an event at which the time exchange/swap will commence. When patrons enter the venue, they scan the tag on their seats to launch the system with their user devices. From the GUI launched on the user device, the user selects, enter venue-wide exchange/swap. Prior to the start of the event, at the designated time, all seats designated for exchange/swap, as well as all unsold seats queried from the primary ticketing platform and the third-party resale platform are locked in the system seat record database.

Here, all available seats are ranked in value. Those patrons already in the venue or simply holding a ticket, whether used or unused, can choose to enter to obtain an improved or different ticket. In one embodiment, a fee is paid into the system, and a lotter simply determines the new seat—wherein seats of equivalent value are exchanged with like seat tickets. Thus, if there are seats at $100, $50, and $20 at a venue, only the $100 seats will exchange with one another, then the $50 seats, then the $20 seats. This allows patrons who normally attend to swap to a different view for the one game.

In another situation, the seats are auctioned off, with the "best seat" being auctioned first and exchanged with the next best seat. When a seat is sold, then it enters the protocol for the next seat available. Each seat can be bid on by all patrons seeking to exchange.

Embodiment #6: Sale of Seat that is Purchased but not being Used (i.e., on StubHub for Secondary Purchase Market), Direct Purchase Through Digital Seat if No Ticket, or Upgrade from Existing Seat to Improved Seat Many times, a patron will hold season seats to a particular team and for whatever reason, is unable to attend. Thus, the ticket is shown as unavailable within the venue system, but the ticket is made available on a third-party selling app. Thus, a patron at the venue can identify an open seat, scan their tag, and use a third-party API to populate any seats that are available for purchase. Bob, selecting seats in the front row that are attractively priced, seeks to purchase those tickets. The ticketing platform then provides payment for the asking price for the front row seats, and relinquishes Bob's seats to the system or back to a third-party app. Typically, in such a case, a fee is paid both for the difference in value in the tickets, the value as set by the patron offering the seats for sale, as well as one or more convenience or service fees to the third-party ticketing platform, as well as the digital seat platform.

Embodiment #7: Patron Offers Seat for Exchange/Swap at a Price to be Determined by an Auction In some instances, a patron may not wish to set his own price for offering his seat for exchange/swap or allow the system to dynamically set the price via an algorithm. Rather, the patron may want to offer his seat for exchange/swap via an auction in which any patron wishing to purchase the seat can participate. This allows the price to be set by patron demand. With the rise of NFTs and the ability to mint NFTs based upon a patron's verified location at an event, patrons may be motivated to pay premium prices for seats offered at auction for exchange/swap if the seat location being auctioned is tied to the right to mint or purchase an NFT. Embodiment #7 largely follows the process outlined for Embodiment #2 in FIGS. 15A and 15B except at (3670 from FIG. 11B), rather than querying the price of the target seat, the system initiates a live auction via the interface server. The auction can happen within the platform (20) or via any readily available third-party auction software via an API call from the interface server.

Embodiment #8—Swapping/Exchanging Seats without Outside Verification

In another embodiment, a patron exchanges/swaps seats with another patron within the venue without leaving the platform (20) for external verification. The patron purchases a ticket, which may or may not have a unique identifying ticket code. The patron enters the venue and sits in the seat associated with the ticket or any other seat in which the venue permits the patron to sit. The patron scans the tag with his user device which launches a browser with a GUI, or alternatively a web app or progressive web app. The GUI asks the patron if he would like to list his seat for exchange/swap. Because the MRC on the tag is uniquely coded with a tag ID, the system is able to prepopulate the GUI on the user device with the exact seat location scanned.

Next, the system asks the patron to verify his ticket. The patron can do this in several ways. Non-limiting examples include, the GUI can display a simple message such as, "click here to certify that you are the rightful owner of this seat". Alternatively, the GUI can ask the patron to provide unique identifying information, such as a cell phone number at which the patron can be reached for verification, or the system can ask the patron to take a photo of his ticket or otherwise upload a version of his ticket to the resource record or the user/device ID record which is stored on the server or on a secure distributed ledger such as blockchain.

Once the patron has verified his ticket, the server instructs the browser on the patron's user device to display a GUI showing the patron all seats listed for exchange/swap. The patron selects his desired target seat. The system determines the user device associated with the target seat location and sends a push notification or socket notification to patron #2's device asking if patron #2 wants to exchange. If patron #2 selects yes, exchange/swap, the system issues a confirmation to both patrons that the exchange/swap is complete and delivers any unique identifying information or images provided as part of the certification process. This provides the patron a point of contact if the patron's legitimacy to sit in the target seat is ever questioned. The system may also deliver a system generated MRC that replaces the original ticket. If patron #2 selects no, the system notifies the patron of this decision, and the patron is free to select a different target seat.

Referring back to FIG. 3, the infrastructure detailed therein is exemplary, dividing processing between at least two servers (e.g., redirect/identification server [302] and interface server) [306]), but embodiments are not so limited. The numbers and types of servers and software may be scaled up, down, and distributed according to platform (20) demands/needs. Furthermore, more than one virtual machine may run on a single computer and a computer/virtual machine may run more than one type of server software (e.g., the software that performs a service, e.g., Web service, application service, and the like). Thus, in some instances platform (20) may include one computer for all processing demands, and in other instances platform (20) may include several, hundreds, or even more computers to meet processing demands. Additionally, hardware, software, and firmware may be included in or removed from platform (20) to increase functionality, storage, and the like as needed/desired.

Administrator device (12), which is shown in FIG. 1, may be any type of computer such as a laptop computer, desktop computer, tablet, and the like. Similarly, user device (14a or 14b) may be any type of processing device such as a handheld computer (e.g., phone, smartphone, tablet, personal digital assistant), wearable computer (e.g., watch, glasses), or portable computers (e.g., laptop, netbooks). Scanning of the tag (16a, 16b) from the user device (14a or 14b) is performed through near-field communication (NFC) or use of a camera on the user device (14a or 14b) to scan the visible quick response code (QR code). Administrator device (12) and user devices (14a or 14b) typically include a browser application to facilitate communications with one or more servers among other things.

Computer (12), user devices (14a, 14b), and servers (e.g., 302, 306, 310, 312, 320, 322, and 324) may each be a general purpose computer. Thus, each computer includes the appropriate hardware, firmware, and software to enable the computer to function as intended and as needed to implement features detailed herein. For example, a general purpose computer may include, without limitation, a chipset, processor, memory, storage, graphics subsystem, and applications. The chipset may provide communication among the processor, memory, storage, graphics subsystem, and applications. The processor may be any processing unit, processor, or instruction set computers or processors as is known in the art. For example, the processor may be an instruction set based computer or processor (e.g., x86 instruction set compatible processor), dual/multicore processors, dual/multicore mobile processors, or any other microprocessing or central processing unit (CPU). Likewise, the memory may be any suitable memory device such as Random Access Memory (RAM), Dynamic Random-Access memory (DRAM), or Static RAM (SRAM), without limitation. The processor together with at least the memory may implement system and application software including instructions, including methods, disclosed herein. Examples of suitable storage includes magnetic disk drives, optical disk drives, tape drives, an internal storage device, an attached storage device, flash memory, hard drives, and solid-state drives (SSD), although embodiments are not so limited.

In an embodiment, servers (e.g., 302, 306, 310, 312, 320, 322, an/or 324) may include database server functionality to manage database (308) or another database. Although not shown, infrastructure variations may allow for database (308) to have a dedicated database server machine. Database (308) and any other database may be any suitable database such as hierarchical, network, relational, object-oriented, multimodal, nonrelational, self-driving, intelligent, and/or cloud based to name a few examples. Although a single database (308) is shown in FIG. 3, in embodiments database (308) may comprise more than one database, the more than one database may be distributed across many locations, and data may be redundantly recorded in the more than one database. Furthermore, data may be stored in blocks that are part of a chronological blockchain (314) and may be dispersed across a decentralized distributed ledger. Blocks of data in a blockchain are linked in such a way that tampering with one block breaks the chain. Thus, digital data stored in a blockchain is verifiable with an elevated level of integrity. Therefore, the database (308) may also be a distributed database system, utilizing blockchain (e.g., 314) to provide for storage of NFTs or the like related to the system. As with any distributed database, the number of databases and particular nature of the blockchain storage is dependent on the particular exchange or blockchain utilized for the NFT as one non-limiting example. The use of a distributed database system is well known and the storage of an NFT or the like requires the use of such systems. Geofence (316) and Time (318) may be software services provided by the platform (20). These services (316, 318) may be executed by any or all of the computing machines, virtual or otherwise, found on the platform (20). These services may use data from one or more user devices (14a, 14b) and other data sources to provide their intended functionality as is known in the art.

It will be appreciated that the embodiments and illustrations described herein are provided by way of example and that the present invention is not limited to what has been particularly disclosed. Rather, the scope of the present invention includes both combinations and sub combinations of the various features described above, as well as variations and modifications thereof that would occur to persons skilled in the art upon reading the forgoing description and that are not disclosed in the prior art. Therefore, the various systems and methods may include one or all of the limitations of an embodiment, be performed in any order, or may combine limitations from different embodiments, as would be understood by those implementing the various methods and systems detailed herein.

What is claimed is:

1. A system for exchanging tickets for an event comprising:
    a. a server system comprising a computer processor, a server, and a database;
    b. a tag positioned on or near a seat at a venue, the tag comprising a tag ID encoded in a machine-readable code, the tag ID to identify the tag, the venue, and the seat to the server system; and
    c. wherein, in response to receiving a request from a first user device that has scanned the tag to access the system, the system performs the following method:
        i. obtaining a unique ID from the first user device or generating a unique ID for the first user device if the first user device has not already been assigned a unique ID generated by the system;
        ii. obtaining the tag ID from the request and using the tag ID to determine the venue, the event taking place within the venue at a time the tag was scanned by the first user device, and the seat;
        iii. automatically confirming that an original ticket on said first user device matches the venue, the event, and the seat, determined by the tag ID;
        iv. in response to a match, redirecting the first user device to a ticket exchange portal using a target uniform resource locator (URL) linked to the tag ID;
        v. receiving from the first user device a selection of a second seat to obtain a second ticket or to exchange tickets with a second user; and
        vi. enabling purchase of the second ticket or the exchange of tickets with the second user.

2. The system of claim 1 wherein there is a price difference between the first ticket and the second ticket and wherein the user with the price difference pays the price difference to obtain the ticket.

3. The system of claim 2 wherein the price difference between the first and second tickets is determined by dynamic pricing wherein values of each of the first and second tickets are modified.

4. The system of claim 1 further comprising wherein the second user is a third party ticketing platform or the venue.

5. The system of claim 1 wherein the first user device is redirected to a default target if the match is not found.

6. The system of claim 1 further comprising marking the seat identified by the tag ID as being occupied.

7. The system of claim 1 wherein automatically confirming further comprises accessing a third party ticketing platform to obtain unique identifying information about a user that has purchased the ticket for the seat identified by the tag ID and comparing the unique identifying information to data associated with the unique ID, the tag ID, or both.

8. The system of claim 7 wherein accessing a third party ticketing platform further comprises using a unique ticket code on the ticket to obtain the unique identifying information.

9. The system of claim 1 further comprising marking that the ticket has been verified in a database in response to the match.

10. The system of claim 1 wherein manual verification of the ticket is enabled if the match is not found.

11. The system of claim 1 further comprising determining if the tag belongs to a group.

12. A method of verifying ownership of a ticket for exchange or sale comprising:

a. scanning a tag with a user device to obtain a tag ID from the tag, said user device comprising a unique ID;
b. receiving the tag ID and the unique ID at a server and in response thereto using the tag ID to determine a venue, an event in progress, and a location associated with the tag ID;
c. automatically verifying the ownership of the ticket between said user device and said tag ID wherein the user device is redirected to a ticket exchange portal in response to a positive verification, otherwise redirecting the user device to a default target universal resource locator (URL); and
d. identifying the ticket for exchange or sale, said identifying via the ticket exchange portal.

13. The method of claim 12 wherein the verifying step is performed by detecting within said user device a unique identifying ticket code and matching said unique identifying ticket code on said user device with said venue, the event in progress, and the location determined via the tag ID.

14. The method of claim 12 wherein the verifying step is performed by scanning a unique identifying ticket code on a ticket and matching said unique identifying ticket code with said venue, the event in progress, and the location determined via the tag ID.

15. The method of claim 12 wherein the verifying step is performed by contacting a third party ticketing platform to obtain a unique identifying information about a holder of the ticket wherein said unique identifying information confirms the ownership of the location associated with the tag ID.

16. A method for exchanging a first ticket and a second ticket electronically comprising:
    a. scanning a first tag with a first user device, said first user device comprising a first unique ID and said first tag comprising a first tag ID, the first tag ID obtained by the first user device in response to scanning the first tag;
    b. in response to receiving the first unique ID and said first tag ID from said first user device, determining a venue, an event in progress, and a first location linked to the first tag ID;
    c. verifying ownership of the first ticket by a first user by matching data obtained from said first user device to the venue, the event in progress, and the first location determined via said first tag ID;
    d. scanning a second tag with a second user device, said second user device comprising a second unique ID and said second tag comprising a second tag ID, the second tag ID obtained by the second user device in response to scanning the second tag;
    e. in response to receiving the second unique ID and second tag ID from said second user device, automatically determining the venue, the event in progress, and a second location linked to the second tag ID;
    f. verifying ownership of the second ticket by a second user by matching data obtained from said second user device to the venue, the event in progress, and the second location determined via said second tag ID;
    g. listing said first and second tickets for exchange;
    h. receiving a request to exchange said first ticket for said second ticket;
    i. receiving an approval from said second user approving the request to exchange said first ticket for said second ticket; and
    j. issuing a new first ticket and a new second ticket and delivering said new first ticket to said first user and said new second ticket to said second user.

17. The method of claim 16 wherein each verifying step is performed by detecting a unique identifying ticket code within said respective user device and matching said unique identifying ticket code on said user device with information determined via said respective tag ID.

18. The method of claim 16 wherein each verifying step is performed by scanning a unique identifying ticket code on a ticket and matching said unique identifying ticket code with information determined via said respective tag ID.

19. The method of claim 16 wherein each verifying step is performed by contacting a third party ticketing platform to obtain a unique identifying information about respective ticket holders wherein said unique identifying information confirms ownership of the determined location linked to the respective tag ID.

20. The method of claim 16 wherein a price difference exists between said first and second tickets and said first user or said second user paying the price difference to exchange said first and second tickets.

21. A method for exchanging a first ticket and a second ticket electronically comprising:
    a. scanning a first tag with a first user device, said first user device comprising a first unique ID and said first tag comprising a first tag ID, said first tag ID obtained by said first user device in response to scanning the first tag;
    b. receiving the first unique ID and first tag ID from the first user device and in response thereto using the first tag ID to determine a venue, an event in progress, and a point of interest associated with the first tag ID;
    c. automatically verifying ownership of the first ticket by a first user by matching data associated with the first unique ID and information determined via said first tag ID;
    d. in response to detecting a match, automatically redirecting the first user device to a ticket exchange portal to enable listing said first ticket for exchange;
    e. identifying a desired ticket for exchange on a graphical user interface (GUI);
    f. generating a request for exchange of the desired ticket;
    g. determining a price difference between said first ticket and said desired ticket;
    h. approving the request to exchange said first ticket for said desired ticket;
    i. paying the price difference between said first ticket and said desired ticket; and
    j. issuing a new desired ticket and delivering said new desired ticket to said first user.

22. The method of claim 21 wherein the price of said first ticket and said desired ticket is dynamically priced.

23. The method of claim 22 wherein said dynamic pricing is provided based upon availability of a similar seat.

24. The method of claim 21 wherein the price of the desired ticket is determined by auction.

25. The method of claim 21 wherein the price of the desired ticket is set by a third party.

26. The method of claim 21 wherein the first ticket is reissued as an unsold ticket.

27. The method of claim 21 wherein the first ticket is exchanged with another user.

* * * * *